(12) United States Patent
Kravitz et al.

(10) Patent No.: US 11,595,365 B1
(45) Date of Patent: Feb. 28, 2023

(54) METHOD AND APPARATUS FOR THIRD-PARTY MANAGED DATA TRANSFERENCE AND CORROBORATION VIA TOKENIZATION

(71) Applicant: Springcoin, Inc., Marina del Rey, CA (US)

(72) Inventors: David William Kravitz, San Jose, CA (US); Mollie Zechlin Halverson, Los Angeles, CA (US); Matthew Benjamin Smith, Playa Vista, CA (US)

(73) Assignee: Springcoin, Inc., Marina del Rey, CA (US)

( * ) Notice: Subject to any disclaimer, the term of this patent is extended or adjusted under 35 U.S.C. 154(b) by 0 days.

(21) Appl. No.: 17/870,408

(22) Filed: Jul. 21, 2022

Related U.S. Application Data

(63) Continuation of application No. 17/470,097, filed on Sep. 9, 2021, now Pat. No. 11,425,107.
(Continued)

(51) Int. Cl.
| | |
|---|---|
| *H04L 9/12* | (2006.01) |
| *G06F 21/45* | (2013.01) |
| *H04L 9/40* | (2022.01) |
| *H04L 9/32* | (2006.01) |
| *G06F 21/62* | (2013.01) |
| *G06F 21/34* | (2013.01) |

(52) U.S. Cl.
CPC ...... *H04L 63/0435* (2013.01); *G06F 21/6218* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 2009/0175442 A1* | 7/2009 | Feng | H04L 9/3257 380/28 |
| 2021/0160084 A1* | 5/2021 | Yu | G06F 21/53 |

OTHER PUBLICATIONS

Providing Efficient Privacy-Aware Incentives for Mobile Sensing. Li. IEEE. (Year: 2014).*

(Continued)

*Primary Examiner* — Venkat Perungavoor
(74) *Attorney, Agent, or Firm* — Fitch, Even, Tabin & Flannery LLP

(57) ABSTRACT

A protocol that is managed by a coordinating network element or third-party intermediary or peer network elements and utilizes tokens prohibits any subset of a union of the coordinating network element or third-party intermediary, if any, and a proper subset of the processors involved in token generation from substantively accessing underlying data. By one approach, processors utilize uniquely-held secrets. By one approach, an audit capability involves a plurality of processors. By one approach, the protocol enables data transference and/or corroboration. By one approach, transferred data is hosted independently of the coordinating network element. By one approach, the coordinating network element or third-party intermediary or a second requesting network element is at least partially blinded from access to tokens submitted by a first requesting network element. By one approach, a third-party intermediary uses a single- or consortium-sourced database. By one approach, network elements provisioned with tokens jointly manage the protocol.

20 Claims, 29 Drawing Sheets

Related U.S. Application Data

(60) Provisional application No. 63/075,933, filed on Sep. 9, 2020, provisional application No. 63/139,432, filed on Jan. 20, 2021, provisional application No. 63/155,179, filed on Mar. 1, 2021.

(56) References Cited

OTHER PUBLICATIONS

Transaction Signing on Multiple Channels. Munalih. (Year: 2017).*
Toward Secure and Dependable Storage Services in Cloud Computing. Wang. IEEE. (Year: 2012).*

* cited by examiner

200

- 201: Protocol That Prohibits The Coordinating Network Element Or The Third-Party Intermediary From Substantively Accessing Data Content That, At Least In Part, Underlies The Protocol-Compliant Request

↓

By A Coordinating Network Element
  Or
  By A Third-Party Intermediary
  Or
  By A Requesting Network Element

↓

- 202: Receive From A Requesting Network Element A Protocol-Compliant Request Regarding Data Information

↓

- 203: Attestor Role — No → (to 205) / Yes ↓

- 204: Facilitating, At Least In Part Via The Protocol, Enabling The Requesting Network Element To Make Asynchronously Available For Data-Based Processing Data Sourced Via The Requesting Network Element

↓

- 205: Requestor Role — No - - -→ / Yes ↓

- 206: Facilitating, At Least In Part Via The Protocol, Enabling A Secondary Network Element To Access Data Sourced From Another Requesting Network Element

FIG. 2

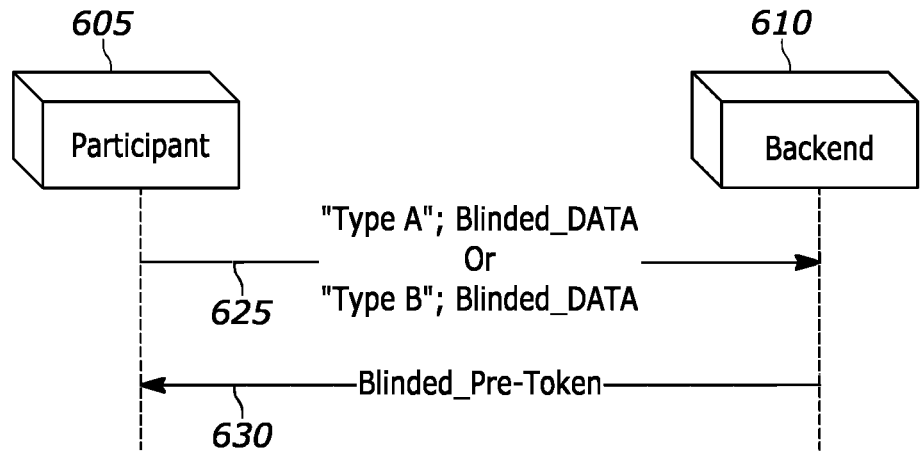
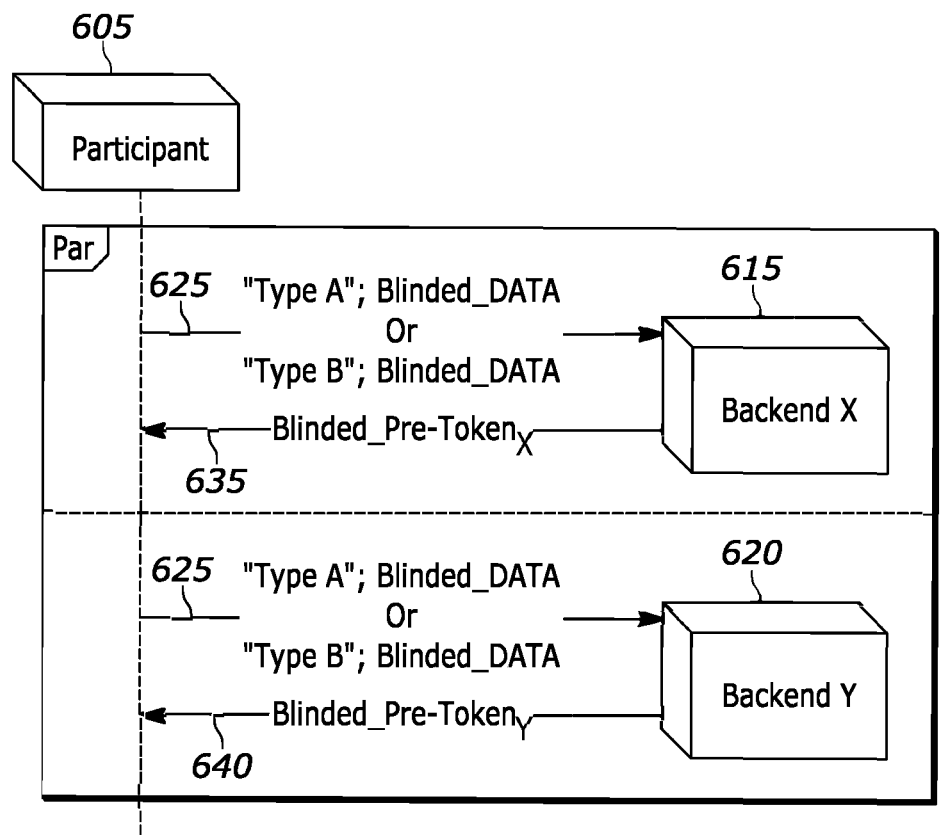
FIG. 6

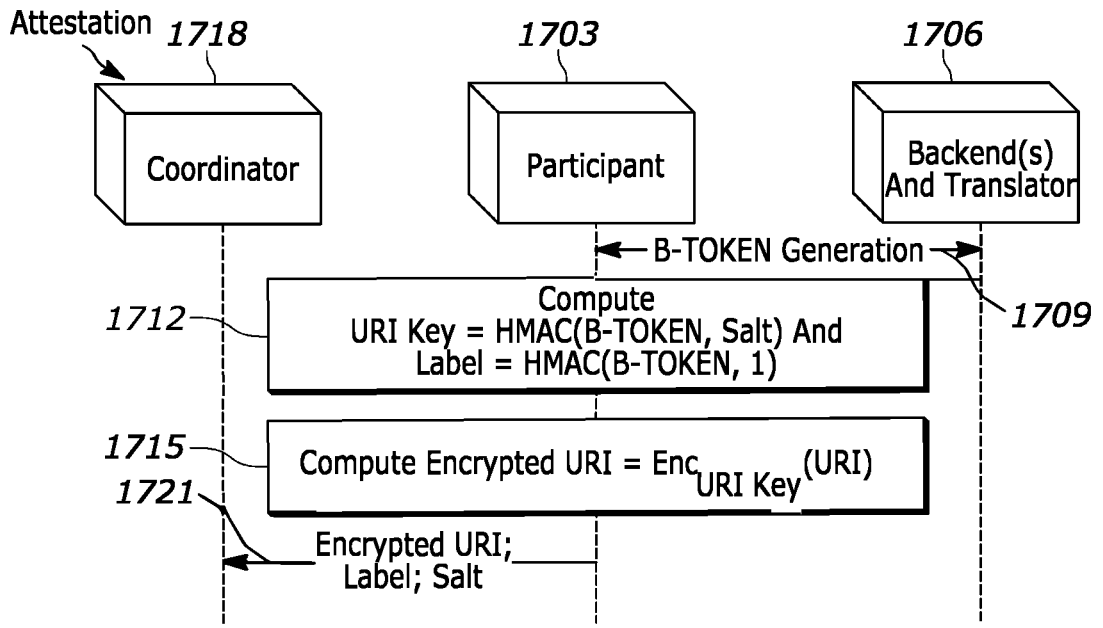
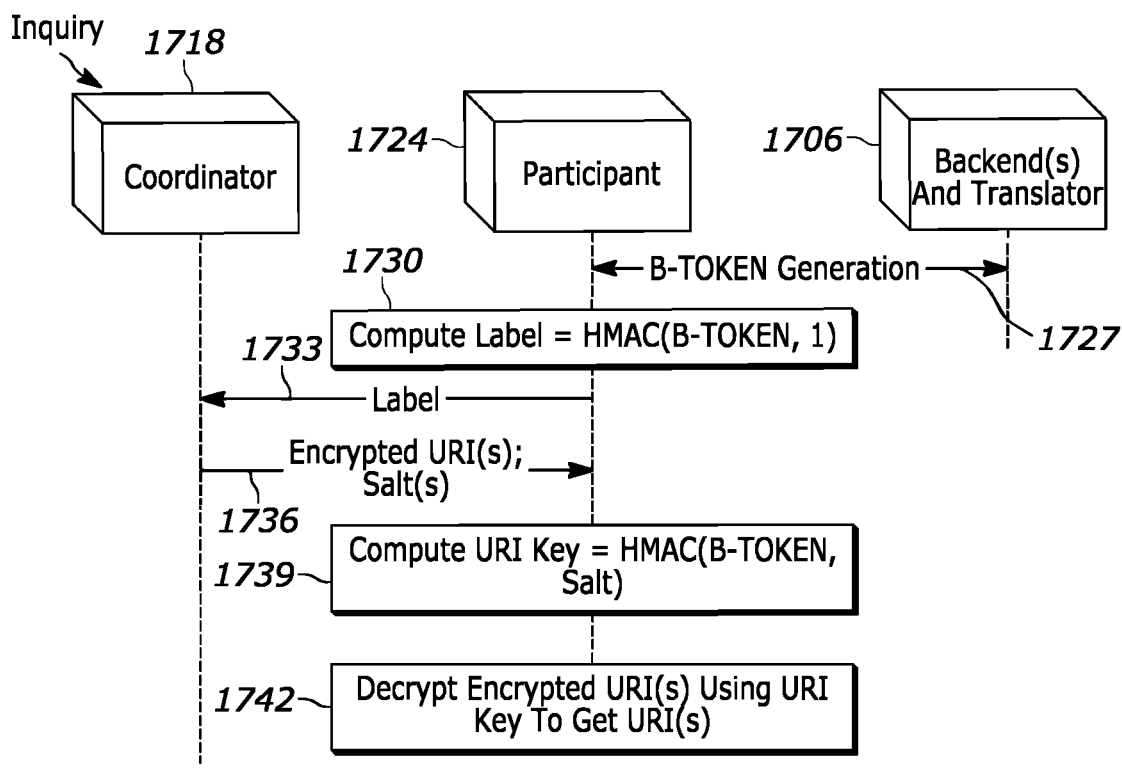
FIG. 17

METHOD AND APPARATUS FOR THIRD-PARTY MANAGED DATA TRANSFERENCE AND CORROBORATION VIA TOKENIZATION

RELATED APPLICATIONS

This application is a continuation of U.S. patent application Ser. No. 17/470,097 filed Sep. 9, 2021 and entitled METHOD AND APPARATUS FOR THIRD-PARTY MANAGED DATA TRANSFERENCE AND CORROBORATION VIA TOKENIZATION, which claims the benefit of U.S. Provisional application No. 63/075,933, filed Sep. 9, 2020, U.S. Provisional application No. 63/139,432, filed Jan. 20, 2021, and U.S. Provisional application No. 63/155,179, filed Mar. 1, 2021, all of which are each incorporated by reference in their entirety herein.

TECHNICAL FIELD

These teachings relate generally to accessing data and more particularly to the preservation of privacy.

BACKGROUND

Modern data communications systems are adept at quickly and reliably transporting information of various kinds. In some cases this also includes providing for the secure transport of such information using, for example, encryption techniques to encrypt the en route information.

In many cases, the foregoing provision of information includes information that identifies either the original source of the information or the immediate source of the information. Knowing who the source is can be important in some cases to having corresponding trust in the veracity of the information itself. There are times, however, when the source may wish to remain unknown to the recipient. While the prior art can provide for hiding identity information, such approaches tend to achieve that result at the expense of trust in the received information for lack of a basis to trust the source.

Accordingly, current data communications technology presents a conundrum; how to both protect identity information while at the same time assuring the recipient of the veracity of the information source?

In U.S. patent application Ser. No. 16/817,483, as incorporated fully herein by this reference, Notary attestations for corroboration of data content against previously attested-to-data content are characterized as follows:

A requesting network element acting within the attestor role (equivalently: a requesting network element acting as an attestor role; and a requesting network element, when acting as an attestor role) generates a salt value denoted as random and is authorized to deposit shares of random at Relayers, wherein authorizing of the requesting network element acting within the attestor role is by a coordinating network element that manages a protocol. The requesting network element also generates a comparison token that is derived from the value of random and is dependent on the data denoted as DATA. The requesting network element supplies the value of the comparison token to a coordinating network element that manages a protocol. A requesting network element acting within the requestor role (equivalently: a requesting network element acting as a requestor role; and a requesting network element, when acting as a requestor role) is authorized to retrieve shares of random from the Relayers, and combines the reconstructed value of random and its candidate version of DATA to generate a candidate value of the comparison token that it provides to the coordinating network element, wherein authorization of the requesting network element acting within the requestor role is by a coordinating network element that manages a protocol, where this coordinating network element is not granted access to random and hence is blinded from accessing DATA. As a part of the protocol, the coordinating network element provides a response that informs the requesting network element whether or not the candidate value of the comparison token matches the corresponding comparison token that was previously attested to by a requesting network element acting within the attestor role (that deposited shares of random to the Relayers). If there is a match, then the requesting network element acting within the requestor role concludes that its candidate version of DATA is a match against DATA that underlies the comparison token that was previously submitted to the coordinating network element on behalf of a requesting network element acting within the attestor role.

In one embodiment of the current invention, Notary attestations for corroboration of data content against previously attested-to-data content are characterized as follows:

A requesting network element acting within the attestor role generates a salt value that can be denoted as random. The requesting network element derives a tokenized representation of the data denoted as DATA by making a request to processors that output values dependent on secrets, at least one of which secrets is unavailable to a coordinating network element that manages a protocol. The requesting network element derives a symmetric key from the resultant token that it uses to encrypt random. The requesting network element provides the resultant ciphertext and the value of random to a coordinating network element that manages a protocol. A requesting network element acting within the requestor role receives the value of ciphertext from the coordinating network element. The requesting network element derives a tokenized representation of its candidate version of DATA by making a request to the applicable processors and derives a symmetric key from the resultant token that it applies in a decryption operation to the received value of ciphertext. The requesting network element submits the resultant value to the coordinating network element as a candidate version of the value of random. As part of the protocol, the coordinating network element informs the requesting network element whether or not the submitted candidate value of random matches the corresponding value of random that was previously attested to (along with ciphertext) by a requesting network element acting within the attestor role. If there is a match, then the requesting network element acting within the requestor role concludes that its candidate version of DATA is a match against DATA that was used to formulate a tokenization request that ultimately resulted in the value of ciphertext that was submitted to the coordinating network element on behalf of a requesting network element acting within the attestor role. Tokenization is a process that results in one or more tokens.

In U.S. patent application Ser. No. 16/817,483, Registry attestations for transference of attested-to-data content are characterized as follows:

A requesting network element acting within the attestor role generates a symmetric Key and uses it together with an initialization vector (IV) that is derived from an Attestation Identifier (AI) (which is provided either directly or via blockchain to the requesting network element by a coordinating network element that manages a protocol) to encrypt DATA (potentially along with metadata, as applicable) using an authenticated encryption mode. The requesting network element is authorized to deposit at Relayers a distributed version/chunks of the resultant ciphertext as well as shares of the Key and the resultant Authentication Tag, wherein authorizing of the requesting network element acting within the attestor role is by a coordinating network element that manages a protocol. These stored values may be designated as a decryption token. A requesting network element acting within the requestor role is authorized to retrieve shares of the Key and Authentication Tag and distributed chunks of ciphertext from the Relayers, in accordance with previous deposit of such cryptographic parameters and ciphertext by a requesting network element acting within the attestor role, wherein authorization of the requesting network element acting within the requestor role is by a coordinating network element that manages a protocol, where this coordinating network element is not granted access to Key and hence is blinded from accessing DATA. The requesting network element verifiably decrypts (using IV derived from appropriate Attestation Identifier) in order to recover DATA (as well as metadata if incorporated during attestation).

In one embodiment of the current invention, Registry attestations for transference of attested-to data content are characterized as follows:

A requesting network element acting within the attestor role generates a Pre-Key and derives a tokenized representation of the Pre-Key value by making a request to processors that output values dependent on secrets, at least one of which secrets is unavailable to a coordinating network element that manages a protocol. The requesting network element uses the tokenized representation of the Pre-Key value (or a value derived from it) as a symmetric key (along with an IV that may be derived from an Attestation Identifier) to encrypt DATA (potentially along with metadata, as applicable) using an authenticated encryption mode. The requesting network element makes the resultant ciphertext and Authentication Tag as well as Pre-Key (or a value deterministically derived from Pre-Key that is usable to derive the tokenized representation of Pre-Key) available to a coordinating network element that manages a protocol. A requesting network element acting within the requestor role receives the value of Pre-Key (or the value deterministically derived from it) and the ciphertext and Authentication Tag from the coordinating network element, in accordance with previous deposit of such cryptographic parameters and ciphertext by a requesting network element acting within the attestor role. The requesting network element derives a tokenized representation of Pre-Key by making a request to the applicable processors. The requesting network element verifiably decrypts the received value of ciphertext (using the symmetric key derived from the resultant token, and an IV derived from appropriate Attestation Identifier or otherwise received or derived) in order to recover DATA (as well as metadata if incorporated during attestation).

BRIEF DESCRIPTION OF THE DRAWINGS

FIG. 2 comprises a flow diagram as configured in accordance with various embodiments of these teachings and that illustrates the process the coordinating network element or third-party intermediary or a requesting network element will be presumed to carry out for the sake of an illustrative example. The coordinating network element or third-party intermediary will carry out this process while managing a protocol that, in particular, addresses aspects of enabling requesting network elements acting within an attestor role to make data available asynchronously to requesting network elements acting within a requestor role;

FIG. 6 comprises a flow diagram as configured in accordance with various embodiments of these teachings and that illustrates a comparison of uniform tokenization processing of "Type A" and "Type B" tokens through the use a single Backend and two parallel Backends. The transmissions depicted in FIG. 6 may include an overlay such as encryption that is subsequently decrypted, that is not explicitly shown;

FIG. 17 comprises a flow diagram as configured in accordance with various embodiments of these teachings and that illustrates attesting and inquiring to enable transference that may be altered dynamically after the Attestation process through the use of "Dynamic Registry Attestations," including communication with processors including Backend(s) and a Translator, and a Coordinator. The transmissions depicted in FIG. 17 may include an overlay, such as encryption that is subsequently decrypted, that is not explicitly shown;

DETAILED DESCRIPTION

Figure 1:
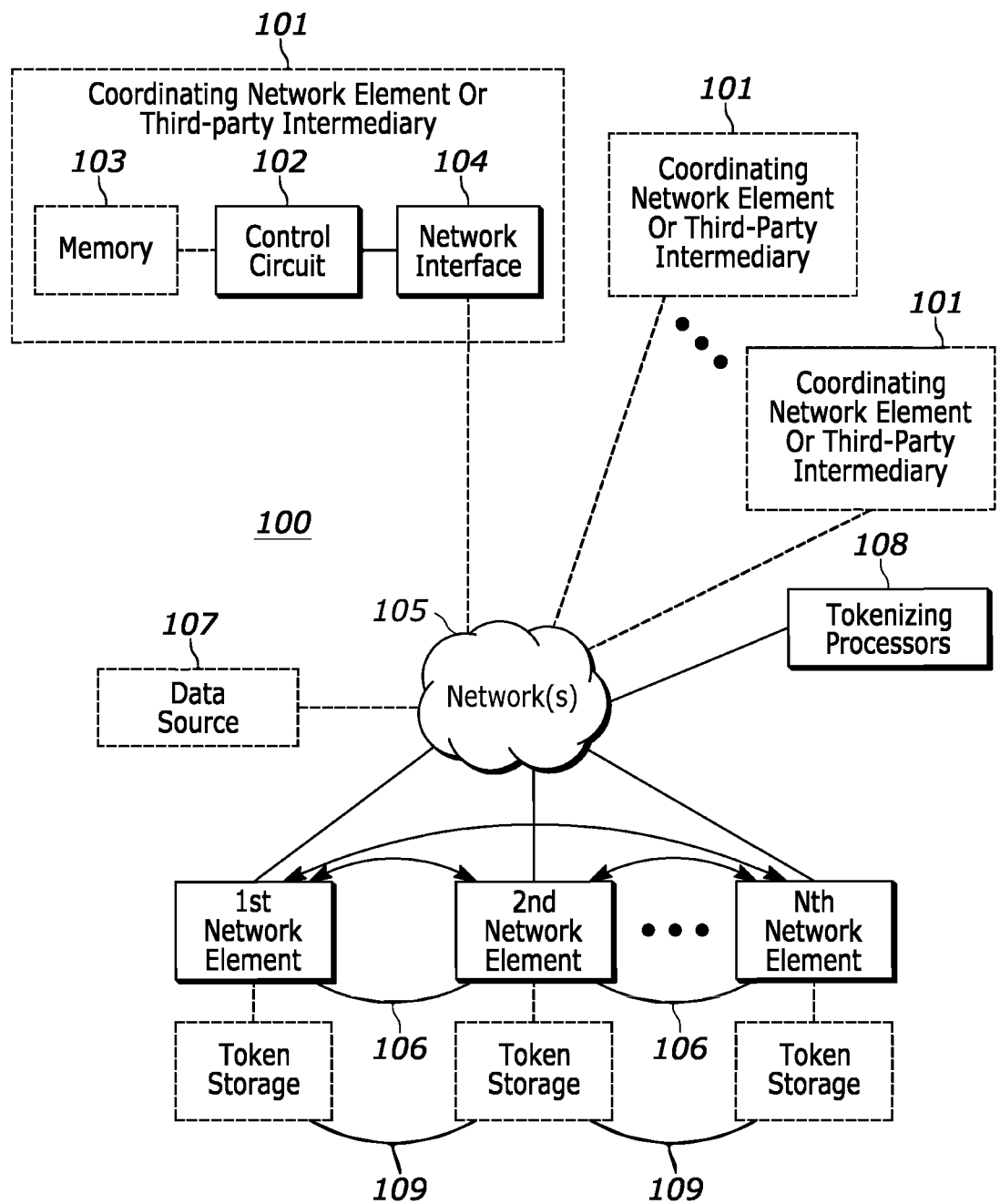
FIG. 1 comprises a flow diagram as configured in accordance with various embodiments of these teachings and that illustrates the architecture of a coordinating network element or third-party intermediary and the topology of the communications. In this particular example, the enabling apparatus includes a coordinating network element or third-party intermediary configured to effect a data-based activity via a corresponding network and manage a protocol that prohibits the coordinating network element or third-party intermediary from substantively accessing data content that, at least in part, underlies received protocol-compliant requests.

Herein addressed in some embodiments is a combined tokenization flow that maintains sequential processing (or parallel as well as sequential processing) for generation of tokens that are ultimately formulated at a tokenization processor, e.g., a Translator (designated herein as "Type A" tokens) as well as those that are ultimately formulated by the gateway/Participant (designated herein as "Type B" tokens). This allows for streamlined implementation of a third-party managed protocol that utilizes the results of tokenization for at least one of data transference and data corroboration (also known as data transference and corroboration). In addition, in some cases both types of tokens may be useful, in which case the uniformity lends itself to ease of processing as well as consolidated implementation.

Further, this addresses the processes for token migration in the event there is a change of ownership of a processor or an addition of a Server or processor (or coprocessor). It is preferable that such change of ownership or administration allows the new owner to update the processor's cryptographic keying material, which results in the need to migrate from original to new tokens with respect to storage at a database controlled by the Coordinator as a third-party coordinating network element. In order to ensure availability of inquiry (or request) of previously attested-to data, it is preferable to enable a token migration capability. It is also preferable that such capability obviates the need to store both the original and updated versions of tokens at a Coordinator-controlled database. It is further preferable that such capability is not exploitable by a rogue or malfunctioning participant. Consequently, end-to-end integrity between processors is established.

Whatever sequential and/or parallel topology of processers that is deployed during tokenization that enables attestation should be maintained for the purpose of tokenization that enables inquiry.

One goal of both the Notary design approach for corroboration and the Registry design approach for transference described herein is to achieve the desirable properties without reliance on Relayers for storage and retrieval, thus obviating the need for comparison tokens and decryption tokens. This is accomplished by taking further advantage of the processors already involved in the tokenization of INFO, i.e., information associated with or related to the Entity on whose behalf the participant is attesting or inquiring. The term INFO is limited herein to refer to data that corresponds to a pre-image of "Type A" tokens that are assigned during attestation as usable for the purpose of entity resolution. INFO may be considered a special case of DATA, where the latter is a more general term. Alternative embodiments that utilize the outputs of tokenization processors within a private set intersection (PSI) approach expand upon and/or substitute known methods based on peer-to-peer (P2P) use of Pohlig-Hellman (based on the hardness of Decisional Diffie-Hellman). Four such embodiments are depicted that address, respectively: (1) Coordinator-mediated blinded PSI; (2) streamlined Coordinator-mediated blinded PSI; (3) management of the protocol via an Attestor-specific third-party server and database in lieu of a Coordinator/coordinating network element; and (4) a P2P PSI-based scheme that eliminates the real-time use of computationally expensive commutative cryptography.

Further, an audit capability may be built into the tokenization and attestation processes. The ability to verify the correct information was tokenized properly may be considered essential for operating a data-driven network. One method embodied herein enables an auditor to retroactively demand the archived data from the network and verify that the original data was processed correctly by submitting their own request using the archived data. More specifically, in a particular embodiment, an auditor may be enabled to retroactively demand the archived data from the Backend and stored data from the Coordinator. This data will enable the Auditor to act as a Participant temporarily, submit the archived data themselves to the Backend and Translator and determine if the process was originally done correctly.

A Translator may be a processor component that supplementally includes Coordinator/coordinating network element functionality (and/or Registry functionality) or may be operated independently. The Coordinator and a Translator may be considered as co-located/co-hosted or, alternatively, as separately managed. In the latter case, it is preferable to ensure secure communications between the Translator(s) and Coordinator operating remotely from each other.

Communications, if needed, between the Coordinator/Translator and an Auditor can be secured (similarly to communications between Participant and Backend or between Participant and Translator) using elliptic curve Diffie-Hellman also known as ECDH (using an ECDH public key known to be associated with the Auditor). An implementation of the design preferably secures ECDH secrets as well as it secures ECPH (i.e., elliptic curve Pohlig-Hellman) secrets that are used to perform the actual tokenization.

The methods herein that collectively serve as a backbone that supports attestations without recourse to Relayers and positions attestations within a broader context include:
- a combined tokenization flow that maintains sequential processing or utilizes combinations of sequential and parallelizable processors/coprocessors for generation of tokens that are ultimately formulated at a processor, e.g., a Translator (designated herein as "Type A" tokens) as well as those that are ultimately formulated by the gateway/Participant (designated herein as "Type B" tokens);
- a hashed message authentication code, i.e., HMAC (or other keyed hash function) overlay for processor ownership migration or addition of a processor or coprocessor that is compatible with space-efficient import of legacy tokenized data;
- an HMAC (or other keyed hash function) overlay to enable all data to be processed via a uniform flow (including Coordinator-visible data that is robustly linked to its tokenization);
- a capability to audit attestation activity for the case of Coordinator-retained data as well as the case of Registry attestations without use of Relayers (where both make use of an HMAC or other keyed hash function overlay);
- an Attributes Registry offering alternative forms of token generation and usage to optimize on prioritized requirements, such as false positive resistance relevant to inquiry by Requestors possibly including, as well, resistance against fabricated multiplicity of legitimate attestations;
- PSI-based protocols enabling the following: flexibility relative to Coordinator access to matches of inquiry by Requestors against attestation by Attestors; authenticated delivery of stored and/or dynamically generated metadata if corresponding token is matched; trade-off of privacy against bandwidth efficiency via scaled degree of token truncation; non-Coordinator-involved usage of tokens acquired as "Type B";
- a capability to handle transference of third-party-hosted content, the storage of which is managed by Attestors independently of Coordinator involvement.

The above-referenced HMAC or other keyed hash function overlay can comprise an assertion that is verifiably generated by a first processor and verified by a second processor, wherein verifiability is based on a symmetric key available to the first processor and to the second processor. Alternatively to the use of a keyed hash function resulting in keyed hash function values, a public-key technique such as a digital signature scheme may be used, wherein a private key is available to the first processor for which the second processor has available a corresponding public key. An assertion that is verifiably generated by a processor can be denoted as a verifiably generated assertion.

With regard to differentiation between "Type A" and "Type B" tokens as procured and utilized within the current invention: there are essentially two types of tokens, namely, "Type A" tokens that are finalized by a processor using one or more secrets known to it that are preferably not available to Participants or other processors, and "Type B" tokens that are finalized by a Participant involving a step that unblinds what the Participant receives from one or more processors, thereby removing the effect of a blinding factor that is preferably not made available to such processor(s). Furthermore, one or more blinding factors that are imposed by a Participant during tokenization may remain intact, may be removed or may be removed and replaced by other blinding factor(s) at certain stages of tokenization. The removal of a blinding factor may be construed as applying an unblinding factor. An input provided to a processor in plaintext or ciphertext form may reflect the use of a blinding factor, wherein such blinding factor value may be distinct from the blinding factor, if any, used to produce an input provided to a different processor during that instance of tokenization. Tokenization may involve the use of commutative encryption that enables removal of previously imposed blinding factors. For example, for two parties A and B, Decrypt_A (Encrypt_B (Encrypt_A (message)))=Encrypt_B (message), where Encrypt_A represents encryption by party A, Encrypt_B represents encryption by party B, and Decrypt_A represents decryption by party A. A tokenization processor's role or Coordinator's role in finalization of "Type A" tokenization may, however, involve the use of non-commutative encryption that is not amenable to updated partitioning of encryption keys. As a further alternative to commutative encryption, use may be made of a keyed one-way function, such as implemented via a keyed hash message authentication code (e.g., HMAC) computation.

"Type A" and/or "Type B" tokens are usable for data corroboration and/or transference. In some embodiments of "Relayerless" Notary and Registry attestation schemes, false-positive detection/prevention is enabled by using "Type B" tokens to generate or transport cryptographic keys initiated by Attestors and made available to successful Requestors, wherein Participants (as Attestors and/or Requestors) preferably deny knowledge of the acquired "Type B" tokens to processors and the Coordinator, if any, under circumstances that warrant such access denial.

"Type A" tokens are made available to a server that utilizes them to run the protocol, such as the Coordinator as coordinating network element or Registry, by a Translator that finalizes the generation of them (or by a Participant as a requesting network element that has received a function of the "Type A" token from the Translator). An example of "Type A" tokens are those that may represent information associated with or relating to an Entity or other types of data or information. INFO may be converted to a "Type A" token, where a Participant is granted access to Data associated with an Entity, wherein Data or combination of Data and association of Entity to Data is denoted as INFO and INFO must be blinded from the Backend and the Translator. In the subsequent paragraphs, "Type A" tokens are referred to as A-TOKENs (regardless of whether they are assigned specifically for use for entity resolution as derived from INFO or are more generally usable as derived from DATA).

"Type B" tokens are ultimately generated by a Participant, in that they remain ephemerally blinded until such blinding factor(s) have been removed by the Participant subsequently to involvement in the tokenization process by all processors contributing towards the resultant token. "Type B" tokens, as derivable from DATA, are referred to as B-TOKENs (regardless of whether they are assigned as primary for use by the Coordinator, Registry or third-party intermediary server in an initial entity resolution phase or are more generally usable). This does not preclude the generation of a B-TOKEN as derivable from a value of DATA that is set to INFO as also used to generate an A-TOKEN.

Neither "Type A" nor "Type B" tokens are reproducible by any subset of processors that does not include a processor of each relevant processor type. They are usable to blind access to data from the Coordinator or other coordinating network element or Registry or third party that manages a protocol such as a protocol that mediates the corroboration and/or transference of data content. Such "Relayerless" approach obviates the need to have requesting network elements acting within the attestor role store cryptographic parameters or other cryptographic material at third-party repositories (e.g., Relayers) in order to enable authorized recovery and/or reconstruction of tokens (such as decryption tokens or comparison tokens) by requesting network elements acting within the requestor role wherein such tokens are involved in the corroboration or transference of data content.

"Type A" tokens are characterized by the property that they are ultimately formed by the last processor(s) involved in tokenization, while "Type B" tokens are characterized by the property that they are ultimately formed by a Participant regardless of whether a particular use case involves a Participant afterwards conveying direct knowledge of such "Type B" tokens and/or of derivative values to the Coordinator.

A "Type A" token may be considered as one that is generated, at least in part, based on secret(s) held by one or more processors and/or coprocessors (such as one or more Backend processors and/or one or more Translator processors) wherein any ephemeral blinding factors that are applied during tokenization by or on behalf of the Participant are removed by the Participant or its delegate prior to action taken by the last processor(s). This does not preclude the possibility that one or more blinding factors may intentionally remain intact prior to action taken by the last processor(s) if the presence of such blinding factor(s) is not intended to be of a transitory nature.

A "Type B" token may be considered as one that is generated, at least in part, based on secret(s) held by one or more processors and/or coprocessors (such as one or more Backend processors and/or one or more Translator processors) wherein at least one previously introduced ephemeral blinding factor is removed by the Participant or its delegate following action taken by the last processor(s).

Certain aspects of the generation of "Type B" tokens may occur in conjunction with Participant communication with the Coordinator (such as if one or more Translator processors are co-managed with the Coordinator and/or token generation is dependent on values submitted by Attestors during attestation and made available by the Coordinator to Requestors during inquiry). Alternatively, token generation may be completely independent of involvement by a Coordinator, if any.

"Type B" token generation need not necessarily involve contribution by all available processor types. In particular, one or more of the processors involved in generation of "Type A" tokens, if any, may be exempted from a role in generation of "Type B" tokens. As an example, "Type B" tokens may be generated using inputs from one or more Backend processors without sequential involvement by a Translator processor. The Coordinator, whether or not under the same authority as a Translator, may potentially play a role in constraining the successful utilization of "Type B" tokens to authorized Participants. As an example, the Coordinator may use a preferably securely-held signature generation private key to generate authorizations that are verified as a prerequisite to retrieving Attestor-provided content. Such authorizations may be time-limited relative to acceptability. Such authorizations may identify a Participant signature verification public key so that Requestor knowledge of the corresponding signature generation private key need be required as an additional safeguard against unauthorized access, although such feature may be considered antithetical to maintaining confidentiality of Requestor identities vis-à-vis communication with Attestor-managed content repositories, if any.

"Type B" tokens may eventually be made accessible (via a Participant) to a server responsible for managing a protocol, as in the case of Fraud Attribute Tokens, FATOKENs. wherein a Registry retains a copy of a function of these within an accessible database as provided by Participants that finalize the generation of them.

"Type B" tokens have other uses, however, in which it is preferable that they are not made available to any mediating server.

"Type A" tokens, or in some instances "Type B" tokens (such as FATOKENs), are known to a mediating server and submitted by Requestors and compared to those that were submitted by Attestors (although it is sufficient for the mediating server-accessible database to just store a hash of these tokens). This corroboration may or may not be dependent on using tokens as reference points for entity resolution.

In order to avoid additional complexity in the descriptions herein, Attestors and Requestors are shown as submitting at most a single entity-resolution-specific token and associated dataType per request. The methods are generalizable to accommodate a Requestor submitting a plurality of entity-resolution-specific tokens and/or dataTypes, where an attestation can potentially be matched if there is agreement on at least one of those tokens and one of those dataTypes. Where an Attestor associates a dataType with a plurality of tokens, it can repeat its processing for each such token so that a Requestor can potentially succeed if it has submitted only a single token. Where an Attestor produces a plurality of artifacts, such as ciphertext values, in order to deal with a multiplicity of tokens corresponding to a dataType, the system can optionally be configured so that the protocol-managing server limits transference of such artifacts to a Requestor to only those that match the one or more token values provided by a Requestor. Preferably, the Requestor is made aware by the protocol-managing server which token values the Requestor matched on.

In order to avoid the Coordinator having unintended access to B-TOKEN values for "Type B" tokens, Pohlig-Hellman secrets used to generate "Type B" tokens may preferably be chosen to be unrelated to Pohlig-Hellman secrets, if any, used to generate A-TOKEN values for "Type A" tokens. Pohlig-Hellman secrets may also be referred to as Pohlig-Hellman keys.

If requests to processors are ever combined to incorporate both "Type A" and "Type B" tokenization, then it is preferable to have the Participant generate its (ephemeral) blinding factors independently for each such type, where blinding factors are applied by the Participant to obscure the elliptic curve point based off of INFO or DATA as raw inputs to tokenization. While in U.S. patent application Ser. No. 16/817,483 the blinding factor is removed by the Participant, more generally herein (dependent on the specific desired properties) a blinding factor (or its inverse) may be made available to a processor. Furthermore, a blinding factor may be applied by a processor rather than by a Participant. There may be a plurality of blinding factors that are utilized within a single execution of a tokenization scheme and/or of a protocol that utilizes tokenization.

Combinations of sequential and/or parallelizable processors/coprocessors may be enabled. Commutative encryption (such as Pohlig-Hellman) may be supplanted by one-way functions in order to improve performance where constructions or sub-constructions do not require reversal or removal of blinding factors. Token migration can be extended beyond handling change in ownership of a processor or addition of a coprocessor to also allow for simultaneous switchover from one tokenization scheme to another.

The Coordinator, as a third-party coordinating network element may be operated independently, or its operation may be combined with that of one or more processors that are involved in tokenization that comprises the use of one or more secrets assigned to each processor, wherein the assignment of any such secret is via provisioning to or generating onboard such processor. At a minimum, tokenization involves a single processor, designated herein as a Backend. Preferably, the operation of and the assignment of secrets to at least one processor involved in an instance of tokenization is independent of that of all other processors involved in that instance.

Migration as addressed herein handles the replacement of Pohlig-Hellman secrets by those that may be independently generated. In an alternative trust model in which such replacement is not deemed necessary, then the tokenization need not be redone in order to accommodate changing ownership of a processor and/or adding a coprocessor/processor.

For the Fraud Attributes Registry use case, a solution can be accomplished without pinning attested to- or inquired against-data to one or more entity resolution tokens. Although one instantiation uses "Type B" tokens that are provided to the Coordinator by the Participant, for example as generated by combining and removing the Participant-imposed blinding factor from the outputs of two Backend processors, an alternative solution can utilize "Type A" tokens in place of "Type B" tokens. Furthermore, either solution has applicability to addressing data corroboration beyond those instances in which synthetic fraud or other types of fraud may be involved. A "Type A" token-based solution may deprive a Participant from directly exploiting potential Coordinator database breaches via A-TOKEN value correlation in that Participants do not gain access to A-TOKEN values during legitimate execution.

Addressing data corroboration by implementing "Type A" tokenization of raw inputs across all relevant dataTypes, as opposed to "Type A" tokens for at most entity resolution INFO and the use elsewhere of "Type B" tokens (or use of comparison tokens deploying Relayer-based storage), may offer an advantage of flexibility in that the Coordinator can respond to Requestors by treating tokenized DATA for certain dataTypes as entity resolution fields (wherein such DATA can be denoted as primary attributes) for which requested and stored tokens must match in order to return information to the Requestor concerning DATA for other submitted dataTypes (which can be denoted as secondary attributes) without necessarily requiring differential processing by Attestors and/or Requestors. If no differential processing by Attestors is required, such decisions by the Coordinator can be made after the relevant DATA has already been attested to.

In the Relayer-based Notary attestations design, as well as the Relayerless designs, it is considered advantageous that the Coordinator cannot independently correlate which attestations agree on DATA values. But if a Requestor displays matches to the Coordinator for a given entity resolution token and dataType on, say, attestations A, C and E but not on attestations B, D and F, it is likely that attestations A, C and E correspond to the same DATA value. The Requestor can potentially mislead the Coordinator regarding B, D and F by displaying false negatives, but can't generate false positives for A, C or E. However, note that these DATA associations (or lack thereof) are not persisted in the Coordinator database under a properly configured Business Intelligence pipeline that allows disabling retention of match/no-match results within the live system. This "amnesia" property is useful in effectively shielding knowledge of such DATA associations from leaking via database breaches.

A Private Set Intersection (PSI)-based approach to Notary attestations can bidirectionally minimize access to the Coordinator database and Participant database, respectively. This is achievable by deriving and exchanging blinded values derived from "Type B" tokens, where, unlike the blinding utilized during "Type B" token generation, it may not be necessary to perform an unblinding operation. An unblinding operation on the part of the Participant may be needed, however, if the Coordinator returns only a compressed representation of blinded values derived from "Type B" tokens that are present in its database along with the locally-blinded versions of the Requestor-blinded values derived from "Type B" tokens that the Requestor submits. A Bloom filter is a known example of such compressed representation. The Participant would locally perform the unblinding and Bloom filter computations to check for matches against the Bloom filter received from the Coordinator. "Type B" tokens rather than "Type A" tokens are preferably used (at least) by Requestors (if not also by Attestors) in order to minimize leakage of information to the Coordinator (which may be comanaged and/or collocated with the Translator and/or other processor(s)) and thwart false positives perpetrated by the Coordinator as made possible via premature access to information through such leakage. The Requestor self-determines matches of candidate data against attested-to-data based on the response from the Coordinator, i.e., by self-determining which data values it holds in common with one or more requesting network elements acting as an attestor role. The Coordinator cannot determine on its own whether or not the Requestor achieved a match of candidate data against attested-to data. The Requestor cannot successively send a false positive with significant likelihood, but it could simply refuse to respond to the Coordinator relative to matches. In order for this PSI-based approach to work, the Coordinator does need to access tokens via attestations (or a non-identity function of tokens as available to Requestors as well as Attestors). In one embodiment, "Type B" tokens, i.e., B-TOKENs (as derived by a Participant by removing the ephemeral blinding factor from what the Participant acquires via tokenization processors and hashing the result) are used to derive elliptic curve points. Although prior art PSI modeling does not apply secure multiparty computation in order to generate a representation of data via tokenization, hash values are computed over a representation of data to be checked for matches. It is desirable, however, to be able to increase bandwidth efficiency and/or computational efficiency. Consequently, it is depicted herein how an alternative embodiment of the private set intersection principle can be applied simultaneously with tokenization of data rather than as an overlay procedure.

Other approaches to Notary attestations are presented herein that entail acquisition by a Participant of "Type B" tokens without ever exposing such B-TOKENs to the Coordinator during attestation or inquiry.

Preferably, processor secrets for "Type A" and "Type B" tokenization, respectively, should be independently generated. Even if the same value of INFO or DATA is used over time for a "Type A" token and a "Type B" token, the Coordinator should not be able to determine the "Type B" token unless given it explicitly by the Participant. Further, it may be advantageous for different uses of the same token type, such as one in which "Type B" tokens are ultimately provided by Participants to the Coordinator and another the efficacy of which depends on the Coordinator not accessing the relevant "Type B" tokens, to use independently generated processor secrets.

In one embodiment herein of Registry attestations, content management aspects involving actual storage by Attestors and retrieval by Requestors are offloaded to the Participants of the system (or other hosting provider), thus relieving the Coordinator of this ongoing responsibility and liability, and rendering the attesting Participant, i.e., Attestor (or other hosting provider), as final arbiter on setting the availability of content. This does not adversely impact the ability of the Coordinator to fulfill its role as a blinded mediator of data corroboration and exchange that authorizes access while concealing identities and other details of Participants from one another. Attestation and inquiry can occur asynchronously of content management, where the content management can be handled dynamically by the Attestor (or other hosting provider) without involving further communication with the Coordinator. Optionally, timeouts on access to attested-to content by Requestors may be enforced by the Coordinator and/or the relevant Attestor. Attestation occurs asynchronously of content storage (i.e., storage of content) by the requesting network element, when acting as an attestor role; and inquiry occurs asynchronously of content retrieval (i.e., retrieval of content) by the requesting network element, when acting as a requestor role.

The content can be made available via a URI that is made known to Participants by successfully performing inquiry with the Coordinator (as Requestors). If the Attestor does not want to associate old content to new content that is released, then they should use a new URI to post this content and use this URI when attesting to the Coordinator. Such measure can prevent a Requestor from clustering parcels of content according to their sources. There are at least two ways to limit access to the content managed by attesting Participants to only authorized inquiring Participants, i.e. Requestors, that match on the attested-to representation of the Entity to which the content is associated. Both ways involve extracting cryptographic material, as well as a "Label" for entity resolution, from "Type B" tokens that are restricted from access by the mediating infrastructure, as opposed to "Type A" tokens, if any, that are directly utilized by the Coordinator for other purposes. More specifically with respect to these two ways: (1) these "Type B" tokens may be generated independently of any "Type A" tokens, while still potentially involving inputs based on parameters that are secretly held respectively by each of the processors involved in the "Type A" tokenization, or (2) the Participant may operate upon an intermediate "Type A" tokenization value that reflects action taken so far by only some of the processors, where such operating entails removing any ephemeral blinding factors (which were previously applied by the Participant to hide the input data from those one or more processors) before applying a one-way function and forwarding the result to the follow-on processor(s) that completes (complete) the "Type A" tokenization; the "Type B" token that is derived from the unblinded version of the intermediate value is not available to the follow-on processors because of application of the one-way function; the Coordinator can issue signed authorizations (in which arguments are included or referenced as arguments of the signature) to Participants that are required in addition to knowledge of the "Type B" token to effectively access the content. In addition to enabling attestation and inquiry to occur asynchronously of content management, the current invention also offers a differentiable content correction vs. content addition capability: Attestors can make changes/additions dynamically without going back to the Coordinator as long as the same Content Key is used to generate the Ciphertext from the plaintext content. When updating the content the oldest version of the Ciphertext must be associated with the newest Ciphertext in order to enable access by Participants who inquired to the Coordinator as Requestors before or after the Ciphertext was updated. This is due to the fact that the new Requestors must still be able to match against those hash (Ciphertext) values the Attestor has made the Coordinator aware of. This enables the Attestor to make content corrections using the same authenticated encryption key (i.e., the Content Key which transforms plaintext content to Ciphertext) without re-engaging with the Coordinator to make such key accessible by Requestors. Content additions can be made using either the same Content Key or a newly generated Content Key that will be accessible to Requestors who perform inquiry via a request that occurs subsequently to the Attestor's upload of the new Content Key to the Coordinator. An Attestor provides a preferably randomly generated Salt to the Coordinator that when combined with the "Type B" token is usable to derive a value as keying material for authenticated encryption of URI and decryption of Encrypted URI as an encrypted value resulting from the authenticated encryption operation, respectively, where Encrypted URI is also deposited with the Coordinator. The Salt and Encrypted URI values are retrievable by Requestors that match with the Coordinator on a value denoted as Label (derived from the "Type B" token) that is deposited by the Attestor with the Coordinator (and is the same for all Attestors). Delivery of the Content Key from the Coordinator to the Requestor is conditional in that such delivery is delayed if Website Verification functionality is deployed. In either case, the Content Key is deposited with the Coordinator by the Attestor and needed to unlock/decrypt the URI-held encrypted content, i.e., Ciphertext. With respect to Website Verification functionality: even if payment is normally required, Requestors need not be liable for payment unless the URI is currently reachable. For example, the Requestor exchanges with the Coordinator a URI_Token, e.g., hash (Ciphertext), retrieved from the active URI for the Content Key. If URI_Token is specified as hash (Ciphertext), then this provides protection against undetected alteration of the Ciphertext that is retrieved via the URI.

Circumstances such as change of ownership of a processor (such as a Backend) or an addition to the system (such as a processor or coprocessor) necessitate a change in the Pohlig-Hellman keys used to generate the final tokens. In order to ensure no value is lost (such as data associated with old tokens) a migration of tokens must occur. It is also important to ensure these migrations are correct and there are not inaccurate mappings from old tokens to new tokens as this may result in issues such as inaccurate data within the network. Without this assurance Participants could put false tokens in place of good tokens that were connected with valuable data making that data unavailable.

Once the desired percentage of the database has been migrated the migration is complete, and these processes are made unnecessary. To keep track of how much of the database has been migrated, the tokens that have been replaced by new tokens should be flagged. By differentially flagging tokens that are new but are not replacements, one can ascertain the percentage of migratable tokens that have been migrated. Alternatively, reference to a timestamp signifying the start of migration or another mechanism may be used to differentiate between replacement- and non-replacement-new tokens.

In the case of changing the ownership of the Backend, there must be a new Pohlig-Hellman key, and therefore all old tokens must be replaced by new tokens. This migration may be focused on "Type A"— i.e., A-TOKENs, and/or "Type B"— i.e., B-TOKENs, that are to be stored and utilized by a database.

Adding a coprocessor allows for an owner/manager/administrator of a processor to outsource some of the functionality to a coprocessor. This is somewhat analogous to introducing partitioning of an existing processor or further partitioning of an already partitioned processor. One distinction is that the Participant may remain oblivious of the degree (if any) of partitioning of a processor. However, if a coprocessor is added as described below, the Participant must communicate separately with each processor or coprocessor, necessitating that the Participant is aware of exactly how many processors and coprocessors are used.

In some embodiments, there are two separate blinding factors although both the tokens they are used to form are "Type B" tokens. This is due to the fact that INFO must be blinded from the Backend, and B-TOKEN derived from a "Pre-key" value must be blinded from the Translator. As the blinding factor for this second B-TOKEN is applied at the Backend, the two blinding factors must be different, or the Backend would be able to determine INFO.

The goal of the collection of embodiments denoted herein as an Attributes Registry is to build a database in which each piece of data (submitted by Attestors) is represented by a token so as to make the database searchable (by Requestors) by any dataType. This allows for an entity resolution-free solution, giving more freedom for analysis, more possibilities to detect fraud and ultimately less limitations. However, it may also be desired for entity resolution to be an option within a given protocol.

Relative to the Attributes Registry suite of techniques, an alternative, more compressed, methodology to address data transference and/or corroboration that is amenable to false-positive prevention/detection entails a degree of simultaneity relative to tokenization and transference/corroboration. The extraction of keying material by an Attestor or Requestor can take place as an intermediate step, based on output generated by one or more processors, followed by an operation performed by the Participant, the result of which is made available to and is acted upon by one or more processors to complete tokenization. In one embodiment, the steps can be synopsized at a high level as follows: The Participant derives a symmetric key for a keyed hash function and/or a symmetric encryption key from the result of unblinding (also known as removing a blinding factor from) first-level intermediate tokenization value(s) it receives from a first set of one or more processors (wherein the result is also known as an intermediate tokenization result). The Participant uses the keyed-hash key to generate HMAC value(s) and possibly uses a symmetric encryption key to generate ciphertext. Some such HMAC value(s) can be considered as second-level intermediate tokenization value(s), to be acted upon by the Coordinator/Translator in order to produce the final token values. Other of such HMAC value(s), if provided by a Participant during attestation, can be used by a Participant during inquiry to verify the legitimacy of metadata and/or ciphertext as having originated during attestation and to thwart potential attempts by the Coordinator/Translator to falsely indicate successful data corroboration. The entries stored by the Coordinator/Translator can be configured to make HMAC values and ciphertext inaccessible to prying eyes even if the database is breached. The schemes within the Attributes Registry suite can be configured to provide for false-positive resistance, including false attestation-multiplicity resistance. If a suitable precaution is not taken, the Coordinator could falsely represent the multiplicity by referring to applications that were not actually submitted by any attesting Participant. This is detectable if Attestors include a preferably randomly or pseudorandomly generated value/salt as an addition, e.g., prefix or suffix, to the metadata. In that case, the Coordinator stores the salt as well as the metadata and the Requestor can be programmed to not accept repeats of salt values in response to its inquiry concerning a dataType and candidate DATA value. Uniqueness of the salt value can be checked independently for each candidate DATA value query. As an example of the flexibility of migration, it is possible to migrate from one Attributes Registry scheme to another at the same time as adding a parallel Backend operated by a company other than the company currently owning the Backend.

The basic Attributes Registry design efficiently handles Requestor participants learning via the Coordinator the extent to which their candidate data submissions match those that were submitted by participants as Attestors. Whether or not certain dataTypes are flagged as primary attributes for entity resolution to be used in conjunction with testing other dataTypes for secondary matches, end-to-end security is achieved relative to blocking the Coordinator from accessing the underlying data to be corroborated. The Coordinator can also inform the Requestor which of the data matches appeared together within a single application submitted by an Entity to a given attesting participant, without disclosing additional information about that application, Entity or Attestor. However, two important desired security properties are lacking in the basic design, namely: (1) end-to-end confidentiality and/or integrity protection of metadata and possibly other data to be transported from Attestors to successful Requestors opaquely via the Coordinator, and (2) the capability for the Requestor to detect potential attempts by the Coordinator to falsely assert data matches. In an alternative embodiment, these two properties are achieved without adding extra round trips to the flow used to generate the "Type A" tokens and utilize them during Attestation or Inquiry. This is accomplished by generating a supportive token (also known as an ancillary tokenization result), namely, a "Type B" token that is not accessible or reproducible by the Translator and/or Coordinator and that is not accessible during tokenization by the Backend processor. The Backend and the Coordinator/Translator are each prevented from unilaterally modifying metadata/data to be transported and from reading any such content that was provided by Attestors to the Coordinator in ciphertext form. Further improvements are enabled via a further alternative embodiment, whereby only a single type of tokenization is invoked (making use of an intermediate tokenization result) while not sacrificing any of the properties mentioned above. This is achieved, in part, by limiting the use of commutative encryption to where it is strictly required to enable removal by the Participant of the ephemeral blinding factor that shields DATA from visibility by the Backend. Another improvement achieves tunable reduction of correlatability of attestation entries within the Coordinator-accessible database, without incorporating the use of attestation-specific random values that would reduce the communications efficiency of the Inquiry flow. The invention enables a well-defined seamless migration path from deployment of the basic Attributes Registry to that of the full-fledged design that preserves ongoing availability of past attestations for post-migration Inquiry and that simultaneously enables incorporation of an additional Backend processor to increase the degree of overall systems security attained by the multi-party computational framework. Further, an auditability feature is realized, which also serves to aid the Coordinator in resetting which dataTypes are considered as primary attributes in order to accommodate additional use cases.

Although not specifically discussed elsewhere herein, U.S. patent application Ser. No. 16/817,483 indicates (within paragraph [0124]) that "A recipient of a value to be operated on via Diffie-Hellman or Pohlig-Hellman private keys executes an appropriate public key validation routine per NIST Special Publication 800-56Ar3 specifications. By one approach, Public Key Validation must be done every time a machine receives (possibly after local decryption) a purported elliptic curve point from an external source (e.g., processor partition-to-processor partition, Participant-to-processor or processor-to-Participant), and intends to operate on it via scalar multiplication. Within the context considered here, the only necessary check is to make sure the received value corresponds to a point on the specific intended curve, because of the specifications of P-256 (the elliptic curve used here as example)."

These and other benefits may become clearer upon making a thorough review and study of the following detailed description. Referring now to the drawings, and in particular to FIG. 1, an illustrative apparatus 100 that is compatible with many of these teachings will now be presented.

In this particular example, the enabling apparatus 100 includes a coordinating network element or third-party intermediary 101. This coordinating network element or third-party intermediary is configured to effect a data-based activity via one or more corresponding networks 105. As will be described in more detail herein, this coordinating network element or third-party intermediary 101 manages a protocol that prohibits the coordinating network element or third-party intermediary 101 from substantively accessing data content that, at least in part, underlies received protocol-compliant requests.

In this illustrative example the coordinating network element or third-party intermediary 101 includes a control circuit 102. Being a "circuit," the control circuit 102 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 102 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 102 is configured (for example, by using corresponding programming as will be well understood by those skilled in the art) to carry out one or more of the steps, actions, and/or functions described herein.

By one optional approach the control circuit 102 operably couples to a memory 103. This memory 103 may be integral to the control circuit 102 or can be physically discrete (in whole or in part) from the control circuit 102 as desired. This memory 103 can also be local with respect to the control circuit 102 (where, for example, both share a common circuit board, chassis, power supply, and/or housing) or can be partially or wholly remote with respect to the control circuit 102 (where, for example, the memory 103 is physically located in another facility, metropolitan area, or even country as compared to the control circuit 102).

In addition to storing other information as described herein, this memory 103 can serve, for example, to non-transitorily store the computer instructions that, when executed by the control circuit 102, cause the control circuit 102 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

In this example the control circuit 102 also operably couples to a network interface 104. So configured the control circuit 102 can communicate with other elements (both within the apparatus 100 and external thereto) via the network interface 104. More particularly, the network interface 104 facilitates compatible communications via one or more networks 105. Numerous examples are known in the art. A non-exhaustive listing would include Universal Serial Bus (USB)-based interfaces, RS232-based interfaces, I.E.E.E. 1394 (aka Firewire)-based interfaces, Ethernet-based interfaces, any of a variety of so-called Wi-Fi™-based wireless interfaces, Bluetooth™-based wireless interfaces, cellular telephony-based wireless interfaces, Near Field Communications (NFC)-based wireless interfaces, standard telephone landline-based interfaces, cable modem-based interfaces, and digital subscriber line (DSL)-based interfaces. Such interfaces can be selectively employed to communicatively couple the control circuit 102 to another network element, to a local area network, or to any of a variety of wide area networks or extranets (such as, but not limited to, the Internet).

Relevant to the following description, so configured, the coordinating network element or third-party intermediary 101 can compatibly communicate via the aforementioned protocol with any of a plurality of requesting network elements 106 (illustrated in FIG. 1 as a first network element through an Nth network element). As will be described in more detail below, such requesting network elements 106 may be acting within a so-called attestor role or as a secondary network element that is acting within a so-called requestor role. Each network element acting in an attestor and/or requestor role maintains control of their own non-transitory storage for the use of Token storage 109, if applicable.

Other apparatuses that may play a part in effecting the data-based activity in a given application setting include such elements as an initial data source 107 that does not act as either an attestor or a requestor and/or one or more so-called tokenization processors or tokenizing processors 108.

Referring now to FIG. 2, the aforementioned coordinating network element or third-party intermediary 101 or a requesting network element 106 will be presumed to carry out the illustrated process 200 for the sake of an illustrative example. By one approach, the above-described control circuit 102 carries out the described actions, activities, and functions. Also as described above, the coordinating network element or third-party intermediary 101 or a requesting network element 106 will carry out this process 200 while managing a protocol 201 that, amongst other things, prohibits the coordinating network element or third-party intermediary 101 from substantively accessing data content that, at least in part, underlies the protocol-compliant requests described herein.

At block 202, the coordinating network element or third-party intermediary 101 or a requesting network element 106 receives, via the aforementioned one or more networks 105, a protocol-compliant request regarding data information. This protocol-compliant request may be contained within a single discrete message or may, if desired, comprise a plurality of discrete messages. This protocol-compliant request is received from a requesting network element 106 (distinct from the receiving network element, if any) that is either acting within an attestor role or as a secondary network element that is acting within a requestor role. The data information that corresponds to the protocol-compliant request can constitute or comprise any of a variety of data items. Examples include, but are not limited to, referenced data content, referenced data type, a reference to initial data source 107, and data information associated with an initial data source 107.

At block 203 the coordinating network element or third-party intermediary 101 or a requesting network element 106 determines whether the requesting network element 106 (distinct from the receiving network element, if any) is a network element that is acting within an attestor role. When true, at block 204 the coordinating network element or third-party intermediary 101 or a requesting network element 106 facilitates, at least in part via the aforementioned protocol, enabling the requesting network element 106 to make asynchronously available for data-based processing data sourced via the requesting network element. In this example the data is sourced as indirect data and entails derivation from data received by the requesting network element from an initial data source 107.

After the determination made at block 203 is true or false, at block 205 the coordinating network element or third-party intermediary 101 or requesting network element 106 determines whether the requesting network element 106 (distinct from the receiving network element, if any) is acting within a requestor role. When true, at block 206 the coordinating network element or third-party intermediary 101 or requesting network element 106 facilitates, at least in part via the aforementioned protocol, enabling a secondary requesting network element 106 to access data sourced from another requesting network element 106. When such is not the case, this process 200 can accommodate any variety of responses as desired. As one example in these regards, this process 200 will accommodate returning to the beginning of this process 200 to thereby process another subsequently received protocol-compliant request.

So configured, requests from various entities regarding a variety of data types can be shared and/or attested to without necessarily disclosing the identities of the various entities engaged in these activities. This blinding includes the coordinating network element or third-party intermediary 101 that facilitates such sharing of information.

Various exemplary application settings and implementation details will now be presented. It shall be understood that the specific details provided in these descriptions are intended to serve an illustrative purpose and should not be taken as limiting examples that constrain the application of these teachings.

Figure 3:
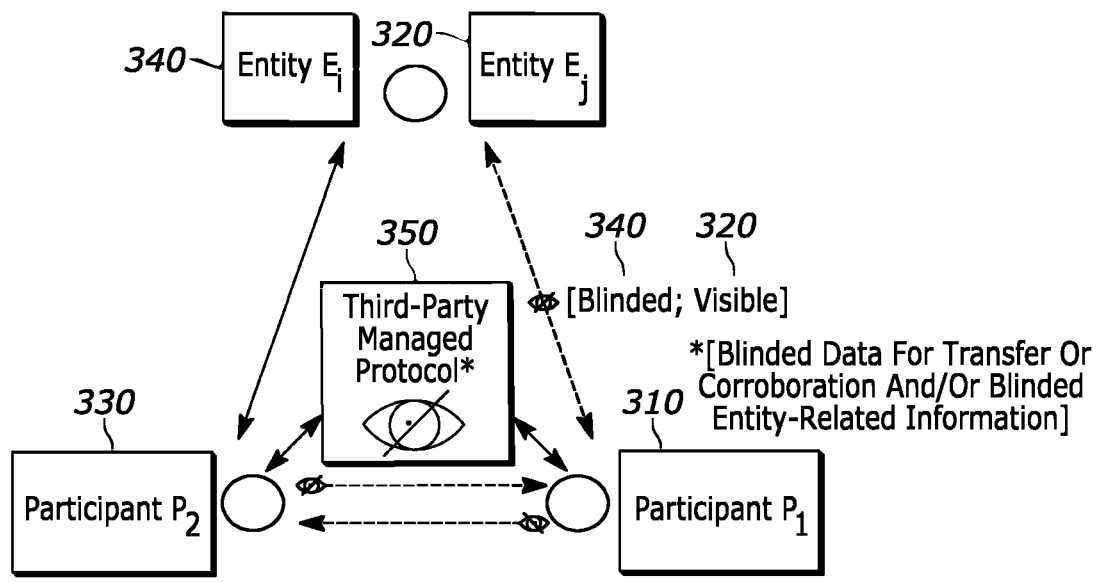
FIG. 3 comprises a block diagram as configured in accordance with various embodiments of these teachings and that illustrates an overview of blinded information/data exchange/transference or corroboration between Participants via a third-party managed protocol, involving Participants as Attestors or Requestors. This architecture is further elaborated on in FIG. 5 through FIG. 8 and FIG. 11 through FIG. 30.

Referring now to FIG. 3, a Participant $P_1$ 310 acquires data sourced from an Entity $E_i$ 320 and acting within an attestor role utilizes a third-party managed protocol 350 in order to provide the system with an Attestation of data derived from such source data. Such derivation may involve normalization of source data. Such Attestation may involve a dataType. Such Attestation may involve a representation of information associated with or related to the Entity $E_i$ 320 which may comprise information identifying the Entity E 320 such as Social Security Number and Date of Birth. Such representation may be in the form of blinded Entity-related information that is thus opaque to the third-party managed protocol 350 and thus to a Server or Servers that run the third-party managed protocol 350. Such representation may be used, possibly along with dataType, as a mechanism of categorizing the source data. The Server or Servers that run the third-party managed protocol 350 may be distributed in their administration/ownership across multiple parties or companies. The efficacy of blinding from access by the third-party managed protocol 350 may thus be dependent on practical limits on collusion or compromise activity.

In certain use cases, such as an attributes registry, Attestations do not necessarily bear actual blinded or unblinded Entity-related information. That may be because such Attestations are used to enable a Requestor to attempt to corroborate or match data across all Entities that have sourced data to Participants of the system that have subsequently attested to such data. Such Entities may be fraudulent or impostors. Such data may be partially or wholly synthetic or may involve combinations of legitimate and falsified or misappropriated data, or such data or such Entity may be suspected by an attesting Participant of being fraudulent or otherwise improper.

The data that is made available for transfer or corroboration via a posted Attestation may be represented in the form of blinded data that is thus opaque to the third-party managed protocol 350. A Participant $P_2$ 330 acting within a requestor role utilizes the third-party managed protocol 350 in order to receive a transfer of data that has been attested to or to attempt to corroborate data derived from data that the Participant $P_2$ 330 has acquired from the Entity E 340. Such Attestation may involve a dataType. Such Attestation may involve a representation of information associated with or related to the Entity $E_j$ 340, where such representation may be blinded. Preferably, the inquiring Participant $P_2$ 330 and the attesting Participant $P_1$ 310 do not become aware of each other's true or even their pseudonymous identity. Preferably, the Participant $P_1$ 310 does not become aware of the Entity E 340 at least prior to some potentially system-enforced delay, even if the Entity E 340 is the same as the Entity E 320. Such delay may be measured, for example, in time or periodicity or transaction volume.

Figure 4:
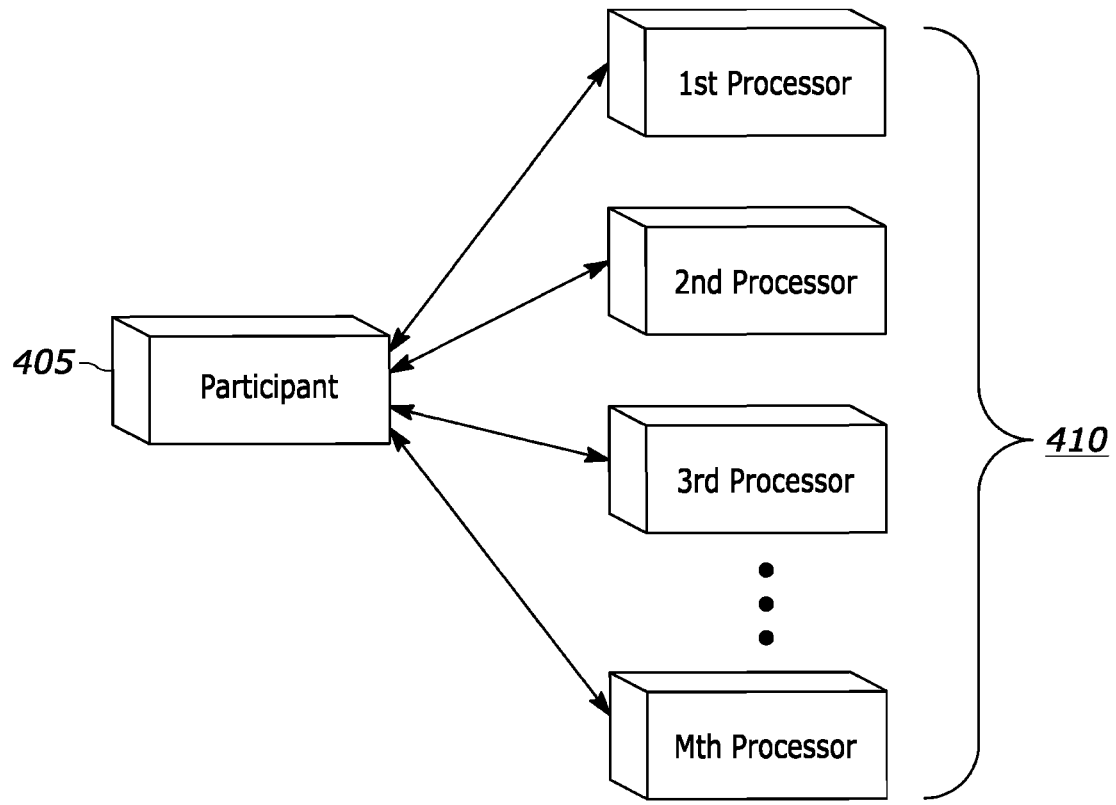
FIG. 4 comprises a flow diagram as configured in accordance with various embodiments of these teachings and that illustrates an overview of potential embodiments to utilized for tokenization processing through the use of sequential and/or parallel processors. The transmissions depicted in FIG. 4 may include an overlay such as encryption that is subsequently decrypted, that is not explicitly shown.

Now referring to FIG. 4, "Type A" and "Type B" tokenization both involve handling by the Participant 405 and Processors 410 (illustrated in FIG. 4 as a first Processor through an Mth Processor). This handling my involve any number of Processors 410 acting in a sequential manner and Processors 410 acting in a parallel manner. If one or more of the Processors 410 are acting in a sequential manner, the first sequential Processor 410 acts on the blinded data (which may have been acted on by other Processors 410 already), returns the result to the Participant 405 and the next sequential Processor 410, if any, receives the material and acts on it before sending it back to the Participant 405, and so on. If two or more of the Processors 410 are involved in acting in a parallel manner, each such involved Processor 410 receives the same material, acts in a similar manner, and the Participant 405 receives material from each such involved processor 410. Alternatively or additionally to all intermediate tokenization results being forwarded to the Participant, the system can potentially be configured so that one or more processors communicate directly with one another, e.g, if an intermediate tokenization result does not require modification by the Participant prior to it being provided to follow-on processor(s). More Processors 410 (sequential or parallel) may be added after the system has already been configured and is in operation. However, a migration of old tokens to new tokens must occur if there are any changes or additions to processor secrets that cause a change in tokenization results. This type of migration is described in the embodiments in FIG. 26 and FIG. 27.

Figure 5:
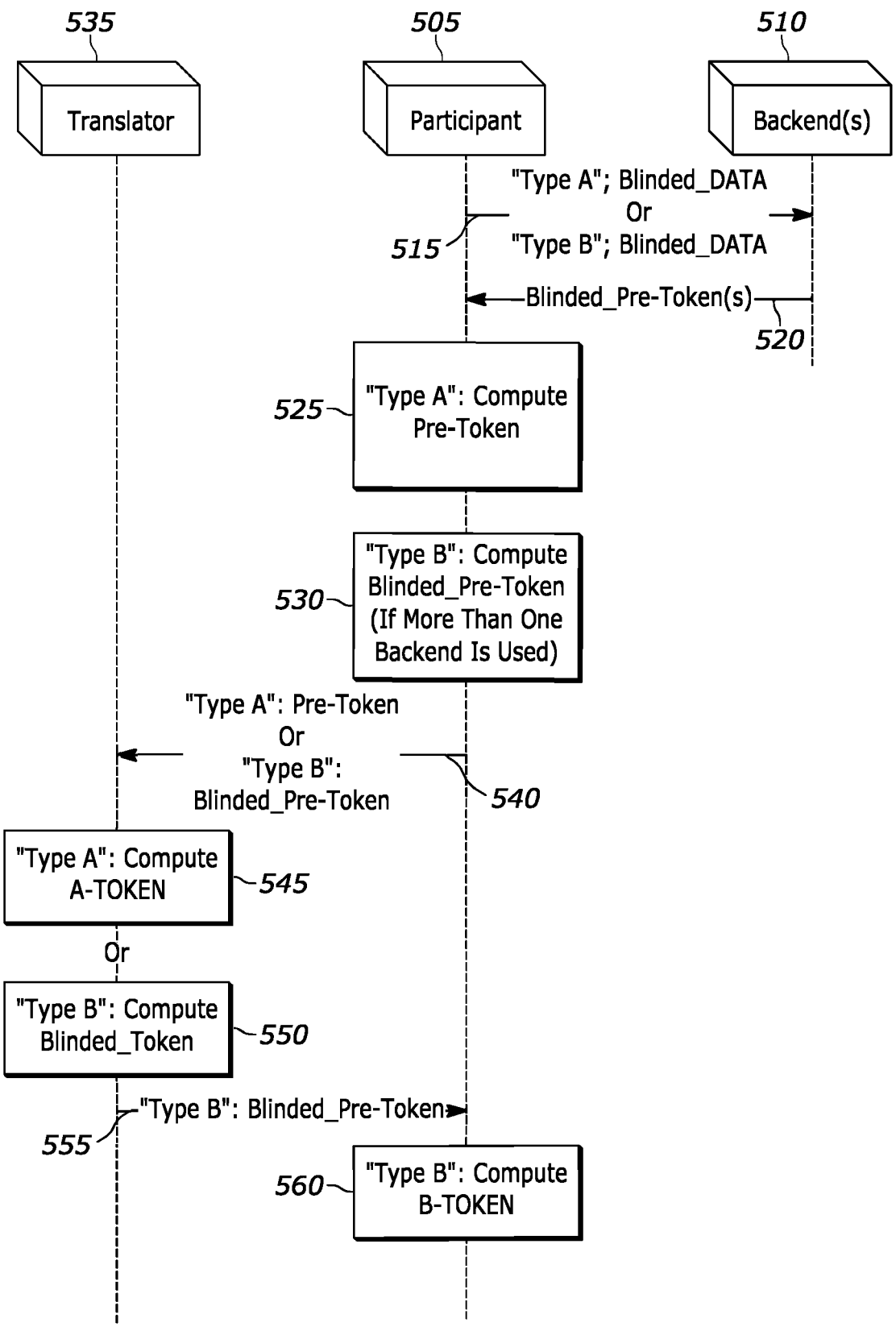
FIG. 5 comprises a flow diagram as configured in accordance with various embodiments of these teachings and that illustrates uniform tokenization processing of "Type A" and "Type B" tokens through the use of Backend(s) and a Translator where Backends can act in parallel with each other and sequentially with a Translator. The transmissions depicted in FIG. 5 may include an overlay such as encryption that is subsequently decrypted, that is not explicitly shown.

Now referring to FIG. 5, "Type A" and "Type B" flows may be combined in such a way that the processing for both types may be done simultaneously. This may be done using a single Backend or two parallel Backends. FIG. 6, expands upon the depiction of the differences in processing.

To begin processing, a Participant 505 sends to the Backend 510 (or multiple Backends 510 if such are utilized in parallel) at communication 515: ["Type A"; Blinded_DATA=eP]; or ["Type B"; Blinded_DATA=eP] where P is the elliptic curve point representation of (potentially normalized) raw input DATA that is used in the A-TOKEN or B-TOKEN request, and e is preferably randomly generated. If utilizing a single Backend 510, the Participant 505 receives at communication 520: ["Type A"; Blinded_Pre-Token=$bb_A$ eP]; or ["Type B"; Blinded_Pre-Token=$bb_B$ eP]. If utilizing two Backends 510, at communication 520 the Participant 505 receives from Backend X: ["Type A"; Blinded_Pre-Token$_X$=$bb_{XA}$ eP]; or ["Type B"; Blinded_Pre-Token$_X$=$bb_{XB}$ eP] and receives from Backend Y: ["Type A"; Blinded_Pre-Token$_Y$=$bb_{YA}$ eP]; or ["Type B"; Blinded_Pre-Token$_Y$=$bb_{YB}$ eP]. If utilizing a single Backend 510, for "Type A" at block 525 the Participant 505 computes Pre-Token=$e^{-1}$ (Blinded_Pre-Token)=$bb_A$P or for "Type B", at block 530 the Participant 505 leaves the Blinded_Pre-Token alone. If utilizing both Backends 510, for "Type A", at block 525 the Participant 505 computes Pre-Token=$e^{-1}$ (Blinded_Pre-Token$_X$+Blinded_Pre-Token$_Y$)=$(bb_{XA}+bb_{YA})$P or for "Type B", at block 530 the Participant 505 computes Blinded_Pre-Token=Blinded_Pre-Token$_X$+Blinded_Pre-Token$_Y$=$(bb_{XA}+bb_{YA})$eP. The Participant 505 sends to the Translator 535 at communication 540: ["Type A"; Pre-Token]; or ["Type B"; Blinded_Pre-Token]. At block 545, in the case of a "Type A" computation, the Translator 535 computes A-TOKEN=hash ($tt_A$(Blinded_Pre-Token)=hash ($tt_A bb_A$P), where $bb_A$=($bb_{XA}$+$bb_{YA}$) if two Backends 510 were utilized. At block 550, in the case of a "Type B" computation, the Translator 535 computes Blinded_Token=$tt_B$(Blinded_Pre-Token)=$tt_B bb_B$eP, where $bb_B$=($bb_{XB}$+$bb_{YB}$) if two Backends 510 were utilized, and sends the Blinded_Token back to the Participant 505 at communication 555. At block 560, in the case of a "Type B" computation, the Participant 505 derives the following by applying $e^{-1}$ and hashing: B-TOKEN=hash($e^{-1}$Blinded_Token)=hash($tt_B bb_B$P).

FIG. 5 depicts the case where $e^{-1}$ is applied directly by the Participant 505 resulting in Pre-Token, whether for "Type A" or "Type B" tokenization. Note that FIG. 2 in U.S. Provisional application No. 63/075,933, as incorporated fully herein by this reference, instead depicts sending Blinded_Pre-Token and $e^{-1}$ for "Type A" tokenization. This does not incur additional risk in the context of only one Backend 510 and a Translator 535, as depicted there. As expressed in the accompanying text there, the fact that the elliptic curve Diffie-Hellman (ECDH)-protected bidirectional communication channel between the Participant 505 and the (single) Backend 510 is preferably computationally independent of that between the Participant 505 and the Translator 535, unintended leakage between the Backend 510 and Translator 535 is thwarted. Furthermore, in that case of a single Backend 510 and a Translator 535 there is equivalence, under a Backend-Translator collusion scenario, of the Participant 505 directly removing e vs. providing the Translator 535 with $e^{-1}$, in the following sense: even without knowledge of $e^{-1}$, a non-compliant Translator 535 could provide the Backend 510 with $bb_A$P, which the non-compliant Backend 510 could use to recover P by inverting out $bb_A$—which is mathematically equivalent to having the non-compliant Backend 510 apply $e^{-1}$ (given to it by the non-compliant Translator 535) to eP that it received from the Participant 505. This observation does not take into account the potential use of hardware security modules (HSMs) that might prevent even insiders at processors from accessing certain keys and/or intermediate values. The equivalence does not hold in the case of multiple Backends 510 contributing towards tokenization: if a non-compliant Translator 535 supplies a non-compliant Backend 510, say, Backend X, with $e^{-1}$, then Backend X can recover P from eP. However, if the Translator 535 is not provided access to $e^{-1}$, then (in the two Backend 510 example), the Translator's 535 knowledge of ($bb_{XA}$+$bb_{YA}$)P and Backend X's knowledge of $bb_{XA}$ together do not provide information about P (i.e., without collusion-with or compromise-of Backend Y).

When generating A-TOKENs, if no Backend-generated HMAC values, denoted as HMACvalues, are to be layered on that require the Translator's 535 knowledge equivalent to $e^{-1}$ in order to directly transpose outputs from the Backends 510, then $e^{-1}$ is preferably instead applied directly by the Participant 505 to the sum of the outputs of the Backends 510. This denies effective collusion between just one of the Backends 510 and the Translator 535 that would result in exposing the unblinded elliptic curve point representation of DATA. An example of recommended discontinuation of provisioning of $e^{-1}$ and individual Backend 510 outputs to the Translator 535 is at the conclusion of migration that entails adding a coprocessor. Note that ongoing audit of Coordinator-retained DATA is not vulnerable in that such DATA is already made available to the Translator 535/Coordinator directly via the Participant 505.

Now referring to FIG. 6, the two embodiments depicted therein initiated by the Participant 605 utilize either one or two Backends (Backend X 615 and Backend Y 620) in parallel. To begin processing, a Participant 605 sends to the Backend 610 (or both Backend X 615 and Backend Y 620 if two are utilized) at communication 625: ["Type A"; Blinded_DATA=eP]; or ["Type B"; Blinded_DATA=eP] where P is the elliptic curve point representation of (potentially normalized) raw input DATA that is used in the A-TOKEN or B-TOKEN request, and e is preferably randomly generated. This means that the Participant 605 will send the same information to each Backend (610 or (615 and 620)) (whether there are one or two) simultaneously and each Backend will go through processing in parallel. If utilizing a single Backend 610, the Participant 605 receives from the Backend 610 at communication 630: ["Type A"; Blinded_Pre-Token=$bb_A$ eP]; or ["Type B"; Blinded_Pre-Token=$bb_B$eP]. If utilizing two Backends 610, the Participant 605 receives from Backend X 615 at communication 635: ["Type A"; Blinded_Pre-Token$_X$=$bb_{XA}$ eP]; or ["Type B"; Blinded_Pre-Token$_X$=$bb_{XB}$ eP] and the Participant 605 receives from Backend Y 620 at communication 640: ["Type A"; Blinded_Pre-Token$_Y$=$bb_{YA}$ eP]; or ["Type B"; Blinded_Pre-Token$_Y$=$bb_{YB}$ eP]. Notice that it may be desirable to supplement these parallel processors with an additional sequential coprocessor (which could potentially be enhanced by an additional parallelizable coprocessor) followed sequentially by a Translator.

Figure 7:
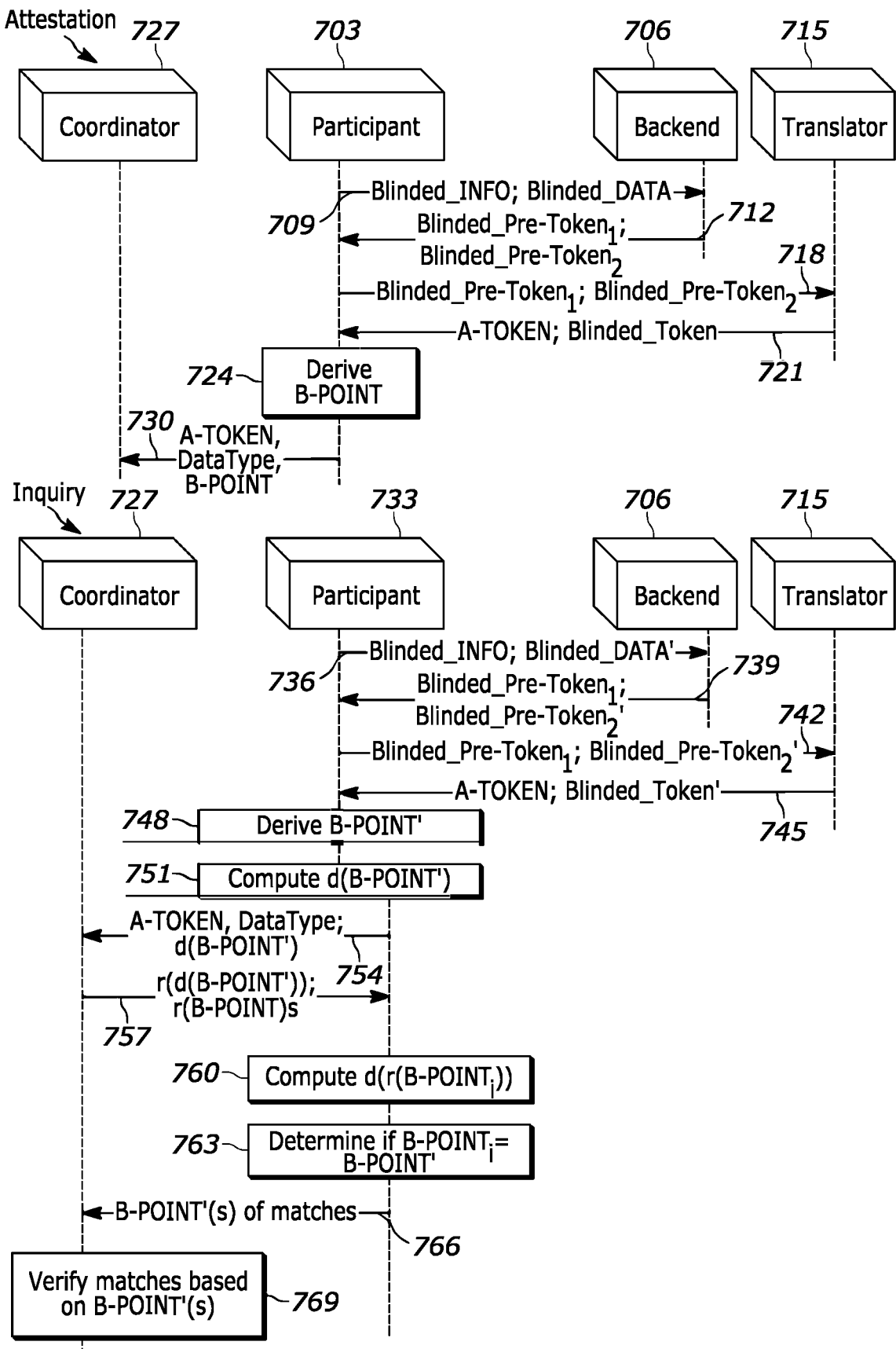
FIG. 7 comprises a flow diagram as configured in accordance with various embodiments of these teachings and that illustrates attesting and inquiring to enable corroboration through the use of a "PSI Scheme 1" protocol, including communication with processors including a Backend and a Translator, and a Coordinator. The transmissions depicted in FIG. 7 may include an overlay, such as encryption that is subsequently decrypted, that is not explicitly shown.
Figure 8:
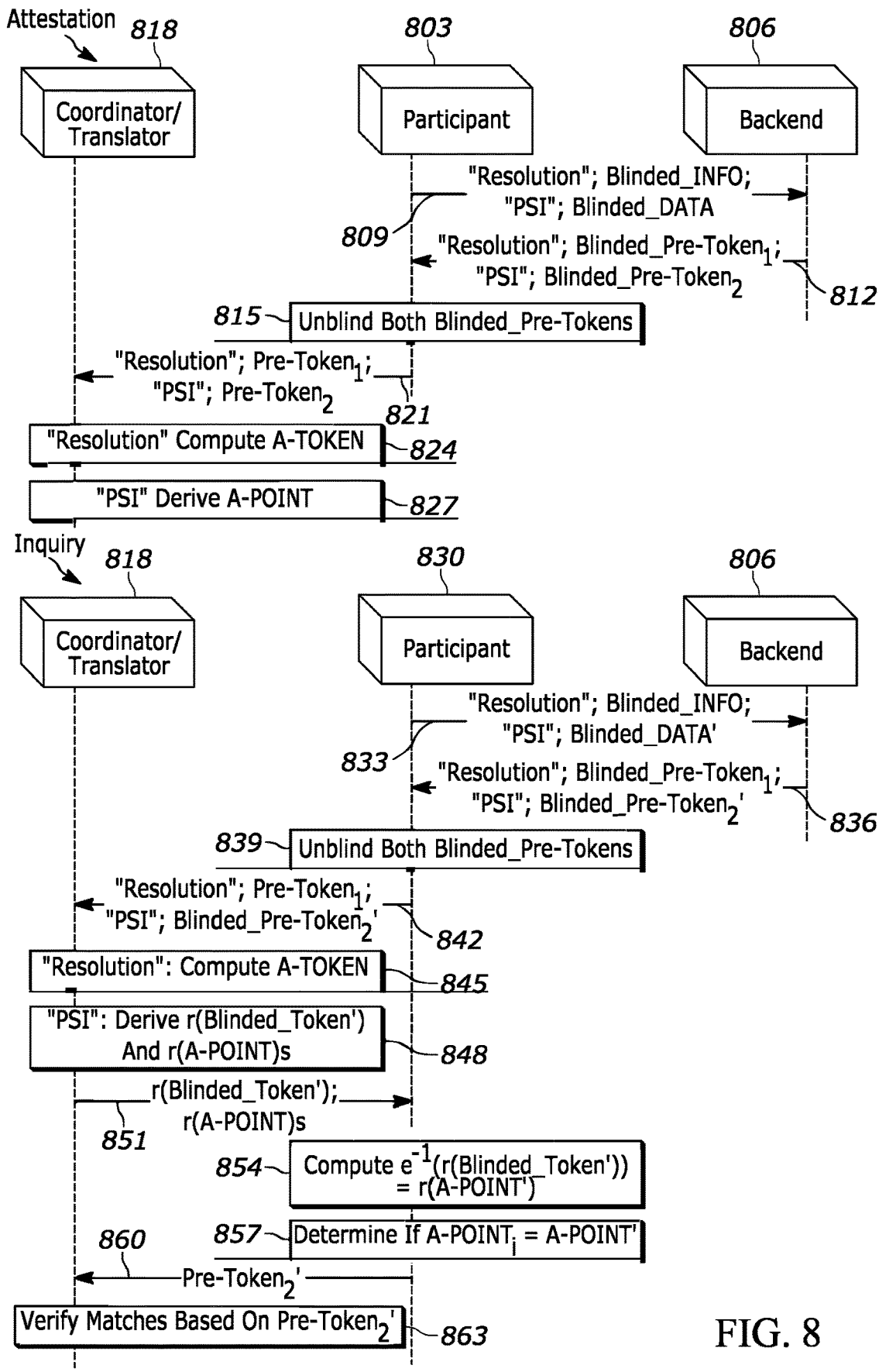
FIG. 8 comprises a flow diagram as configured in accordance with various embodiments of these teachings and that illustrates an alternative embodiment of attesting and inquiring to enable corroboration through the use of a "PSI Scheme 2" protocol, including communication with processors including a Backend and a Translator, and a Coordinator. The transmissions depicted in FIG. 8 may include an overlay, such as encryption that is subsequently decrypted, that is not explicitly shown.
Figure 9:
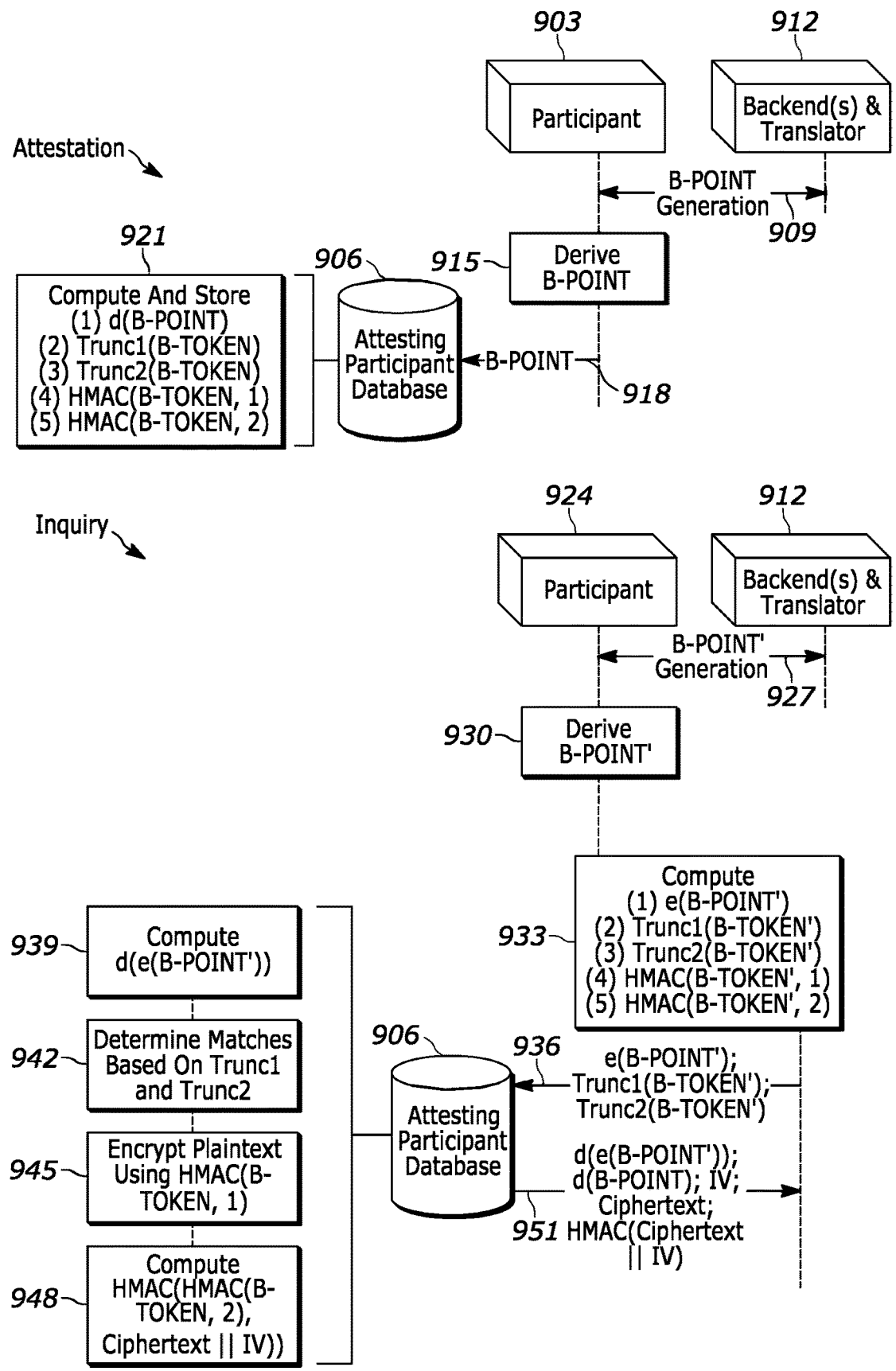
FIG. 9 comprises a flow diagram as configured in accordance with various embodiments of these teachings and that illustrates attesting by a single attestor and inquiring to enable corroboration through the use of a "PSI Scheme 3" protocol, including communication with processors including Backend(s) and a Translator, and a third-party intermediary accessing a single attestor database or an attestor consortium database (denoted as an Attestor Participant Database). The transmissions depicted in FIG. 9 may include an overlay, such as encryption that is subsequently decrypted, that is not explicitly shown.
Figure 10:
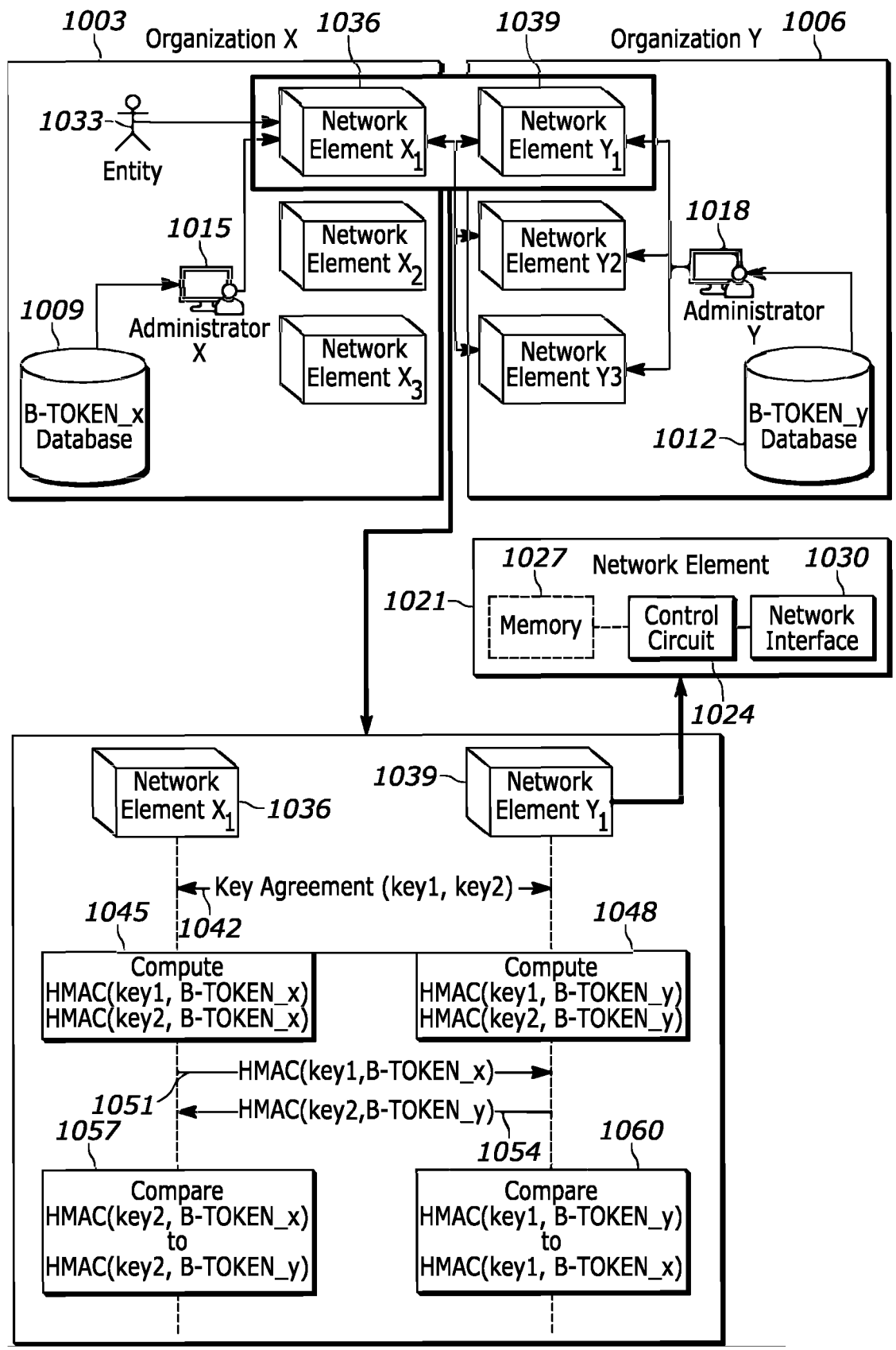
FIG. 10 comprises a flow diagram as configured in accordance with various embodiments of these teachings and that illustrates peer-to-peer communication between network elements utilized by network users of sponsoring organizations to enable corroboration through the use of a "PSI Scheme 4" protocol. The transmissions depicted in FIG. 10 may include an overlay, such as encryption that is subsequently decrypted, that is not explicitly shown.

FIG. 7, FIG. 8, FIG. 9. and FIG. 10 depict constructs that build upon the concept of private set intersection (PSI). These PSI-based designs will therefore be referred to as PSI Schemes 1, 2, 3, and 4, respectively. PSI Schemes 1 and 2 utilize a Coordinator to manage the protocol between attestors and requestors and store necessary content. However, the Coordinator does not possess the ability to determine the intersection themselves. In contrast, PSI Schemes 3 and 4 do not utilize a Coordinator, but instead in PSI Scheme 3 a Participant will query a single attestor's database (or a database dedicated to a consortium of attestors) and in PSI Scheme 4, peers (or network users) communicate directly via network elements to accomplish the protocol.

Referring now to FIG. 7, stepping through Attestation: the attesting Participant 703 requests an A-TOKEN and a B-POINT by submitting to the Backend 706 at communication 709: ["Resolution"; Blinded_INFO=$e_1P_1$] and ["PSI"; Blinded_DATA=$e_2P_2$] where $P_1$ is the elliptic curve point representing the (appropriately padded) INFO that is used in the entity resolution A-TOKEN request, $P_2$ is the elliptic curve point representing the (appropriately padded) DATA that is used in the PSI B-POINT request and $e_1$, $e_2$ are preferably randomly generated. The attesting Participant 703 receives from the Backend 706 at communication 712: ["Resolution"; Blinded_Pre-Token$_1$=$bb_1e_1P_1$] and ["PSI"; Blinded_Pre-Token$_2$=$bb_2e_2P_2$]. The attesting Participant 703 submits to the Translator 715 at communication 718: ["Resolution"; Blinded_Pre-Token$_1$]; ["PSI"; Blinded_Pre-Token$_2$]; and $e_1^{-1}$ (or, equivalently, $e_1$). The Translator 715 unblinds Blinded_Pre-Token$_1$ by applying $e_1^{-1}$: Pre-Token$_1$=$e_1^{-1}$ (Blinded_Pre-Token$_1$)=$e_1^{-1}$ $bb_1e_1P_1$=$bb_1P_1$. The Translator 715 applies $tt_1$ to Pre-Token$_1$ and hashes: A-TOKEN=hash($tt_1$(Pre-Token$_1$))=hash($tt_1bb_1P_1$). Alternatively to applying $e_1$ followed by applying $tt_1$, the Translator applies mod n, where n is the order of the elliptic curve group. The Translator 715 applies $tt_2$ to Blinded_Pre-Token$_2$: Blinded_Token=$tt_2$ (Blinded_Pre-Token$_2$))=$tt_2 bb_2e_2P_2$. The Translator 715 sends back to the attesting Participant 703 at communication 721: ["Resolution"; A-TOKEN] and ["PSI"; Blinded_Token]. At block 724, the attesting Participant 703 unblinds Blinded_Token by applying $e_2^{-1}$: $e_2^{-1}$ (Blinded_Token)=$e_2^{-1}$ ($tt_2bb_2e_2P_2$)=$tt_2bb_2P_2$. The attesting Participant 703 derives B-TOKEN=hash($tt_2bb_2P_2$), then derives B-POINT, a deterministically generated representation of B-TOKEN as an elliptic curve point. This can be done analogously to the way an INFO value or DATA value is converted to an elliptic curve point P. For the sake of ease in analysis, one may choose (as shown here) to generate B-POINT from B-TOKEN rather than exposing the pre-image of hash($tt_2bb_2P_2$)=B-TOKEN, i.e., $tt_2bb_2P_2$ to the Coordinator 727. The attesting Participant 703 submits [A-TOKEN; dataType; B-POINT] to the Coordinator 727 for Attestation at communication 730. Note that a technique for appropriately padding INFO is discussed in U.S. patent application Ser. No. 16/817,483 (paragraph [0149].

Stepping through Inquiry: the inquiring Participant 733 requests an A-TOKEN and B-TOKEN', by submitting to the Backend 706 at communication 736: ["Resolution"; Blinded_INFO=$e_1P_1$] and ["PSI"; Blinded_DATA'=$e_2P_2'$] where $P_1$ is the elliptic curve point representing the (appropriately padded) INFO that is used in the entity resolution A-TOKEN request, $P_1'$ is the elliptic curve point representing the (appropriately padded) DATA' that is used in the PSI B-POINT' request and $e_1$, $e_2$ are preferably randomly generated. Note that the notation' as used herein is meant to reflect a candidate value (such as DATA' attempting to match on DATA). Here it is assumed that the A-TOKEN (i.e., INFO) matched and therefore $P_1'$=$P_1$ as otherwise the process would be over. The inquiring Participant 733 receives from the Backend 706 at communication 739 and sends to the Translator 715 at communication 742: ["Resolution"; Blinded_Pre-Token$_1$=$bb_1e_1P_1$] and ["PSI"; Blinded_Pre-Token$_2$'=$bb_2e_2P_2'$]. The Translator 715 unblinds the value Blinded_Pre-Token$_1$ and applies the Translator's 715 secret by applying and hashes the result to derive A-TOKEN=hash ($e_1^{-1}tt_1$ (Blinded_Pre-Token$_1$))=hash($tt_1bb_1P_1$). The Translator 715 applies $tt_2$ to Blinded_Pre-Token$_2$': Blinded_Token'=$tt_2$ (Blinded_Pre-Token$_2$))=$tt_2bb_2e_2P_2'$. The Translator 715 sends back to the inquiring Participant 733 at communication 745: ["Resolution"; A-TOKEN] and ["PSI"; Blinded_Token']. At block 748, the inquiring Participant 733 unblinds Blinded_Token' by applying $e_2^{-1}$:$e_2^{-1}$ (Blinded_Token')=$e_2^{-1}$($tt_2bb_2e_2P_2'$)=$tt_2bb_2P_2'$. The inquiring Participant 733 derives B-TOKEN'=hash($tt_2bb_2P_2$), and submits to the Coordinator 727 at communication 754: A-TOKEN, dataType and d(B-POINT') (computed at block 751) for a preferably randomly generated value d, where B-POINT' is a deterministically generated representation of B-TOKEN' as an elliptic curve point. In an alternative embodiment, the Translator 715 does not return the "Type A" Resolution A-TOKEN at all to the inquiring Participant 733, but instead provides it directly to the Coordinator 727 (which may be co-hosted with the Translator 715).

Using a value r that is secret to the Coordinator 727, the Coordinator returns to the inquiring Participant 733 at communication 757 r(d(B-POINT')) and one or more r(B-POINT) where such B-POINT values were previously submitted by attesting Participants 703 using that A-TOKEN and dataType. If, for any of the received r(B-POINT), locally computed d(r(B-POINT)) (at block 760) equals the received value r(d(B-POINT')), then the inquiring Participant 733 identifies which r(B-POINT) that the Coordinator 727 sent matched (at block 763 and depicted as the $i^{th}$ one for some i in FIG. 7) and the inquiring Participant 733 sends matching B-POINT' (s) and the corresponding i value(s) at communication 766. There may be several i values for a single B-POINT' as there may be several instances of the same r(B-POINT) because several attesting Participants 703 may have attested to the same value of DATA (in tokenized form as B-POINT). The Coordinator 727 compares the received B-POINT' to the identified B-POINT at block 769. If it matches, then (unless the Participant colluded) the inquiring Participant 733 had apparently submitted blinded $P_2$ at communication 736 (where $P_2=P_2'$).

Alternatively to the description above, the Coordinator 727 may eliminate pluralities when sending r(B-POINT)(s) back to the inquiring Participant 733 and (optionally) inform the inquiring Participant 733 of the degree of pluralities as referenced by i. It is preferable to prevent an undetectable false result provided by a malicious actor at the Coordinator 727 that indicates DATA=DATA' when in reality DATA≠DATA'. This case is referred to as a false positive (similarly to use of the term "false positive" in U.S. patent application Ser. No. 16/817,483). The Coordinator 727 cannot invert out d in order to send a false positive by computing r(B-POINT') from d(B-POINT'). This method does apparently also have the desirable property that an inquiring Participant 733 cannot do offline determination of DATA values that were attested to, since there is reliance on the Coordinator 727 to process each such B-POINT' guess by multiplying it by r. The Coordinator 727 cannot determine on its own whether or not the inquiring Participant 733 achieved a match of candidate data against attested-to data. The inquiring Participant 733 cannot successively send a false positive, but it could simply send false negatives or refuse to respond to the Coordinator 727. The Coordinator 727 can determine which Attestations for a given A-TOKEN and dataType match on DATA, since B-TOKEN (and hence B-POINT) derived from a given value of DATA is, by design, invariant across Participants.

In the embodiment depicted in FIG. 7, a B-POINT is derived by the Participant by unblinding a Blinded_Token and hashing to form B-TOKEN and then deriving an elliptic curve point. This is consistent with private set intersection (PSI) in the prior art in its use of hash values computed over a representation of data to be checked for matches. It is desirable, however, to be able to increase bandwidth efficiency and/or computational efficiency.

Relevant to FIG. 8, by one approach, tokenization processors, by responding to tokenization requests from requesting network elements, act to enable the coordinating network element to manage a protocol, where: the requesting network element, when acting as an attestor role, as one network element of network elements acting as an attestor role removes a blinding factor from one or more intermediate tokenization values received from a first tokenization processor or from a plurality of first tokenization processors, wherein the removing is done prior to the requesting network element requesting tokenization completion by a second tokenization processor or by a plurality of second tokenization processors; the requesting network element, when acting as a requestor role, self-determines which data values it holds in common with one or more of the network elements acting as an attestor role, by using a response received from the coordinating network element either to remove a blinding factor that the requesting network element, when acting as a requestor role, applied to communicate with one or more of the tokenization processors, or to further apply the blinding factor that the requesting network element, when acting as a requestor role, applied to communicate with the one or more of the tokenization processors.

Now referring to FIG. 8, consequently, an alternative embodiment of the private set intersection principle can be applied simultaneously with tokenization of data rather than as an overlay procedure.

Stepping through Attestation: The attesting Participant 803 requests an A-TOKEN and an A-POINT by submitting to the Backend 806 at communication 809: ["Resolution"; Blinded_INFO=$e_1P_1$] and ["PSI"; Blinded_DATA=$e_2P_2$] where $P_1$ is the elliptic curve point representing the (appropriately padded) INFO that is used in the entity resolution A-TOKEN request, $P_2$ is the elliptic curve point representing the (appropriately padded) DATA that is used in the PSI A-POINT request and $e_1$, $e_2$ are preferably randomly generated. The attesting Participant 803 receives from the Backend 806 at communication 812: ["Resolution"; Blinded_Pre-Token$_1$=$bb_1e_1P_1$] and ["PSI"; Blinded_Pre-Token$_2$=$bb_2e_2P_2$]. At block 815, the attesting Participant 803 unblinds Blinded_Pre-Token' and Blinded_Pre-Token$_2$ by applying $e_1^{-1}$ and $e_2^{-1}$, respectively, where: Pre-Token$_1$=$e_1^{-1}$ (Blinded_Pre-Token$_1$)=$bb_1e_1P_1$=$bb_1P_1$ and Pre-Token$_2$=$e_1^{-1}$ (Blinded_Pre-Token$_2$)=$e_2^{-1}$ $bb_2e_2P_2$=$bb_2P_2$. The attesting Participant 803 submits to the Coordinator/Translator 818 at communication 821: ["Resolution"; Pre-Tokens] and ["PSI"; dataType; Pre-Token$_2$]. At block 824, the Coordinator/Translator 818 applies $tt_1$ to Pre-Token$_1$ and hashes: A-TOKEN=hash($tt_1$(Pre-Token$_1$))= hash($tt_1bb_1P_1$). At block 827, the Coordinator/Translator 818 applies $tt_2$ to Pre-Token$_2$: A-POINT=$tt_2$ (Pre-Token$_2$)= $tt_2bb_2P_2$.

Stepping through Inquiry: The inquiring Participant 830 requests an A-TOKEN and an A-POINT by submitting to the Backend 806 at communication 833: ["Resolution"; Blinded_INFO=$e_1P_1$] and ["PSI"; Blinded_DATA'=$e_2P_2'$] where $P_1$ is the elliptic curve point representing the (appropriately padded) INFO that is used in the entity resolution A-TOKEN request, $P_2$ is the elliptic curve point representing the (appropriately padded) DATA' that is used in the PSI A-POINT' request and $e_1$, $e_2$ are preferably randomly generated. The inquiring Participant 830 receives from the Backend 806 at communication 836: ["Resolution"; Blinded_Pre-Token$_1$=$bb_1e_1P_1$] and ["PSI"; Blinded_Pre-Token$_2$'=$bb_2e_2P_2$]. At block 839, the inquiring Participant 830 unblinds Blinded_Pre-Token$_1$ and Blinded_Pre-Token$_2$ by applying $e_1^{-1}$ and $e_2^{-1}$, respectively: Pre-Token$_1$=$e_1^{-1}$ (Blinded_Pre-Token$_1$)=$bb_1P_1$; and Pre-Token$_2$=$e_1^{-1}$ (Blinded_Pre-Token$_2$)=$e_2^{-1}$ $bb_2e_2P_2'$=$bb_2P_2'$. Note that Pre-Token$_2'$ is only utilized in the case of a positive match. Therefore, this calculation could be done later in the case of a positive match to minimize calculation. The inquiring Participant 830 submits to the Coordinator/Translator 818 at communication 842: ["Resolution"; Pre-Token$_1$] and ["PSI"; dataType; Blinded_Pre-Token$_2'$]. At block 845, the Coordinator/Translator 818 applies $tt_1$ to Pre-Token$_1$ and hashes: A-TOKEN=hash($tt_1$(Pre-Token$_1$)=hash($tt_1bb_1P_1$). At block 848, the Coordinator/Translator 818 applies $rtt_2$ mod n to Blinded_Pre-Token$_2$': r(Blinded_Token')=r($tt_2$ (Blinded_Pre-Token$_2$))=r($tt_2bb_2e_2P_2$) where r is preferably randomly generated. The Coordinator/Translator 818 applies r to all A-POINT candidate values: r(A-POINT)=r ($tt_2$(Pre-Token$_2$)=r($tt_2bb_2P_2$). The Coordinator/Translator 818 sends back to the inquiring Participant 830 at communication 851: r(Blinded_Token) and r(A-POINT) candidate values. The Coordinator/Translator 818 cannot invert out the blinding factor imposed by the inquiring Participant 830 in order to send a false positive by computing r(A-POINT) from Blinded_Pre-Token$_2$'. At block 854, the inquiring Participant 830 applies $e_2^{-1}$ to r(Blinded_Token'): r(A-POINT')=$e_2^{-1}$ (r(Blinded_Token'))=$e_2^{-1}$ (rtt$_2$bb$_2$e$_2$P)=r(tt$_2$bb$_2$P$_2$). At block 857, the inquiring Participant 830 determines if there are any matches of their own r(A-POINT') to the received r(A-POINT)s. The inquiring Participant 830 provides Pre-Token$_2$' to Coordinator/Translator 818 only for those in the intersection at communication 860. At block 863, the Coordinator compares r(A-POINT') to stored r(A-POINT) by applying r and tt$_2$ (or (rtt$_2$) mod n) to received Pre-Token$_2$'. If it matches, then (unless the Participant colluded) the inquiring Participant 830 had apparently submitted blinded P$_2$ at communication 833 (where P$_2$=P$_2$').

This method has the desirable property that an inquiring Participant 830 cannot do offline determination of DATA values that were attested to, since there is reliance on the Coordinator/Translator 818 to process each Blinded_Pre-Token$_2$' guess by multiplying it by (rtt$_2$) mod n.

Since the inquiring Participant is capable of using $e_2^{-1}$ as shown above (where $e_2^{-1}$ always exists, for example, in embodiments that use a prime order elliptic curve group), an alternative embodiment could make use of a Bloom filter (or other filter) wherein, e.g., the Coordinator/Translator applies a Bloom filter to the r(A-POINT) candidate values and sends those results to the inquiring Participant rather than the actual r(A-POINT) candidate values. The Participant applies the Bloom filter to r(A-POINT')=$e_2^{-1}$ (r(Blinded_Token'))= $e_2^{-1}$ (rtt$_2$bb$_2$e$_2$P$_2$')=r(tt$_2$bb$_2$P$_2$') in order to check for a match. If in an alternative embodiment of the PSI-based scheme of FIG. 7, the inquiring Participant applied $d^{-1}$ to the received value r(d(B-POINT')), instead of, for the received r(B-POINT) values, locally computing d(r(B-POINT)), a Bloom filter could have been used by the Coordinator and the Participant, respectively, instead. Alternatively to using $e_2^{-1}$ in the PSI-based scheme of FIG. 8, e$_2$ could have been applied similarly to the way d is applied in the depicted embodiment of the scheme of FIG. 7. Relative to the scheme of FIG. 8 and an alternative embodiment, this choice of applying either $e_2^{-1}$ or e$_2$ corresponds to the requesting network element, when acting as a requestor role, self-determining which data values it holds in common with one or more of the network elements acting as an attestor role, by using a response received from the Coordinator/Translator either to remove a blinding factor the requesting network element, when acting as a requestor role, applied to communicate with the Backend, or to further apply the blinding factor the requesting network element, when acting as a requestor role, applied to communicate with the Backend.

A solution to allow customers to query an organization's datasets without revealing to that organization the query parameters or results is desirable. This is achievable with the Attributes Registry as described in FIG. 11, but that solution requires an intermediary to host a Coordinator that would have the tokenized data stored. For some use cases this is acceptable, but at scale, organizations may be reluctant to upload a large amount of data into a technology provider's infrastructure, even in tokenized form. So it would be powerful to modify the system to fit the following properties: (1) Requestors can query data owned by a single attestor using any combination of attributes and receive arbitrary metadata associated with matching record; (2) the sole attestor cannot learn: the (raw) values that Requestors use to query the attestor's data; which records matched a Requestor's query or what information was returned as a result; (3) the only service not hosted by the Attestor or Requestor is the Backend(s) and Translator—i.e. there is no independent Coordinator, only an Attesting Participant Database that is hosted by a third-party intermediary.

Relevant to FIG. 9, by one approach, a third-party intermediary manages a protocol to communicate with a requesting network element acting as a requestor role, where: the third-party intermediary acts to store truncated tokens resulting from applying a truncation function to locally-held first representations of a first set of tokens as associated to blinded tokens resulting from application of a first blinding factor to second representation of the first set of tokens, wherein the requesting network element acting as a requestor role transmits to the third-party intermediary a first request part comprised of the truncated tokens resulting from applying the truncation function to third representations of a second set of tokens and a second request part comprised of the blinded tokens resulting from application of a second blinding factor to fourth representations of the second set of tokens; and the third-party intermediary acts to limit which blinded tokens it includes within a response to the requesting network element acting as a requestor role to, at most, those associated with stored truncated tokens that match the truncated tokens as those included within the first request part, and also includes within the response to the requesting network element acting as a requestor role a result of applying the first blinding factor to the blinded tokens as those included within the second request part.

Now referring to FIG. 9, suppose dataType is absorbed into tokenization of attributes (although dataType can also be stored initially alongside the corresponding Token, with potential deletion from the database at a later date). Since there is a trusted relationship between the single attesting Participant 903 and the Attesting Participant Database 906 absorbing the dataType into the tokenization should not pose a problem of malfeasance. More generally, there may be a trust relationship between a consortium of attesting Participants 903 (also known as an attestor consortium) and an Attesting Participant Database 906.

Stepping through Attestation: the single attesting Participant 903 requests a B-POINT for each piece of DATA they wish to attest to by submitting Blinded_(DATA∥dataType)= eP where P is the elliptic curve point representing the (appropriately padded) (DATA∥dataType), e is preferably randomly generated, and "∥" represents concatenation. B-POINT is generated at communication 909 by submitting requests to the Backend(s) and Translator 912 and the B-POINT (where B-TOKEN=hash(B-POINT)) is the point finally derived at block 915 by unblinding the received Blinded_Token. Therefore, Tokens within this setting do not have a final hash applied (in order to efficiently enable the PSI processing). The raw attributes still, however, are conditioned through the padding and hashing process in order to acquire x-coordinates of elliptic curve points. The single attesting Participant 903 then supplies Attested-to B-POINTs (and dataTypes) to the Attesting Participant Database 906 at communication 918, unless this delivery is requested to be handled by the Coordinator. In the case that the Coordinator handles the requests and sends them to the Attesting Participant Database 906, the processing of this Token is actually done by "Type A" tokenization and therefore unblinded before it is received by the co-located Coordinator/Translator and therefore is seen by the Coordinator. In the case of an Inquiry, the tokenization is preferably "Type B" where the B-TOKENs remain shielded from access by the Coordinator, as made clear below. The Attesting Participant Database 906 may be managed by the single attesting Participant 903 themselves, or they may outsource this to a third-party. The Attesting Participant Database 906 stores alongside each B-POINT five additional values at block 921, where HMAC (k, x) represents applying HMAC on plaintext x using key k, and Trunc1 and Trunc2 denote truncation functions applied to representations of tokens (resulting in truncated tokens): (1) the scalar multiple, d(B-POINT), computed using the Attesting Participant Database's 906 relatively static Pohlig-Hellman secret d as a scalar multiplier; (2) Trunc1 (B-TOKEN); (3) Trunc2 (B-TOKEN); (4) HMAC (B-TOKEN, 1); (5) HMAC (B-TOKEN, 2). Trunc1 truncation is used for entity resolution and Trunc2 truncation is used for entity-resolution-dependent corroboration. Trunc1 and Trunc2 degrees of truncation are not determined in this description. However, they can be appropriately designated upon implementation. As an example of Trunc1 and Trunc2, Trunc1 (B-TOKEN)= the $n_1$ least significant bits of B-TOKEN, and Trunc2 (B-TOKEN)=the $n_2$ least significant bits of B-TOKEN, for some integer values of $n_1$ and $n_2$ as degrees of truncation. Alternatively to storing both B-POINT (as locally-held) and d(B-POINT), the database can store each B-POINT only in its d(B-POINT) form (as locally-held), since the B-POINTs are recoverable, if need be, by using securely stored d or $d^{-1}$ mod n. An example of such need is if Trunc1 and/or Trunc2 values need to be recomputed because of alteration in optimal degree of truncation (i.e., balancing leakage against communications- and computational-complexity).

Stepping through Inquiry: An inquiring Participant 924 submits requests to the Backend(s) and Translator 912, respectively, at communication 927 for "Type B" tokenization of an ordered list of attributes, preferably without indication of dataTypes and preferably without indication of which or how many are to be used for entity resolution and which or how many are to be used for entity-resolution-dependent corroboration. For each piece of (DATA∥dataType)[1] about which they wish to perform Inquiry, the Participant submits Blinded (DATA∥dataType)' =eP' where P is the elliptic curve point representing the (appropriately padded) (DATA∥dataType)' and e is preferably randomly generated. These (B-POINT')s may be generated by utilizing multiple Backends in a parallel manner or a single Backend. If the Coordinator is involved, it is made aware that the Participant's request for tokenization is for (B-POINT')s that will not be made accessible to the Coordinator for the purpose of Inquiry. If the Translator and Coordinator functions are fully separated, then the Coordinator plays no role in this tokenization process initiated by inquiring Participants 924. The inquiring Participant 924 receives the requested (ordered) set of (self-blinded) B-POINT's at communication 927 and separates those intended for entity resolution from the rest. At block 930, the inquiring Participant 924 unblinds all (by applying $e^{-1}$ mod n, where e is the blinding factor), and at block 933 applies Trunc1 to those B-TOKEN's that it has selected for entity resolution, and Trunc2 to the others. The inquiring Participant 924 computes and retains the HMAC (B-TOKEN, 1) and HMAC (B-TOKEN', 2) values at block 933 as well, as ordered in accordance with the e(B-POINT') values to be sent to the Attesting Participant Database 906. The request at communication 936 to the Attesting Participant Database 906 includes the e(B-POINT') values, and either Trunc1 (B-TOKEN') or Trunc2 (B-TOKEN') for each B-POINT', as well as an indication of which combination(s) of which B-POINT's are to be used for entity resolution. The inquiring Participant 924 also supplies the dataTypes if the Attesting Participant Database 906 has currently retained dataTypes that were received during Attestation. The Attesting Participant Database 906 applies d as a scalar multiplier to all received e(B-POINT') values at block 939 and determines which of its stored d(B-POINT) values to return to the Requestor at block 942. For each such selected d(B-POINT) value, the Attesting Participant Database 906 Characterizes it and also returns Null or IV, AES-CBC Ciphertext computed at block 945 and HMAC(HMAC_Key, Ciphertext∥IV) computed at block 948 where (stored and/or dynamically generated) Metadata/additional data, if any, associated with the Token constitutes Plaintext and the AES-CBC key is HMAC (B-TOKEN, 1) and HMAC_Key=HMAC (B-TOKEN, 2). This Characterization is provided to the Participant in the communication 951.

Regarding Characterization: Which subsets of returned d(B-POINT) values meet the entity resolution criteria as set forth by the inquiring Participant 924 (potentially also considering matches against submitted dataTypes, if any) as well as Trunc1 of the associated B-POINT values matching against the respective Requestor-submitted Trunc1 values, and the alignment and grouping together of these against groupings of returned d(B-POINT) values for which the associated Token values match against the respective Requestor-submitted Trunc2 values (potentially also considering matches against submitted dataTypes, if any). The inquiring Participant 924 therefore receives sufficient information to determine (by applying e as a scalar multiplier to the received d(B-POINT) values and comparing them against the received d(e(B-POINT)) values) the Characterization of matches. Where such matches are determined, the inquiring Participant 924 uses the retained HMAC (B-TOKEN', 1) and HMAC (B-TOKEN', 2) values to decrypt received Ciphertext values, if any, and to verify their integrity (as well as that of the IV to assure retrieval of intended Plaintext).

Relevant to FIG. 10, by one approach, a protocol is jointly managed by a first control circuit configured as a first network element and a second control circuit configured as a second network element, where: the first network element is provisioned via a first sponsoring organization with a first set of tokens representing a first set of entities with which a first network user of the first network element has an association; the second network element is provisioned via a second sponsoring organization with a second set of tokens representing a second set of entities with which a second network user of the second network element has an association; the first network element and the second network element establish a first key and a second key; the first network element transmits to the second network element a first message comprised, at least in part, of transformed tokens derived by transforming using the first key a first subset of tokens as a subset of the first set of tokens; the second network element transmits to the first network element a second message comprised, at least in part, of transformed tokens derived by transforming using the second key a second subset of tokens as a subset of the second set of tokens; and at least one of the first network element and the second network element act such that: the first network element compares the transformed tokens of the second message to the first subset of tokens transformed by the first network element using the second key; and the second network element compares the transformed tokens of the first message to the second subset of tokens transformed by the second network element using the first key.

Referring now to FIG. 10, consider a scenario in which a network user from sponsoring Organization X 1003 may wish to determine what records they have in common with network users from sponsoring Organization Y 1006 by communicating directly with them (peer-to-peer), but only a particular type of member of a sponsoring Organization (for example an Administrator) is authorized as a Participant to get Entity IDs tokenized (through a "Type B" secure multiparty tokenization process). The resultant B-TOKENs (held in B-TOKEN_x Database 1009 for Organization X 1003 and held in B-TOKEN_y Database 1012 for Organization Y 1006) are associated with the Entity records held by the Administrator (Administrator X 1015 at Organization X 1003 and Administrator Y 1018 at Organization Y 1006). Each network element 1021 (which includes a control circuit 1024, memory 1027 and a network interface 1030 as described as control circuit 102, memory 103 and a network interface 104 in FIG. 1), as utilized by a network user, may request to be provisioned with the B-TOKENs associated with Entities 1033 that the network user has the authority to access (e.g. a doctor at a hospital relative to the doctor's patient(s) or teacher at a school relative to the teacher's student(s)). The tokens represent Entities with which network users have an association, e.g. a doctor as a network user and the doctor's patients as Entities, and a teacher as a network user and the teacher's students as Entities. This allows a network element to safely utilize HMAC (or a similar keyed one-way function) as opposed to complicated commutative cryptographic techniques within this scheme. It is therefore a computationally efficient form of PSI (that avoids the need for commutative cryptography), where a network element 1036 of Organization X 1003 and a network element 1039 of Organization Y 1006 interact peer-to-peer so as to each ascertain which B-TOKENs they have in common from amongst those they transmit to each other—and (with high probability) learn nothing useful about the other B-TOKENs of the counterparty (or even if they actually correspond to B-TOKENs known by the counterparty).

To begin this process network element $X_1$ 1036 of Organization X 1003 jointly agrees on two HMAC keys, Key1 and Key2 at communication 1042, with each network element 1039 from Organization Y that network element $X_1$ 1036 wishes to communicate with. This can be done through a Key Establishment scheme, e.g., Key Agreement scheme such as Diffie-Hellman Key Exchange. This scheme may be configured to allow for one-pass Diffie-Hellman Key Exchange, which would permit the initiator to send the HMAC values computed on their side along with the Diffie-Hellman Key Exchange setup. For the purpose of simplicity in explanation, this text and figure show the computations between network element $X_1$ 1036 and network element $Y_1$ 1039. However, communications between any of the network elements will be the same. The following makes use of transformed tokens, i.e., tokens transformed via application of a hashed message authentication code such as HMAC or other keyed hash function. Network element $X_1$ 1036 computes over its set of B-TOKEN_x at block 1045: {HMAC (Key1, B-TOKEN_x)} and {HMAC(Key2, B-TOKEN_x)}. If the protocol is so configured, network element $X_1$ 1036 computes another HMAC over the set that will be sent using Key1 as the HMAC key (e.g., over a concatenation of the elements of the set or a hash thereof). Network element $Y_1$ 1039 computes over its set of B-TOKEN_y at block 1048: {HMAC(Key1, B-TOKEN_y)} and {HMAC(Key2, B-TOKEN_y)}. If the protocol is so configured, network element $Y_1$ 1039 computes another HMAC over the set that will be sent using Key2 as the HMAC key (e.g., over a concatenation of the elements of the set or a hash thereof). Network element $X_1$ 1036 sends to network element $Y_1$ 1039 at communication 1051: the set {HMAC(Key1, B-TOKEN_x)} and HMAC(Key1, {HMAC(Key1, B-TOKEN_x)}). Network element $Y_1$ 1039 sends to network element $X_1$ 1036 at communication 1054: the set {HMAC(Key2, B-TOKEN_y)} and HMAC(Key2, {HMAC(Key2, B-TOKEN_y)}). Network element $X_1$ 1036 compares received {HMAC(Key2, B-TOKEN_y)} against its {HMAC(Key2, B-TOKEN_x)} to check for matches at block 1057. Network element $Y_1$ 1039 compares received {HMAC(Key1, B-TOKEN_x)} against its {HMAC(Key1, B-TOKEN_y)} to check for matches at block 1060. Both network element $X_1$ 1036 and network element $Y_1$ 1039 also verify the communicated HMACs over each set. Note that tokenization in the earlier PSI Schemes was to obfuscate the information from the Coordinator (or third-party intermediary). In contrast, tokenization used in this scheme is for the purpose of protecting personal information from the other party before it is determined that there is a match and therefore enabling a more efficient PSI Scheme. However, this more efficient approach cannot be utilized in scenarios where knowing what elements overlapped in the set is considered a leakage and the main goal is data related to the match, instead of the match itself.

It may seem simpler to utilize one key for the HMAC processes as opposed to two. However, this would cause an attack in which one network element may simply wait to send HMAC values until it receives the HMAC(key, B-TOKEN) from the other network user and then send the same HMAC(key, B-TOKEN) back, giving the false impression of matches (also referred to as a false positive). By utilizing two keys, this attack is avoided, as the sender must send HMAC values that were generated using the key that the other network user did not use in the material that was sent over.

The goal of the Attributes Registry is to build a database in which each piece of data (submitted by Attestors) is represented by a token so as to make the database searchable (by Requestors) by any dataType. This allows for an entity resolution-free solution, giving more freedom for analysis, more possibilities to detect fraud and ultimately less limitations. However, it may also be desired for entity resolution to be an option within a given protocol. The following details 3 different schemes with this overall goal in mind.

Scheme 1 of Attributes Registry is built similarly to the Fraud Attributes Registry design from U.S. patent application Ser. No. 16/817,483 in that every piece of data is tokenized so that each piece of data has a corresponding single token that is stored in the database once attested to (alongside its dataType). However, instead of using "Type B" tokens produced by using the parallel Backends (as in the Fraud Attributes Registry), the design makes use of "Type A" tokens. In the Fraud Attributes case, the flow is parallelizable where the 2 Backends process the same data at the same time and the Participant finalizes the FATOKENs before sending them to the Coordinator/Registry. In contrast, the Attributes Registry uses the sequential flow where the Translator finalizes the A-TOKENs and the Participant never has access to the final A-TOKEN. Notice there is some security gained as the Participants never have the final A-TOKEN (since they are "Type A" tokens) as they do in the Fraud Attributes Registry. Also notice that in this case the tokenization process is flexible in terms of whether sequential or parallel processors (or a combination thereof) are desired. These A-TOKENs are based on DATA and generated through the process described in the "Type A" token generation of FIG. 5 and is reflected in this FIG. 11 as well.

Notice that the scheme described above (without the following extension) has a vulnerability. The metadata values associated with A-TOKENs are held by the Coordinator and have no check on whether or not the metadata has been changed by the Coordinator while in its possession (either maliciously or not). The following extension assists in authenticating the metadata in Scheme 1. It provides end-to-end (i.e., Attestor-to-Requestor) authentication of Metadata associated with potentially sensitive DATA. Authentication of Metadata is achievable via the use of HMAC. The resultant HMACvalues (unlike those used for end-to-end integrity between processors or between a processor and Coordinator) are generated by Participants acting in an attestor role or requestor role.

The extension depicted herein adds a "Type B" tokenization. For reduced computational- and bandwidth-complexity, the "Type B" tokenization only involves the Backend processor. Offset values are utilized in order to mask HMACvalues stored within the Coordinator-accessible database. Potential access to HMACvalues would enable the Backend to use its knowledge of its Pohlig-Hellman secret to exhaust over DATA values in order to discover what DATA values were attested to. This embodiment does not incorporate an anti-correlation/amnesia property in that all Attestations of a given DATA value are tokenized identically. In addition, if the Offset values are computed without use of an Attestor-specific Salt value or other differentiating inputs, then the Offset values are subject to annihilation by exclusive-oring together two instances of the same DATA, thus exposing the exclusive-or sum of HMACvalues to potential exploitation, as an extension to exploitation of individual HMACvalues as mentioned above.

Relevant to FIG. 11-FIG. 16, by one approach, tokenization processors, by responding to tokenization requests from the requesting network elements, act to enable the coordinating network element to manage a protocol, where: the requesting network element, when acting as an attestor role, uses a first result, wherein the first result is comprised of at least one of an intermediate tokenization result and an ancillary tokenization result, and wherein the first result is blinded from all subsets of subsequently involved processors as tokenization processors completing generation of a token, to derive a first symmetric key that is used to derive one or more symmetric keys as a first set of derived symmetric keys; the requesting network element, when acting as a requestor role, uses a second result, wherein the second result is comprised of at least one of an intermediate tokenization result and an ancillary tokenization result, and wherein the second result is blinded from all subsets of subsequently involved processors as tokenization processors completing generation of a token, to derive a second symmetric key that is used to derive one or more symmetric keys as a second set of derived symmetric keys; the requesting network element, when acting as an attestor role, also uses the first set of derived symmetric keys for at least one of: generation of a keyed hash function value; encryption of data; encryption of metadata; and generation of a blinding factor; and: the requesting network element, when acting as a requestor role, also uses the second set of derived symmetric keys to attempt at least one of: verification of a keyed hash function value; recovery of data via decryption; recovery of metadata via decryption; and generation of an unblinding factor.

Further relevant to FIG. 11-FIG. 16, by one approach, determination of success or failure of the data corroboration by the coordinating network element is based on a token value that is retained for accessibility by the coordinating network element wherein the token value may be unblinded or blinded or opaque and is derived from a result of a first computation by the coordinating network element based, at least in part, on a first value retrieved by the coordinating network element from a first communication with the requesting network element, when acting as an attestor role, and is used to compare for a match against a computation by the coordinating network element based, at least in part, on a second value retrieved by the coordinating network element from a second communication with the requesting network element, when acting as a requestor role.

Still further relevant to FIG. 11-FIG. 16, by one approach, each of the tokenization processors performs a cryptographic operation using an independently generated secret to produce an output, wherein for each pair of processors comprised of a first tokenization processor and a second tokenization processor: a first output of the first tokenization processor is used as a first intermediate input to the second tokenization processor or as a first immediate input to the second tokenization processor, or a second output of the second tokenization processor is used as a second intermediate input to the first tokenization processor or as a second immediate input to the first tokenization processor, or the first tokenization processor acts independently of the second output of the second tokenization processor and the second tokenization processor acts independently of the first output of the first tokenization processor.

Figure 11:
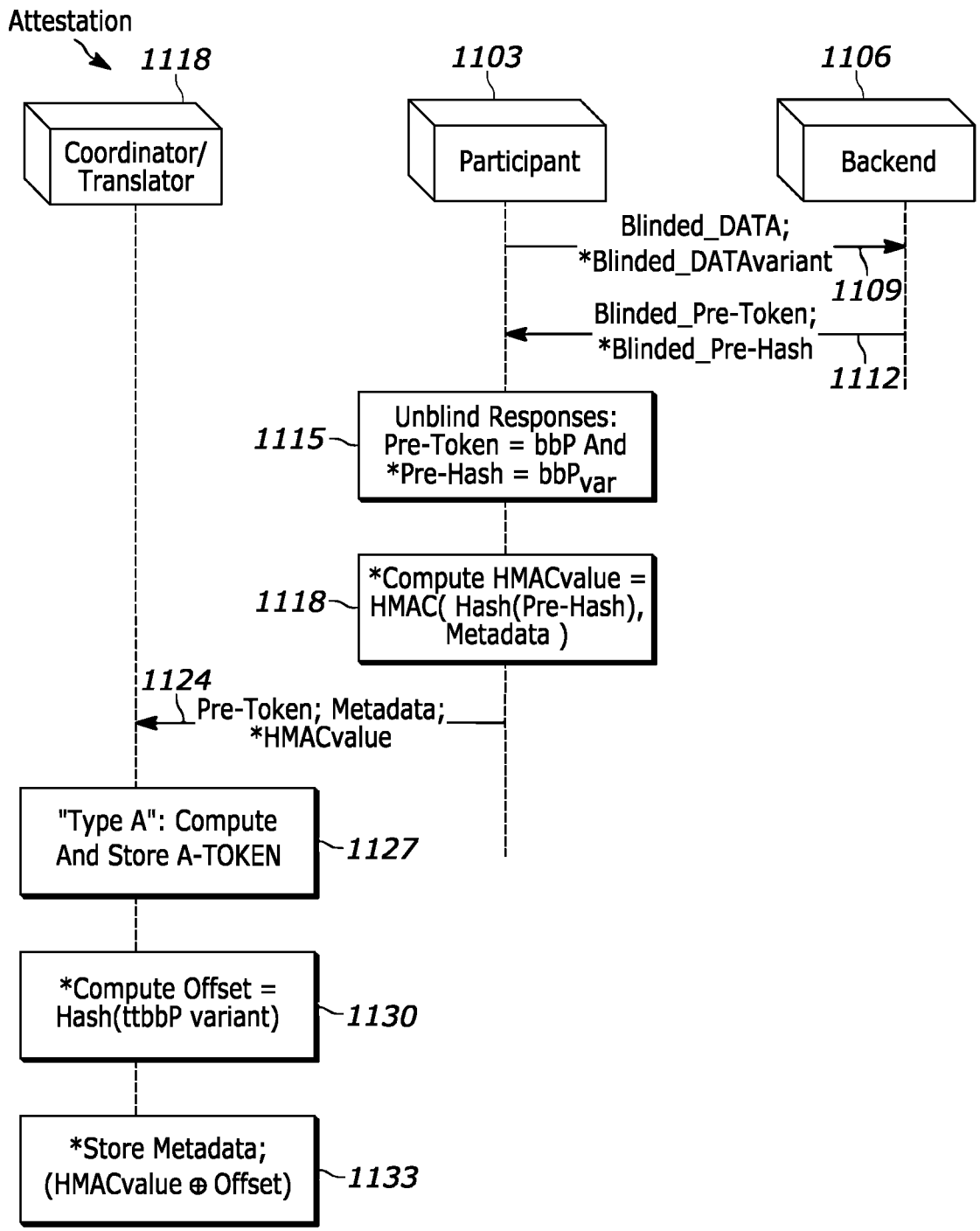
FIG. 11 comprises a flow diagram as configured in accordance with various embodiments of these teachings and that illustrates attesting to enable transference and corroboration through the use of an "Attributes Registry Scheme 1," including communication with processors including a Backend and a Translator, and a Coordinator. An extension to this embodiment allows the protection of Metadata. The transmissions depicted in FIG. 11 may include an overlay, such as encryption that is subsequently decrypted, that is not explicitly shown.

Now referring to FIG. 11, the attesting Participant 1103 submits to the Backend 1106 blinded P values at communication 1109: P is generated from DATA, as usual; and is $P_{var}$ generated from a variant of DATA, e.g., the bitwise-complemented version of DATA. Blinded $P_{var}$ is only sent if utilizing the Metadata protection extension. Each part of the protocol in FIG. 11 that is solely part of this Metadata protection extension is marked with a *. The attesting Participant 1103 receives from the Backend 1106 at communication 1112 Blinded_Pre-Token (and Blinded_Pre-hash (from $P_{var}$) if Metadata protection extension desired). The attesting Participant 1103 removes the blinding factor from the output of the Backend 1106 corresponding to blinded P, at block 115. The attesting Participant 1103 sends the result and the associated Metadata to the Coordinator/Translator 1121, as usual at communication 1124. But the Participant 1118 additionally sends an HMACvalue if making use of the Metadata protection extension. The HMAC_Key to generate the HMACvalue is computed by removing the blinding factor from the output of the Backend 1106 corresponding to blinded $P_{var}$ and hashing the resultant uncompressed elliptic curve point. The attesting Participant 1103 generates the HMACvalue at block 1127 by applying the HMAC_Key to the Metadata. The Coordinator/Translator 1121 completes generation of the "Type A" token, resulting in hash(ttbbP) at block 1127. If utilizing the Metadata protection extension, at block 1130 the Coordinator/Translator 1121 additionally computes an Offset utilizing a variant of ttbbP, e.g., Offset=hash(bitwise-complemented version of ttbbP), and at block 1133, the Coordinator/Translator stores HMACvalue ⊕ Offset in addition to the "Type A" token value hash (ttbbP).

Figure 12:
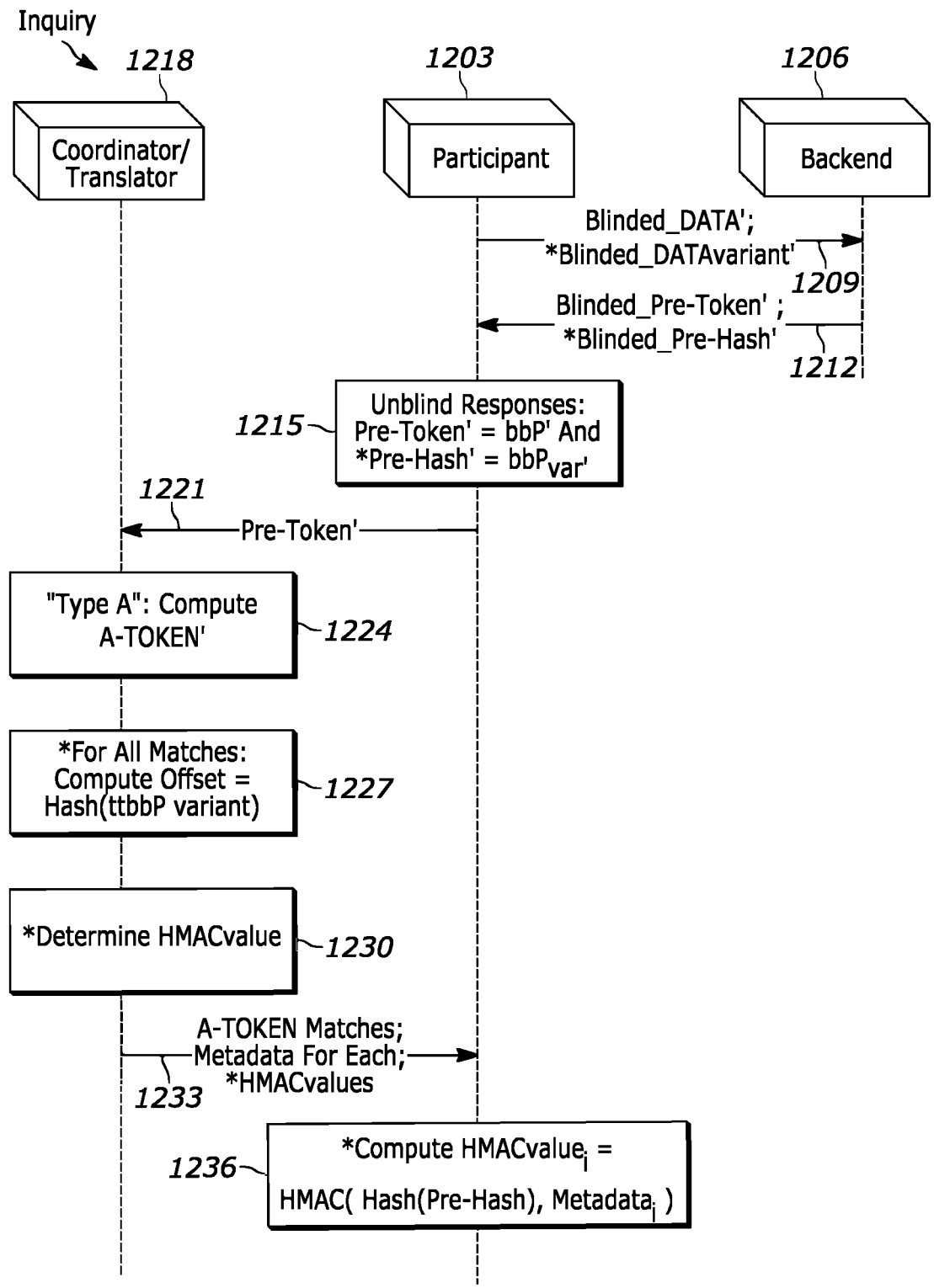
FIG. 12 comprises a flow diagram as configured in accordance with various embodiments of these teachings and that illustrates inquiring to enable transference and corroboration through the use of an "Attributes Registry Scheme 1," including communication with processors including a Backend and a Translator, and a Coordinator. An extension to this embodiment allows the protection of Metadata. The transmissions depicted in FIG. 12 may include an overlay, such as encryption that is subsequently decrypted, that is not explicitly shown.

Now referring to FIG. 12, an inquiring Participant 1203 submits to the Backend 1206 blinded P' values at communication 1209: P' is generated from DATA, as usual; and $P_{var}'$ is generated from a variant of DATA', e.g., the bitwise-complemented version of DATA. Blinded $P_{var}'$ is only sent if utilizing the Metadata protection extension. Each part of the protocol in FIG. 12 that is solely part of this Metadata protection extension is marked with a *. The inquiring Participant 1203 receives from the Backend 1206 at communication 1212 Blinded_Pre-Token' (and Blinded_Pre-hash' (from $P_{var}$) if Metadata protection extension desired). The inquiring Participant 1203 removes the blinding factor from the output of the Backend 1206 corresponding to blinded P, at block 1215. The inquiring Participant 1203 sends the result and the associated Metadata to the Coordinator/Translator 1218, as usual at communication 1221. The Coordinator/Translator 1218 forms the A-TOKEN' to check for matches at the Attributes Registry at block 1224. Once matches are found, the Coordinator/Translator 1218 supplies HMACvalue for each match at communication 1233 by recovering it from HMACvalue ⊕ Offset at block 1230, using Offset as generated at block 1227 using Pre-Token'=bbP as supplied by the Requestor. The inquiring Participant 1203 accesses the HMAC_Key in the same manner as the Attestation at block 1236 in order to verify the Metadata. Unless there is a salt-based personalization of the process by the Attestor, the Coordinator/Translator 1218 could misattribute, e.g., duplicate, Metadata across identified attested-to applications claimed by different attesting Participants as bound to the same value of DATA. In addition the Coordinator/Translator 1218 could falsely represent the multiplicity by referring to applications that were not actually submitted by any attesting Participant. This is detectable if attesting Participants include a preferably randomly or pseudorandomly generated value/salt as an addition, e.g., prefix or suffix, to the Metadata. In that case, the Coordinator/Translator 1218 stores the salt as well as the Metadata and the inquiring Participant 1203 can be programmed to not accept repeats of salt values in response to its Inquiry concerning a dataType and candidate DATA' value. Uniqueness of the salt value can be checked independently for each candidate DATA' value query. Note that incorporating the salt value into what is hashed to generate Offset values would prevent annihilation of Offsets across Attestations. Note also that it is not necessary to use the bitwise-complemented version or other variant of ttbbP in this case, i.e., the incorporation of the salt together with ttbbP renders the resultant Offset values as computationally independent of the corresponding token value.

The primary performance hit upon the utilization of this extension is the doubling of Pohlig-Hellman computations done by the Backend, which may be of little practical consequence if computational parallelization at the Backend is applied. During Inquiry, if the A-TOKEN computed by Coordinator/Translator is not a match to an entry in its database, then Offset need not be computed. A Requestor rejects DATA-match info and Metadata if received and locally-computed HMACvalues do not match.

Scheme 2 does not entail any additional tokenization processing by Backend or Translator beyond that in Scheme 1 without extension. Scheme 2 is intended to extend the properties of Scheme 1 to address: end-to-end metadata integrity; false-positive resistance (including false Attestation-multiplicity resistance); and mitigation of DATA value correlation (for Coordinator-accessible database "amnesia" property). Note that the first two items are addressed in Scheme 1 if the extension is utilized. The Attestor-generated Salt values can be distributed via one or more of the following channels: provided to Requestors by the Coordinator (at the expense of an additional round-trip); retrieved by Requestors from a blockchain as indexed by dataType/hash(dataType), where the Coordinator is authorized to submit to blockchain; or provided to Requestors by the Backend (at the expense of Backend storage and Backend visibility to association of Requestor ID to dataType/hash (dataType)), where the Coordinator supplies (dataType/hash (dataType), Salt) pairs to the Backend directly, or via Participants equipped with Coordinator-generated authorizations (possibly exposing association of Attestor ID to dataType/hash(dataType)).

Figure 13:
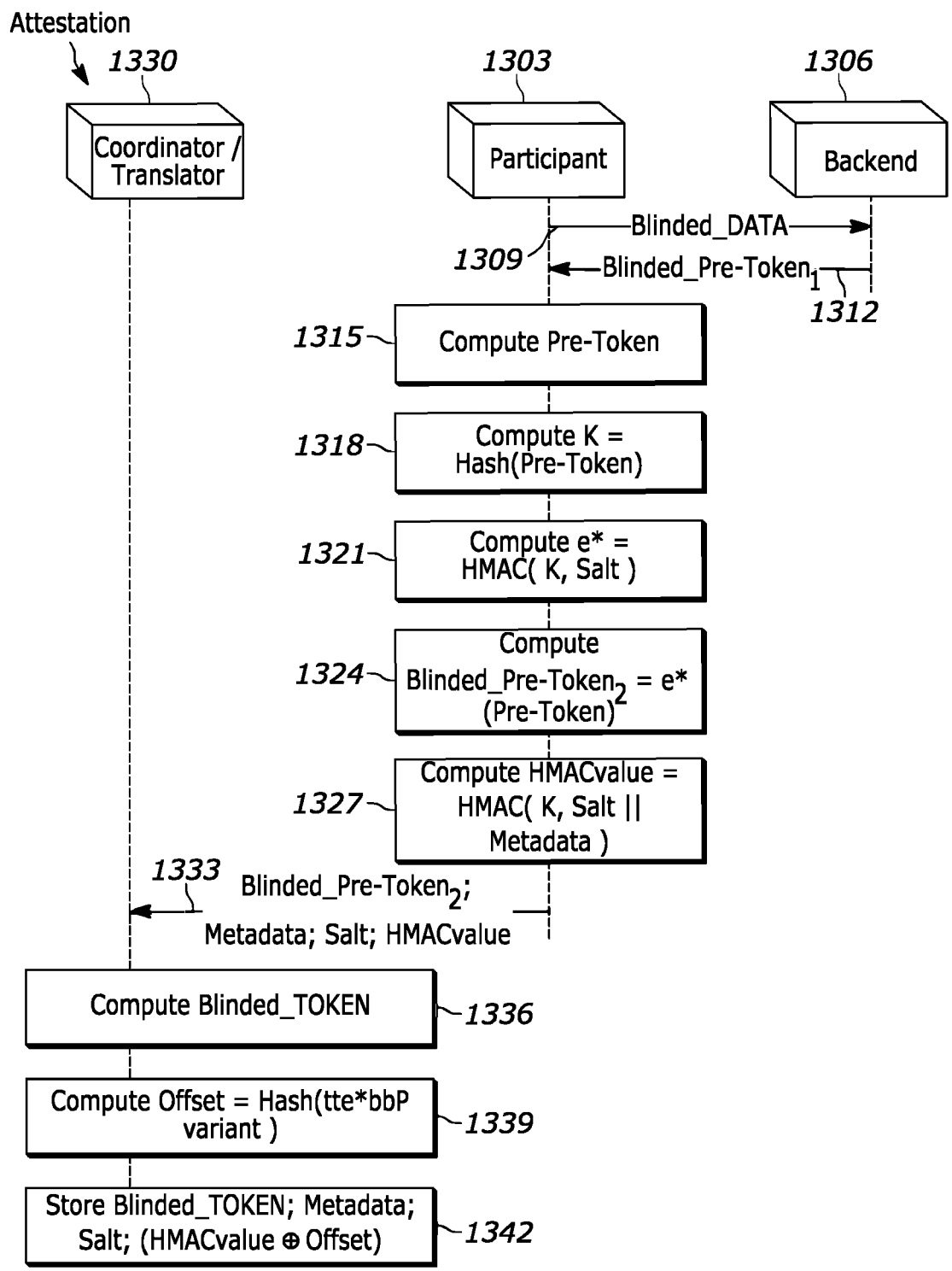
FIG. 13 comprises a flow diagram as configured in accordance with various embodiments of these teachings and that illustrates an alternative embodiment of attesting to enable transference and corroboration through the use of an "Attributes Registry Scheme 2," including communication with processors including a Backend and a Translator, and a Coordinator. The transmissions depicted in FIG. 13 may include an overlay, such as encryption that is subsequently decrypted, that is not explicitly shown.

Now referring to FIG. 13, stepping through Attestation: the attesting Participant 1303 requests tokenization of their DATA by submitting to the Backend 1306 at communication 1309: Blinded_DATA=eP where P is the elliptic curve point representing the (appropriately padded) DATA and e is preferably randomly generated. The attesting Participant 1303 receives from the Backend 1306 at communication 1312: Blinded_Pre-Token$_1$=bbeP. The attesting Participant 1303 unblinds Blinded_Pre-Token$_1$ at block 1315 by applying $e^{-1}$ and hashes the result to get K at block 1318: Pre-Token=$e^{-1}$ (Blinded_Pre-Token$_1$)=$e^{-1}$bbeP=bbP; K=hash(Pre-Token) (using, e.g., the uncompressed elliptic curve point representation of Pre-Token). The attesting Participant 1303 computes e* at block 1321: e*=HMAC(K, Salt) (where Salt is preferably randomly generated by Attestor such that HMAC(K, Salt)<n (where n is the prime order of the elliptic curve group)). The attesting Participant 1303 computes at block 1324: Blinded_Pre-Token$_2$=e*(Pre-Token)=e*bb. The attesting Participant 1303 computes at block 1327: HMACvalue=HMAC(K, Salt||Metadata). The attesting Participant 1303 submits to the Coordinator/Translator 1330 at communication 1333: Blinded_Pre-Token$_2$; Metadata; Salt; and HMACvalue. At block 1336, the Coordinator/Translator 1330 applies tt to Blinded_Pre-Token$_2$, and hashes to determine Blinded_Token=hash(tt(Blinded_Pre-Token$_2$))=hash(tte*bbP). At block 1339, the Coordinator/Translator 1330 determines the Offset: Offset=hash(tte*bbP variant), where variant entails, e.g., bit-wise complement or different tt. At block 1342, the Coordinator/Translator 1330 stores: Blinded_Token; Metadata; Salt; and HMACvalue ⊕ Offset.

Figure 14:
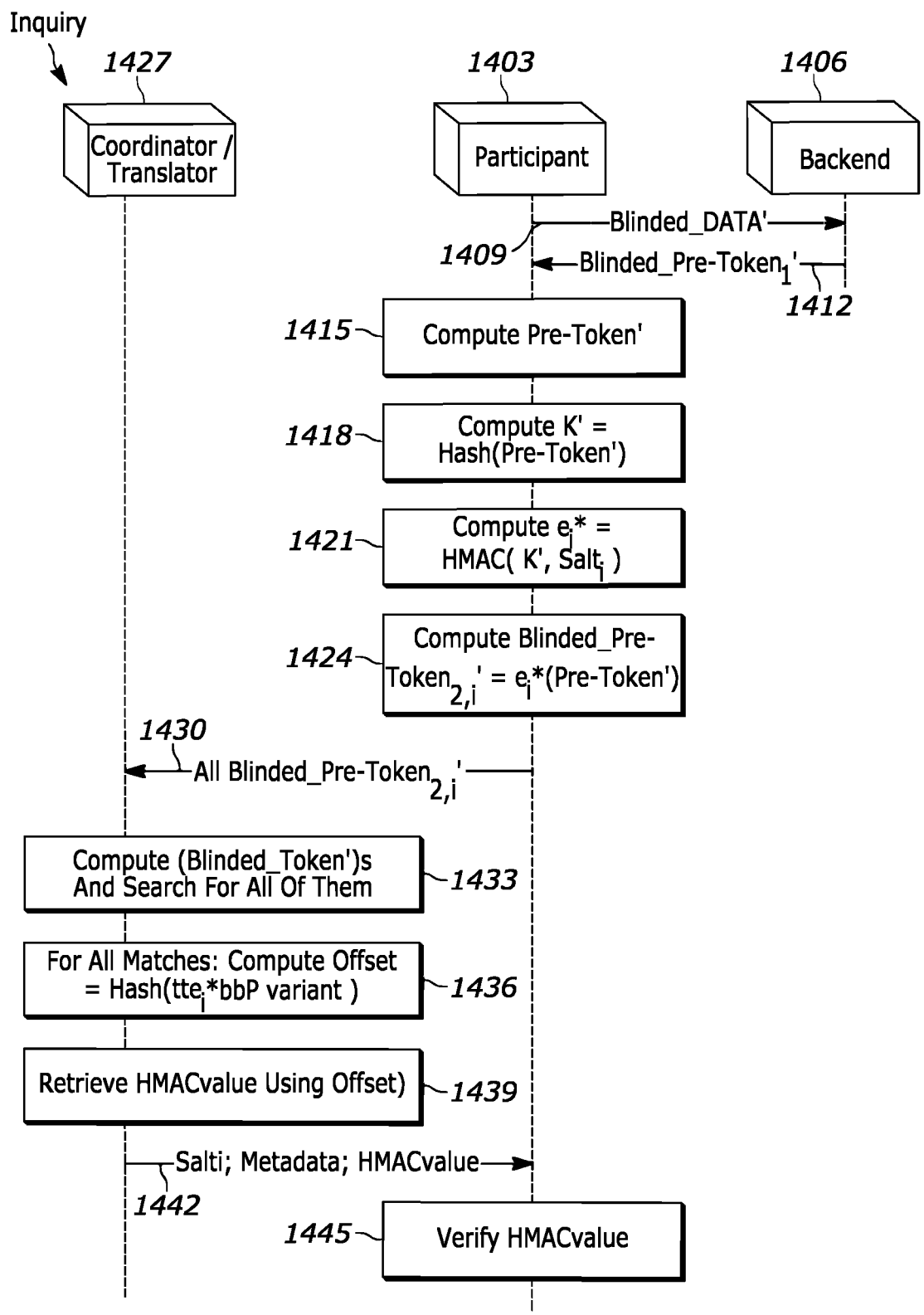
FIG. 14 comprises a flow diagram as configured in accordance with various embodiments of these teachings and that illustrates an alternative embodiment of inquiring to enable transference and corroboration through the use of an "Attributes Registry Scheme 2," including communication with processors including a Backend and a Translator, and a Coordinator. The transmissions depicted in FIG. 14 may include an overlay, such as encryption that is subsequently decrypted, that is not explicitly shown.

Now referring to FIG. 14, stepping through Inquiry: the inquiring Participant 1403 requests tokenization of their DATA' by submitting to the Backend 1406 at communication 1409: Blinded_DATA'=eP' where P' is the elliptic curve point representing the (appropriately padded) DATA' and e is preferably randomly generated. The inquiring Participant 1403 receives from the Backend 1406 at communication 1412: Blinded_Pre-Token$_1$'=bbeP'. At block 1415, the inquiring Participant 1403 unblinds Blinded_Pre-Token$_1$' by applying $e^{-1}$ and at block 1418 hashes the result to get K': Pre-Token=$e^{-1}$ (Blinded_Pre-Token$_1$')=$e^{-1}$bbeP'=bbP'; K'=hash(Pre-Token'). At block 1421, the inquiring Participant 1403 computes $e_1$* values: $e_1$*=HMAC(K', Salt) for all possible Salts retrieved by the inquiring Participant 1403 in one of the ways listed at the beginning of this section. For each i as above, the inquiring Participant 1403 computes at block 1424 and submits to the Coordinator/Translator 1427 at communication 1430: Blinded_Pre-Token$_{2,j}$=$e_i$*(Pre-Token)=$e_i$*bbP'. At block 1433, the Coordinator/Translator 1427 applies tt to Blinded_Pre-Token$_{2,j}$ and hashes to determine Blinded_Token'=hash(tt(Blinded_Pre-Token$_{2,j}$))=hash(tte$_i$*bbP'). At block 1436, the Coordinator/Translator 1427 determines the Offset=hash(tte$_i$*bbP variant), where variant entails, e.g., bit-wise complement or different tt. At block 1439, the Coordinator/Translator 1427 retrieves HMACvalue using Offset. If the A-TOKEN computed by Coordinator/Translator 1427 is not a match to an entry in its database, then Offset need not be computed. The Coordinator/Translator 1427 supplies the successful inquiring Participant 1403 at communication 1442 with pairs of Metadata and HMACvalue values (as indexed by Salt). The inquiring Participant 1403 verifies the HMACvalue sent at block 1445.

This third scheme of Attributes Registry, i.e., Scheme 3, is intended to extend the properties of Scheme 1 to address: end-to-end metadata integrity (including using entity resolution); false-positive resistance (including false Attestation-multiplicity resistance); mitigation of DATA value correlation (for Coordinator-accessible database "amnesia" property); and extensions for encrypted metadata and Registry Attestations. In Scheme 1 (without the metadata extension) a malicious Coordinator has the ability to alter the metadata and return it to a Requestor without the Requestor's knowledge. In Scheme 3, metadata authentication is enabled through the use of an HMACvalue similarly to the extension in Scheme 1. The Attestor generates an HMAC value over the metadata and the preferably randomly generated Salt (of preset bit-length) using the Pre-Token (that the Coordinator will never see) as the HMAC_Key. This HMACvalue cannot be verified by the Coordinator as they will not have access to the Pre-Token. Therefore, it also cannot be falsified by the Coordinator. In addition, there is a salted Offset the Coordinator adds (via an exclusive-or operation) to the HMACvalue. In the case of a database breach, if the Backend had access to the raw HMACvalues without the added Offset, it would be able to exhaust over the set of DATA values to determine which HMACvalue it is.

Note that with very high probability Opaque_Pre-Token repeats if Opaque_TOKEN=HMAC(KK, Opaque_Pre-Token) repeats, where KK is an HMAC key that is preferably securely held by the Coordinator/Translator. This implies that if one sees entries of Salt; Metadata; Opaque_TOKEN; HMACvalue $\oplus$ Offset within the Coordinator-accessible database, then they see where Opaque_Pre-Token repeats. If instead of setting Offset=HMAC(KK, Opaque_Pre-Token-||Salt), Offset was set to be HMAC(KK, Opaque_Pre-Token variant), such as where the variant operation is bit-wise complementation, then one could recover, e.g., [HMACvalue computed over Metadata$_1$ and Salt$_1$]$\oplus$ [HMACvalue computed over Metadata$_2$ and Salt$_2$] where there is a match in DATA value and the value of i (where i is used by a Participant in the generation of Opaque_Pre-Token and thus indirectly by the Coordinator/Translator in the generation of Offset) across two Attestations in the database (since both Offset values would be the same). If that were the case then if a breach of the database were available to a Backend insider with knowledge of bb, they could determine which DATA value was attested to (to the extent that it is feasible to exhaust over the set of DATA values). Therefore, Offset values are preferably generated as Salt-dependent. Scheme 3 also protects against false positives in that if a Requestor receives a response from the Coordinator in which a malicious (or faulty) Coordinator has falsely informed the Participant their DATA value did match something in the database, the Participant has a method of determining that the Coordinator was lying. The Coordinator must provide the HMACvalue associated with the Metadata correlating to the DATA value in a typical response. The Participant must have the correct Pre-Token in order to verify that the HMACvalue is correct. If the HMACvalue they produce does not match what the Coordinator sent, either the Pre-Token was wrong (i.e. the DATA value did not match) and the Coordinator lied or the HMACvalue they sent was wrong. Therefore, the Participant knows something has gone wrong either at the Coordinator and/or during the Attestation process and it is likely their match was invalid.

In Scheme 1 a Coordinator observer (or a database breach) will be able to determine which dataTypes within applications match others. Although the observer cannot see any raw data, they do have access to the opaque version of the information, which is undesirable. Within Scheme 3, each of these appear to be different in the final database using tokenization in which neither the Participant nor the Coordinator ever completely "unblinds" the final token, but instead the Coordinator utilizes an Opaque_TOKEN. This is due to a value i that the Attestor chooses randomly from $\{1, \ldots, N\}$ and includes this i in the tokenization process. The Requestor computes all N possibilities and sends them to the Coordinator who finishes the tokenization for all N possibilities generating N Opaque TOKENs and searches the database as normal. DATA for all dataTypes can be processed using this type of tokenization, i.e., Opaque TOKENs. The Coordinator (with or without indicated preferences from the Requestor) in responding to the Requestor has the flexibility of choosing one or more dataTypes as primary or treating all equivalently. The Attestors need not be involved in such choices. N is a system security parameter and should be increased to desired security level while still able to be efficiently run. Note that the system may start with a low N (say even N=1) and increase N over time; it should preferably not, however, decrease N, as this would give incomplete results to Participants during Inquiry.

It is preferable that the system is not implemented so as to have a Participant always attest using the same value of i (i.e., across its applications). Otherwise, a Requestor—without needing to take advantage of any potential database breaches—could cluster multiple applications according to Attestors. This does not contradict, however, that the system can be initially configured so that all Participants just use i=1 (i.e., N=1). It is preferable for non-entity-resolution-designated dataTypes that the Attestor choose i randomly each time (at least for different applications). For dataTypes bound to the same application an Attestor can use the same i (whether or not such i is remembered and reused by the Attestor for future Attestations relative to that application). Note that while it is true that a compliant Requestor could have difficulty in determining which i was actually used by an Attestor (because the Requestor submitted over all i values), a cheating Requestor could narrow down by sending arbitrary bits in place of use of one or more i values.

Instead of using an elliptic curve Pohlig-Hellman operation after the Participant finishes the Pre-Token, HMAC is used both at the Participant and at the Translator to increase efficiency of these operations as there is no longer a need to use commutative encryption here. This may be done safely as long as the intent is to expand to two parallel Backend processors giving a similar amount of security as in previous designs: Pre-Token=(bb$_1$+bb$_2$)P=e$^{-1}$ (bb$_1$eP+bb$_2$eP), where ECPH and ECDH partitioned operations are dynamically re-splittable while HMAC operations are not. This is important to note from a security standpoint, since keys used for HMAC operations, unlike keys used for Pohlig-Hellman operations, do not lend themselves to proactive re-splitting across partitions of a processor.

Entity resolution may be done in a couple different ways here. DATA for all dataTypes can be processed using this tokenization method (i.e., Opaque TOKENs) as opposed to dataTypes chosen for entity resolution (or primary dataTypes) being treated in a completely different manner than other dataTypes. In this case "primary" refers to dataTypes that are used for entity resolution and "secondary" refers to dataTypes that are checked by the Coordinator only once a correlating primary dataType matches. The Coordinator (with or without indicated preferences from the Requestor) in responding to the Requestor has the flexibility of choosing one or more dataTypes as primary or treating all equivalently. The Attestors need not be involved in such choices.

As an alternative to the Attestor choosing an i randomly from $\{1, \ldots, N\}$ and Requestors exhausting over all i in $\{1, \ldots, N\}$ for all dataTypes, certain dataTypes within a particular use case can be designated network-wide as primary (i.e., entity resolution dataTypes). For such primary dataTypes the Attestor chooses i as fixed by the system, say, i=1, and Requestors choose only that value of i for such dataTypes. In this case "primary" refers to dataTypes that are used for entity resolution and "secondary" refers to dataTypes that are checked by the Coordinator only once a correlating primary dataType matches.

Figure 15:
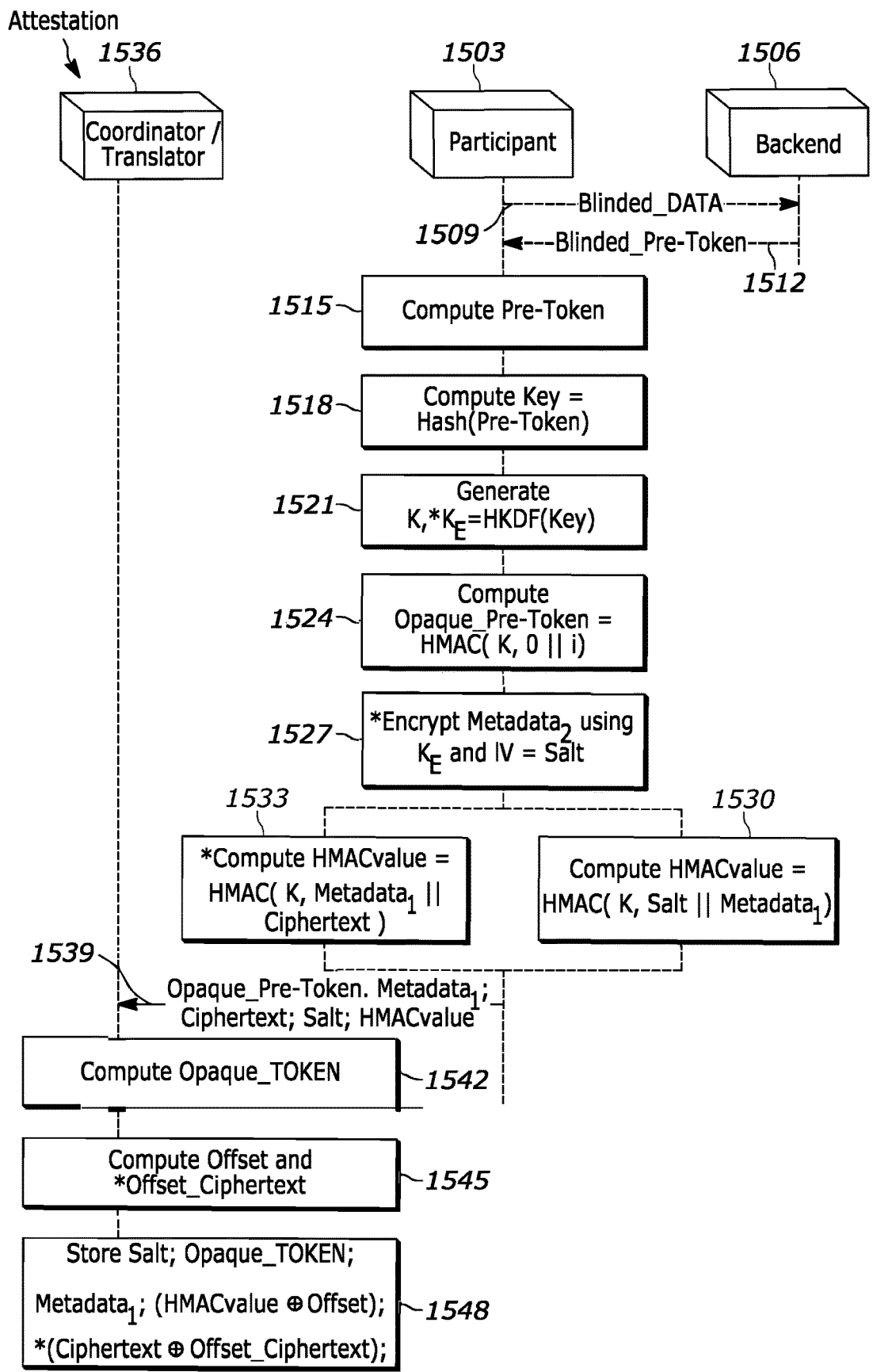
FIG. 15 comprises a flow diagram as configured in accordance with various embodiments of these teachings and that illustrates an alternative embodiment of attesting to enable transference and corroboration through the use of an "Attributes Registry Scheme 3," including communication with processors including a Backend and a Translator, and a Coordinator. An extension to this embodiment allows the protection of Metadata and Registry Attestations, e.g., via encryption of Metadata and encryption of data. The transmissions depicted in FIG. 15 may include an overlay, such as encryption that is subsequently decrypted, that is not explicitly shown.

Now referring to FIG. 15, this description steps through Attestation of the base protocol of Scheme 3 and an extension that allows for Encrypted Metadata and/or Registry Attestations if desired. Each part of the protocol in FIG. 15 that is solely part of this extension is marked with a *. The attesting Participant 1503 requests an A-TOKEN by submitting to the Backend 1506 at communication 1509: Blinded_DATA=eP where P is the elliptic curve point representing the (appropriately padded) DATA and e is preferably randomly generated. The attesting Participant 1503 receives from the Backend 1506 at communication 1512: Blinded_Pre-Token=bbeP. The attesting Participant 1503 computes at block 1515: Pre-Token=$e^{-1}$ (Blinded_Pre-Token)=$e^1$bbeP=bbP. At block 1518, the attesting Participant 1503 computes Key=hash(Pre-Token) (using, e.g., the uncompressed elliptic curve point representation of Pre-Token). At block 1521, the attesting Participant 1503 generates K (and $K_E$ if utilizing the extension described in detail later) through the use of an HMAC key derivation function (HKDF). At block 1524, the attesting Participant 1503 computes Opaque_Pre-Token=HMAC(K, 0||i), where i is preferably randomly chosen from $\{1, \ldots, N\}$. At block 1530, the attesting Participant 1503 computes HMACvalue=HMAC(K, 1||Salt||Metadata) for preferably randomly chosen Salt value. The attesting Participant 1503 submits to the Coordinator/Translator 1536 at communication 1539: Opaque_Pre-Token (instead of raw Pre-Token sent in Scheme 1); Metadata; Salt; and HMACvalue. At block 1542, the Coordinator/Translator 1536 computes the following (where KK is preferably securely held by the Coordinator/Translator 1536): Opaque_TOKEN=HMAC (KK, Opaque_Pre-Token). At block 1545, the Coordinator/Translator 1536 computes Offset=HMAC(KK, Opaque_Pre-Token||Salt). At block 1548, the Coordinator/Translator 1536 stores: Opaque_TOKEN; Metadata; Salt; and HMACvalue ⊕ Offset.

Figure 16:
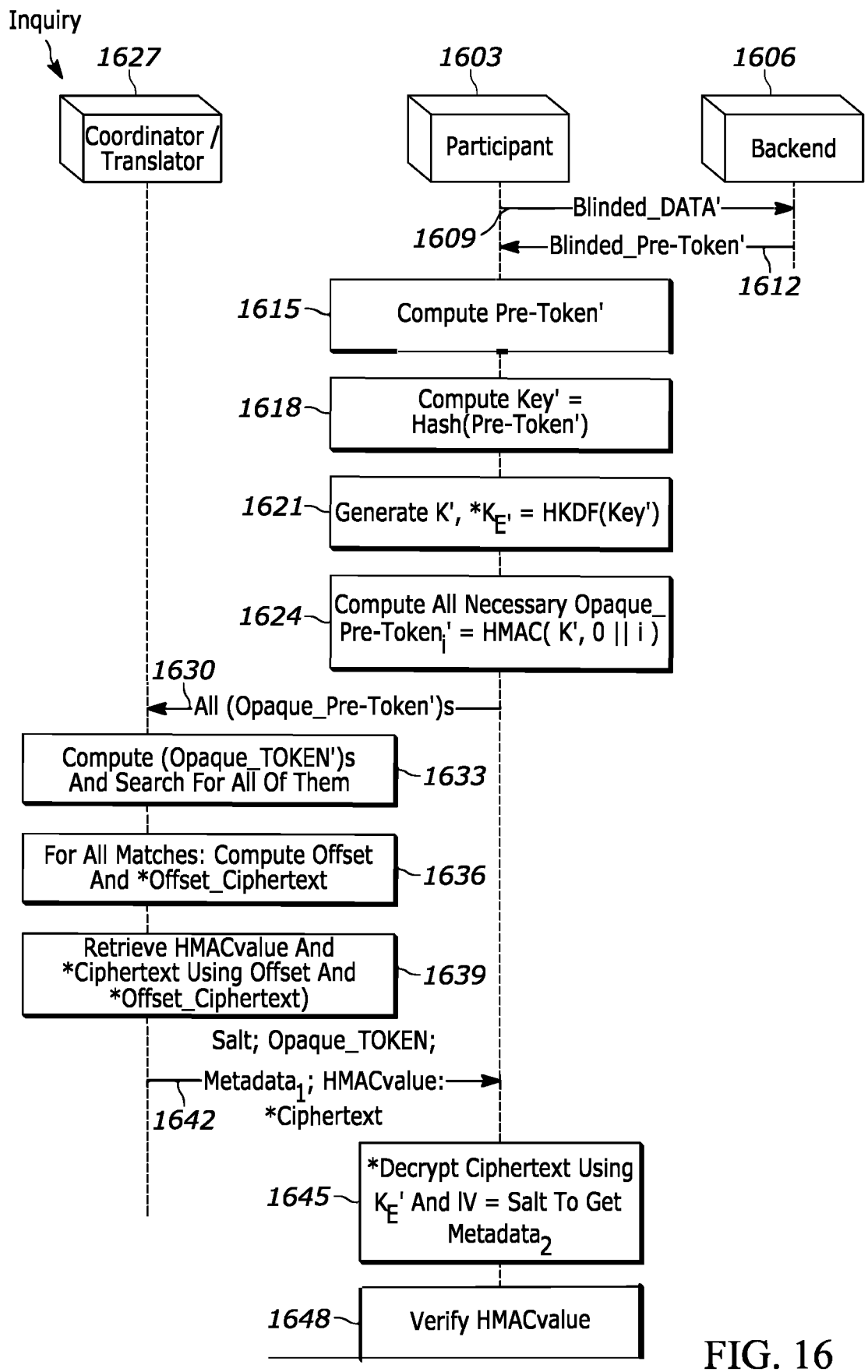
FIG. 16 comprises a flow diagram as configured in accordance with various embodiments of these teachings and that illustrates an alternative embodiment of inquiring to enable transference and corroboration through the use of an "Attributes Registry Scheme 3," including communication with processors including a Backend and a Translator, and a Coordinator. An extension to this embodiment allows the protection of Metadata and Registry Attestations, e.g., recovery of Metadata via decryption and recovery of data via decryption. The transmissions depicted in FIG. 16 may include an overlay, such as encryption that is subsequently decrypted, that is not explicitly shown.

Now referring to FIG. 16, this description steps through Inquiry and an extension that allows for Encrypted Metadata and/or Registry Attestations if desired. Each part of the protocol in FIG. 16 that is solely part of this extension is marked with a *. The inquiring Participant 1603 requests an A-TOKEN by submitting to the Backend 1606 at communication 1609: Blinded_DATA'=eP' where P is the elliptic curve point representing the (appropriately padded) DATA' and e is preferably randomly generated. The inquiring Participant 1603 receives from the Backend 1606 at communication 1612: Blinded_Pre-Token'=bbeP'. At block 1615, the inquiring Participant 1603 computes: Pre-Token'=$e^1$ (Blinded_Pre-Token')=$e^{-1}$bbeP'=bbP'. At block 1618, the inquiring Participant 1603 computes Key'=hash (Pre-Token') (using, e.g., the uncompressed elliptic curve point representation of Pre-Token'). At block 1621, the inquiring Participant 1603 generates K' (and $K_E$' if utilizing the extension described in detail later) through the use of an HMAC key derivation function (HKDF). At block 1624, the inquiring Participant 1603 computes Opaque_Pre-Token$_i$'=HMAC(K', 0||i) for all i in $\{1, \ldots, N\}$. The inquiring Participant 1603 submits to the Coordinator/Translator 1627 at communication 1630: N (Opaque_Pre-Token)s. The Coordinator/Translator 1627 computes the following at block 1633 (where KK is securely held by Coordinator/Translator 1627): Opaque_TOKEN$_i$'=HMAC (KK, Opaque_Pre-Token$_i$') for all i in $\{1, \ldots, N\}$. At block 1636, the Coordinator/Translator 1627 computes Offset$_i$=HMAC(KK, Opaque_Pre-Token$_1$||Salt) for all i in $\{1, \ldots, N\}$ where the Opaque_TOKEN$_i$' has a match. At block 1639, the Coordinator/Translator 1627 computes HMACvalue$_i$ by utilizing Offset$_i$. The Coordinator/Translator 1627 supplies to the successful inquiring Participant 1603 at communication 1642: Salt; Metadata; HMACvalue, for all Opaque_TOKEN$_i$ matches. The inquiring Participant 1603 verifies the HMACvalue at block 1648.

Consider the following case: the Requestor matches against a primary dataType (as described above)), but has not matched on a secondary dataType within the same application. However, the Coordinator would like to distribute Metadata correlating to the secondary dataType and have the authentication ensured in the base protocol. This may be enabled by having the Attestor generate the HMACvalue still using the Pre-Token that correlates to the primary dataType, but operating over Metadata associated with the secondary dataType (where the Coordinator generates the Offset using the Opaque_Pre-Token and Salt associated to the primary dataType). This ensures the Metadata correlating to this secondary dataType can be authenticated by those who match on the primary dataType without matching on the secondary/non-primary dataType. In the case where the Requestor does match on both the primary and secondary dataTypes, the Requestor should be given the HMACvalue (and associated Salt value) that was generated by the Attestor using the Pre-Token associated with the secondary dataType, not the primary. This ensures that the Requestor still has false-positive protection on their response as they must match on their secondary dataType as well in order to verify the HMACvalue. Note that the Metadata corresponding to a secondary dataType made available to and verifiable by the Requestor may differ according to whether it is to be made available to a Requestor that matches on only the primary dataType vs. a Requestor that matches on both the primary and secondary dataTypes. The Coordinator need recover the Offset and thus the HMACvalue associated with a primary dataType only in the case that a Requestor matches on the primary dataType but not on the secondary dataType that was associated with the primary dataType during Attestation. Within the Coordinator-accessible database there may be multiple secondary (dataType, Salt, Metadata, HMACvalue ⊕ Offset) quadruplet values associated with the same primary Opaque_TOKEN that are to be used with Requestors that succeed only in matching on the primary dataType The following additions to the protocol in FIGS. 15 and 16 allow for encrypted Metadata and/or Registry Attestations. For a Registry Attestation capability, DATA is appended to Metadata$_2$ to be encrypted.

Using HMAC-based key derivation function (HKDF) on Key=hash(Pre-Token), generate 2 keys at block 1521 in FIG. 15 and block 1621 in FIG. 16, namely, HMAC key K and AES-CBC encryption mode key $K_E$ where AES-CBC mode is the cipher block chaining mode of AES encryption. Breaking Metadata into 2 pieces (one of them may be empty): Metadata$_1$=Metadata is allowed to be seen in plaintext by the Coordinator (this Metadata is still authenticated); and Metadata$_2$=Metadata is seen only by someone matching on the value used to create the corresponding Opaque_TOKEN. At block 1527 in FIG. 15, encrypt Metadata$_2$ using AES-CBC with K$_E$ and IV=Salt (or truncated version of Salt) to generate Ciphertext. At block 1533 in FIG. 15, compute HMACvalue=HMAC(K, 1||Salt||Metadata$_1$||Salt||Ciphertext). At block 1548, the Coordinator/Translator 1536 stores Salt; Opaque_TOKEN; Metadata$_1$; HMACvalue $\oplus$ Offset; Ciphertext $\oplus$ Offset_Ciphertext, where the generation of Offset_Ciphertext is discussed below. At block 1646 in FIG. 16, decrypt Ciphertext to determine Metadata$_2$.

This extension has the ability to apply in the general case shown in the base protocol (with or without additional Registry Attestation data) and therefore the Metadata can be partially or wholly encrypted under both models discussed preceding the detailed description of FIG. 15. Salt is used as a delimiter between HMAC arguments Metadata$_1$ and Ciphertext so that the Coordinator cannot reassign arguments (where the first inclusion of Salt (of preset bit-length) as an argument of HMACvalue=HMAC(K, 1||Salt||Metadata$_1$||Salt||Ciphertext) prevents the Coordinator from successfully misrepresenting the Salt). Salt is also incorporated as an argument of HMACvalue so that a Requestor cannot be fooled into using the wrong IV when decrypting Ciphertext using AES-CBC (where IV is equal to Salt or a preset-length portion of Salt). During Attestation, the Coordinator stores (Ciphertext $\oplus$ Offset_Ciphertext) of length set to Ciphertext bit-length, rather than storing Ciphertext, in order to protect Ciphertext against unauthorized access (similarly to the way Offset values are applied elsewhere). For example, Offset_Ciphertext may be computed as: the concatenation of as many Offset$_j$=HMAC(KK, Opaque_Pre-Token||Salt||j) for j=0, 1, . . . as are needed to cover Ciphertext. If (Ciphertext $\oplus$ Offset_Ciphertext) is stored, then upon successful Inquiry (as determined by a match against a stored Opaque_TOKEN), the Coordinator recomputes Offset_Ciphertext in order to recover Ciphertext (in addition to recomputing Offset to recover HMACvalue).

The following protocol describes a Dynamic Registry Attestation system to enable the transference of data from one Participant to another as mediated through a Coordinator as a coordinating network element wherein access to the data requires knowledge of which the Coordinator remains oblivious. The elements of such knowledge may comprise one or more of universal resource identifiers (URI(s)) and cryptographic keying material wherein the cryptographic keying material may be used to enable access to a usable form of the URI and/or to decrypt encrypted data accessible via use of the URI and/or to authenticate the integrity of such data. Eligibility for an inquiring Participant as requesting network element acting in the role of a Requestor, to access data which has been attested to by a Participant as requesting network element acting in the role of an Attestor is dependent on asynchronous corroboration between the Attestor and Requestor on a token. Such token may represent the Entity to which such data corresponds and/or is associated. Alternatively or additionally, the generation of such token may be dependent on a value submitted by an Attestor during Attestation and made available to a Requestor during Inquiry. Preferably such token is not reproducible by any subset of the coordinating network element and a proper subset of the data tokenization processors (also known as tokenization processors or as processors) involved in generation of the token. This assurance of exclusionary access may be ascertained by generating a "Type B" token.

The Coordinator, whether or not under the same authority as a Translator, may potentially play a role in constraining the successful utilization of "Type B" tokens to authorized Participants. As an example, the Coordinator may use a preferably securely-held signature generation private key to generate authorizations that are verified as a prerequisite to retrieving Attestor-provided content. Such authorizations may be time-limited relative to acceptability. Such authorizations may identify a Participant signature verification public key so that Requestor knowledge of the corresponding signature generation private key need be required as an additional safeguard against unauthorized access, although such feature may be considered antithetical to maintaining confidentiality of Requestor identities vis-à-vis communication with Attestor-managed content repositories.

In the following three steps of the Attestation, DATA may be considered to be comprised of information, attributes and/or other data that represents or is associated with an entity, bb is a parameter available to (and preferably securely held by) the Backend and HMAC(K, message) denotes application of a keyed hash function (e.g., a hash-based message authentication code) to a string of data denoted as message using key K. P denotes an elliptic curve point and e, e$^{-1}$ and bb are elliptic curve scalar multipliers.

The Participant requests an A-TOKEN by submitting to the Backend: Blinded_DATA=eP, where P is the elliptic curve point representing the (appropriately padded) DATA and e is preferably randomly generated. The Participant receives from the Backend: Blinded_Pre-Token=eP The Participant computes: Pre-Token=e$^{-1}$ (Blinded_Pre-Token)=e$^{-1}$bbeP=bbP; K=hash(Pre-Token) (using, e.g., the uncompressed elliptic curve point representation of Pre-Token); Opaque_Pre-Token=HMAC(K, 0||i) where i is in {1, . . . , N}; and HMACvalue=HMAC(K, 1||Salt||Metadata) for preferably randomly chosen Salt value.

The above sub-protocol from the Attributes Registry Scheme 3 can be run simultaneously with the Dynamic Registry Attestations by defining the "Type B" token as, say, B-TOKEN=HMAC(K, 2) in addition to running the above computations. However, the current invention may also be run independently by omitting the computations of Opaque_Pre-Token and HMACvalue while continuing to define "Type B" token as, say, B-TOKEN=HMAC(K, 2). Note that compromise of the Backend could produce the entire set of such "Type B" tokens to the extent that it is computationally feasible to exhaust over the DATA values. However, such a compromise even along with a breach of the Coordinator-accessible database would not provide the means to generate acceptable authorizations (where such could be required) if the Coordinator signature generation private key remains secured.

As an alternative embodiment, "Type B" tokens may be generated via involvement of one or more Backend processors as well as involvement of a Translator processor. For example, B-TOKEN=ttbbP where elliptic curve scalar multipliers bb and tt refer to (preferably securely held) Backend and Translator parameters, respectively, bbeP is produced by the Backend and ttbbeP is produced by the Translator (for ephemeral blinding factor e that is ultimately removed by the Participant).

The Dynamic Registry Attestation techniques disclosed herein enable asynchronous operation with a differentiable content correction vs. content addition capability: Attestors can make changes/additions dynamically without going back to the Coordinator as long as the same Content Key is used to generate the Ciphertext from the plaintext content. When updating the content, the oldest version of the Ciphertext must be associated with the newest Ciphertext in order to enable access by Participants who inquired to the Coordinator as Requestors before or after the Ciphertext was updated. This is due to the fact that the new Requestors must still be able to match against those hash(Ciphertext) values the Attestor has made the Coordinator aware of (as enabled, for example by the protocol exemplified below).

This enables the Attestor to make content corrections using the same authenticated encryption key (i.e., the Content Key which transforms plaintext content to Ciphertext) without re-engaging with the Coordinator to make such key accessible by Requestors. Content additions can be made using either the same Content Key or a newly generated Content Key that will be accessible to Requestors who perform Inquiry via a request that occurs subsequently to the Attestor's upload of the new Content Key to the Coordinator. Optionally, timeouts on access to attested-to content may be enforced by the Coordinator and/or the relevant Attestor.

Note that if the Attestor does not want to associate old content to new content that is released, then they should use a new URI to post this content and use this URI when attesting to the Coordinator. Such measure can prevent a Requestor from clustering parcels of content according to their sources.

Figure 18:
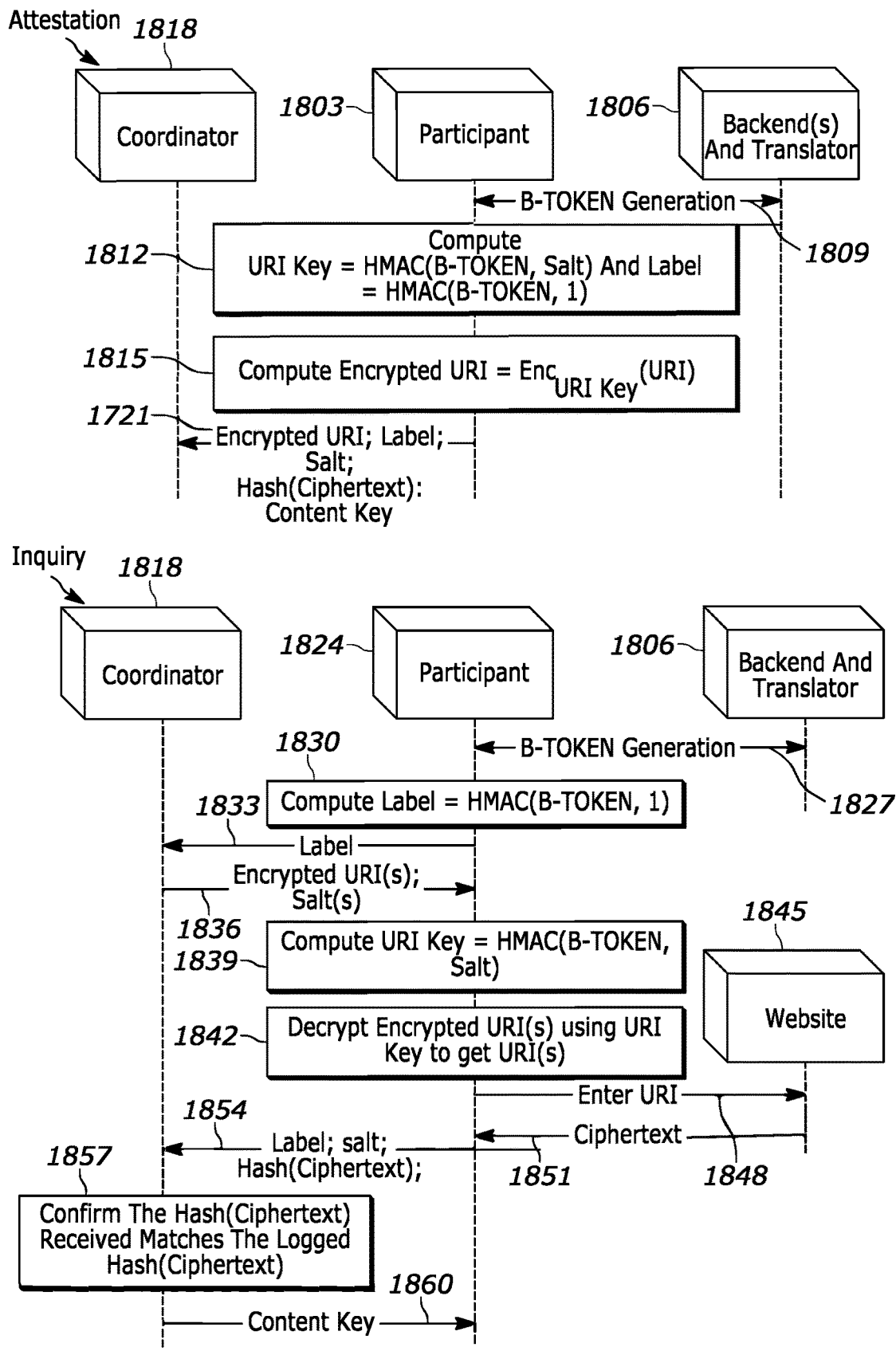
FIG. 18 comprises a flow diagram as configured in accordance with various embodiments of these teachings and that illustrates an alternative embodiment of attesting and inquiring to enable transference that may be altered dynamically after the Attestation process through the use of "enhanced Dynamic Registry Attestations," including communication with processors including Backend(s) and a Translator, and a Coordinator. This alternative embodiment prevents a conflict in which a Participant could claim failure of transference without proof. The transmissions depicted in FIG. 18 may include an overlay, such as encryption that is subsequently decrypted, that is not explicitly shown.

Relevant to FIG. 17-FIG. 18, by one approach, where the coordinating network element manages a protocol: attestation occurs asynchronously of storage of content by the requesting network element, when acting as an attestor role; inquiry occurs asynchronously of retrieval of the content by the requesting network element, when acting as a requestor role; substantive access to content managed by the requesting network element, when acting as an attestor role, is denied to the coordinating network element and is limited to the requesting network element, when acting as a requestor role, that matches on a first token as a representation of an entity to which the content is associated, wherein: the requesting network element, when acting as an attestor role, provides to the coordinating network element a label, an encrypted value, and a salt that when combined with the first token results in a value that is required to substantively access the content by decrypting the encrypted value, wherein the label is derivable from the token independently of the salt; and the coordinating network element provides the salt and the encrypted value to the requesting network element, when acting as a requestor role, if the requesting network element, when acting as a requestor role, provides the coordinating network element with the label.

Now referring to FIG. 17, an attesting Participant 1703 generates B-TOKEN by working with the Backend(s) and Translator 1706 at communication 1709 (as shown in FIG. 5). A preferably randomly generated Salt is combined with the B-TOKEN to derive a URI Key at block 1712. This B-TOKEN may be generated using two Backends in parallel or a single Backend. As an example, at block 1715 Encrypted URI may be derived via a mode of AES encryption (e.g., an AES-GCM key usable in Galois Counter Mode of the Advanced Encryption Standard) from URI by using a URI Key generated as HMAC(B-TOKEN, Salt), and Label may be generated as HMAC(B-TOKEN, 1) where both of these HMAC computations occur at block 1712. The URI_Key is used for (preferably authenticated) encryption and decryption of URI and Encrypted URI, respectively, where Encrypted URI, Salt and Label is deposited with the Coordinator 1718 at communication 1721. The Salt and Encrypted URI values are sent back to inquiring Participants 1724 at communication 1736 that match with the Coordinator 1718 on a value denoted as Label computed at block 1730 and sent at communication 1733 (derived from the B-TOKEN generated through communication 1727, preferably via a one-way function) that is deposited by the attesting Participant 1703 with the Coordinator 1718 (and is the same for all attesting Participants 1703). The inquiring Participant 1724 computes the URI Key at block 1739 and decrypts to get the URI using the URI Key at block 1742. Although not explicitly shown here, additional cryptographic keying material, as needed e.g., an initialization vector (IV)), may also be generated using B-TOKEN as an HMAC key.

Now referring to FIG. 18, although payment aspects are not necessarily in scope of the current invention, inquiring Participants 1803 need not be liable for payment unless the URI is currently reachable (where, e.g., the inquiring Participant 1803 exchanges with the Coordinator a URI_Token, e.g., hash(Ciphertext)).

An attesting Participant 1803 generates B-TOKEN by working with the Backend(s) and Translator 1806 at communication 1809 (as shown in FIG. 5). A preferably randomly generated Salt is combined with the B-TOKEN to derive a URI Key at block 1812. This B-TOKEN may be generated using two Backends in parallel or a single Backend. As an example, at block 1815 Encrypted URI may be derived via a mode of AES encryption (e.g., an AES-GCM key usable in Galois Counter Mode of the Advanced Encryption Standard) from URI by using a URI Key generated as HMAC(B-TOKEN, Salt), and Label may be generated as HMAC(B-TOKEN, 1) where both of these HMAC computations occur at block 1812. The URI_Key is used for (preferably authenticated) encryption and decryption of URI and Encrypted URI, respectively, where Encrypted URI, Salt and Label is deposited with the Coordinator 1818 at communication 1721. In addition, the attesting Participant 1803 submits a Content Key needed to unlock/decrypt the actual URI-held content denoted here as Ciphertext, along with hash(Ciphertext). The Salt and Encrypted URI values are sent back to inquiring Participants 1824 at communication 1836 that match with the Coordinator 1818 on a value denoted as Label computed at block 1830 and sent at communication 1833 (derived from the B-TOKEN generated through communication 1827, preferably via a one-way function) that is deposited by the attesting Participant 1803 with the Coordinator 1818 (and is the same for all attesting Participants 1803). The inquiring Participant 1824 computes the URI Key at block 1839 and decrypts to get the URI using the URI Key at block 1842. Although not explicitly shown here, additional cryptographic keying material, as needed e.g., an initialization vector (IV)), may also be generated using B-TOKEN as an HMAC key. The inquiring Participant 1824 retrieves Ciphertext from the Website 1845 at communication 1851, by entering the URI at communication 1848. The inquiring Participant 1824 hashes the Ciphertext retrieved from the active URI (i.e., in a reachable state), where the Ciphertext was previously deposited by the attesting Participant 1803. The inquiring Participant 1824 sends the Label; Salt; and hash(Ciphertext) to the Coordinator 1818 at communication 1854. The Coordinator 1818 confirms the hash(Ciphertext) it receives from the inquiring Participant 1824 against what was sent by the attesting Participant 1803, at block 1857. The Coordinator sends to the inquiring Participant 1824 the Content Key needed to decrypt the Ciphertext at communication 1860.

Note that the Coordinator is barred from using its knowledge of the Content Key that enables decryption of Ciphertext to recover plaintext content: the Coordinator cannot regenerate URI Key=HMAC(B-TOKEN, Salt) in order to recover the URI (from Encrypted URI) through which Ciphertext is made accessible; hash(Ciphertext) does not enable recovery of Ciphertext if the plaintext content is of suitably-high entropy and a suitably secure one-way hash function is used to generate hash(Ciphertext) from Ciphertext. In an alternative embodiment, the Content Key used to decrypt Ciphertext may be derived from a combination of a Content Key Component value provided by the Attestor to the Coordinator and a value that is derivable from the B-TOKEN that remains oblivious to the Coordinator.

In alternative embodiments, URI_Token may be derived independently of Ciphertext. In such embodiments, older Ciphertext may be deleted when it is replaced by an update (that is associated with the same URI_Token) without thus causing the plaintext content to be unavailable for recovery by a successful Requestor that inquires to the Coordinator after such replacement has occurred.

Attestation by an Attestor and Inquiry by a Requestor are depicted in FIG. 18, where the functionality is enhanced with the inclusion of Ciphertext, hash(Ciphertext) and Content Key.

The following protocol is referred to as Relayerless Notary Attestation in contrast to the Notary Attestation design, described in U.S. patent application Ser. No. 16/817,483, which utilized relayers as a main mechanism of accomplishing the obscuring of data. In order to avoid the Coordinator having access to B-TOKEN values for "Type B" tokens that are not intentionally made available by the Participant, the $bb_B$ and $tt_B$ Pohlig-Hellman secrets used below are preferably unrelated to $bb_A$ and $tt_A$ Pohlig-Hellman secrets, if any, used to generate "Type A" tokens and to any values used to generate "Type B" tokens that are intentionally made available to the Coordinator. Since it may be possible that the intersection of the set of DATA values and the set of INFO values may be non-null as used below, it is preferable to bifurcate the $bb_B$ and $tt_B$ values used herein into $bb_{B1}$ and $bb_{B2}$, and $tt_{B1}$ and $tt_{B2}$, respectively, where $bb_{B1}$ and $tt_{B1}$ are chosen independently of $bb_{B2}$ and $tt_{B2}$, respectively. Note that the Salt values generated and used below may be considered as values of random relative to their usage in the Relayer-based model. However, the Salt values used herein are provided to the Coordinator, while the values of random within the Relayer-based model are not provided to the Coordinator.

Relevant to FIG. 19-FIG. 30, by one approach, where tokenization processors comprised of, at least, a first tokenization processor and a second tokenization processor, by responding to tokenization requests from the requesting network elements, act to enable the coordinating network element to manage a protocol: the second tokenization processor receives at least one pair of values and an assertion that was verifiably generated by the first tokenization processor, as a verifiably generated assertion, wherein verifiability is based on a symmetric key available to the first tokenization processor and to the second tokenization processor or on a private key available to the first tokenization processor for which the second tokenization processor has available a corresponding public key, and wherein the verifiably generated assertion indicates that a first value in a first pair of the at least one pair of values has been derived from a second value in the first pair of the at least one pair of values using at least a first secret of one or more secrets available to the first tokenization processor or the first value in a second pair of the at least one pair of values has been derived by applying at least a second secret of the one or more secrets available to the first tokenization processor and the second value in the second pair of the at least one pair of values has been derived by applying at least a third secret of the one or more secrets available to the first tokenization processor; and the second tokenization processor uses one or more secrets that are distinct from the one or more secrets available to the first tokenization processor to generate at least one other value from at least one of the first value in a third pair of the at least one pair of values and the second value in the third pair of the at least one pair of values.

Further relevant to FIG. 19-FIG. 30, the first tokenization processor acts within at least one of the following roles: token migration, wherein two of the one or more secrets available to the first tokenization processor include a first token generation secret and a second token generation secret that is used for token replacement; audit facilitation, wherein the first tokenization processor archives a function of values at least one of which values is verifiable by the second tokenization processor via its inclusion in or reference by the verifiably generated assertion generated by the first tokenization processor; production of verifiably generated assertions by verifiably generating one or more assertions of operating by the first tokenization processor upon a first input using one of the one or more secrets available to the first tokenization processor wherein the first input matches that derived by the second tokenization processor from received raw input; and production of verifiably generated assertions by verifiably generating one or more assertions of operating upon a second input using one of the one or more secrets available to the first tokenization processor wherein the second input matches that which is included in or referenced by a signed authorization generated by the coordinating network element that is received and verified by at least one of the first tokenization processor and the second tokenization processor.

Figure 19:
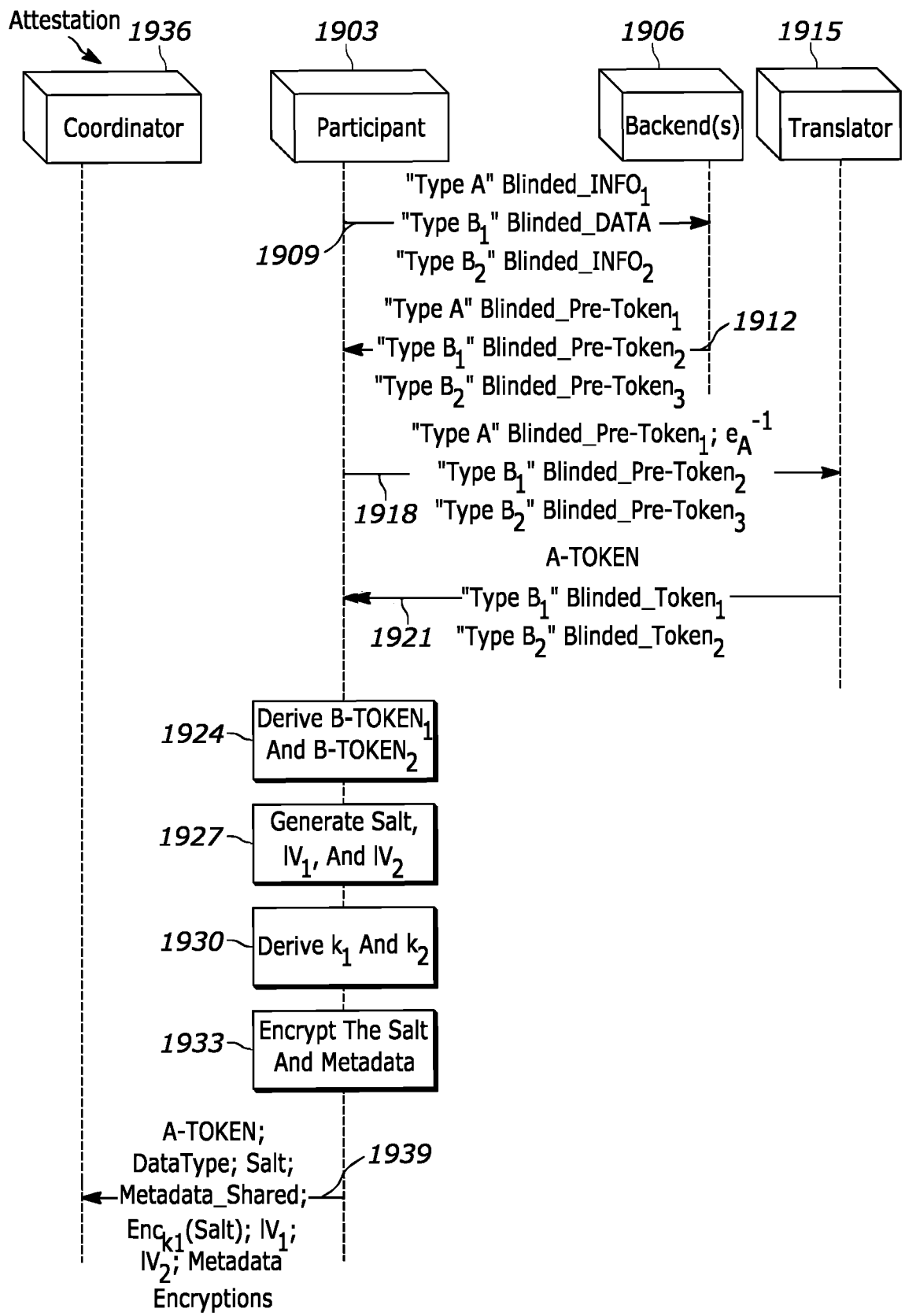
FIG. 19 comprises a flow diagram as configured in accordance with various embodiments of these teachings and that illustrates an alternative embodiment of attesting to enable corroboration through the use of "Relayerless Notary Attestations," including communication with processors including Backend(s) and a Translator, and a Coordinator. The transmissions depicted in FIG. 19 may include an overlay, such as encryption that is subsequently decrypted, that is not explicitly shown.

Now referring to FIG. 19, stepping through Attestation: the attesting Participant 1903 requests one A-TOKEN and two B-TOKENs by submitting to each Backend 1906 at communication 1909: ["Type A"; Blinded_INFO$_1$=e$_A$P$_1$]; ["Type B$_1$"; Blinded_DATA=e$_B$P$_2$]; and ["Type B$_2$"; Blinded_INFO$_2$=e$_B$P$_2$] where P$_1$ is the elliptic curve point representing the (appropriately padded) INFO that is used in the A-TOKEN request, P$_2$ is the elliptic curve point representing the (appropriately padded) DATA, and e$_A$ and e$_B$ are preferably randomly generated. The attesting Participant 1903 receives from each Backend 1906 at communication 1912: ["Type A"; Blinded_Pre-Token$_1$=bb$_A$e$_A$P$_1$]; ["Type B$_1$"; Blinded_Pre-Token$_2$=bb$_{B1}$e$_B$P$_2$]; and ["Type B$_2$"; Blinded_Pre-Token$_3$=bb$_{B2}$e$_B$P$_1$]. The attesting Participant 1903 submits to the Translator 1915 at communication 1918: ["Type A"; Blinded_Pre-Token$_1$(s); e$_A^{-1}$]; ["Type B$_1$"; Blinded_Pre-Token$_2$(s)]; and ["Type B$_2$"; Blinded_Pre-Token$_3$(s)] where two Blinded_Pre-Tokens for each type are sent if two parallel Backends 1906 are used, and only one for each type is sent if a single Backend 1906 is used. The attesting Participant 1903 receives from the Translator 1915 at communication 1921: A-TOKEN=hash(tt$_A$bb$_A$P$_1$); Blinded_Token$_1$=tt$_{B1}$bb$_{B1}$e$_B$P$_2$; and Blinded_Token$_2$=tt$_{B2}$bb$_{B2}$e$_B$P$_1$. If two Backends 1906 were used, the addition of the two Backend 1906 results (Blinded_Pre-Token(s)) will be done here by the Translator 1915 to generate the A-TOKEN and Blinded_Tokens, as well as the application of their privately held Pohlig-Hellman keys and unblinding for the A-TOKEN. The attesting Participant 1903 derives the following by applying e$_B^1$ and hashing at block 1924: B-TOKEN$_1$=hash(t$_{B1}$bb$_{B1}$P$_2$); and B-TOKEN$_2$=hash(t$_{B2}$bb$_{B2}$P$_1$). The attesting Participant 1903 randomly generates Salt, IV$_1$ and IV$_2$ at block 1927. At block 1930, the attesting Participant 1903 uses B-TOKEN$_1$ as an HMAC key to derive: $k_1$=HMAC(B-TOKEN$_1$, All 1's vector). In addition, at block 1930, the attesting Participant 1903 uses B-TOKEN$_2$ as an HMAC key to derive: $k_2$=HMAC(B-TOKEN$_2$, Salt). At block 1933, the attesting Participant 1903 encrypts Salt using AES-ECB mode (Advanced Encryption Standard using electronic codebook mode) with $k_1$ as the key: Enc$_{k1}$ (Salt); in order to derive $k_3$=HMAC(B-TOKEN$_2$, Enc$_{k1}$ (Salt)). In addition, at block 1933, the attesting Participant 1903 encrypts Metadata using AES-GCM (AES using Galois counter mode) with $k_2$ and IV$_1$, and $k_3$ and IV$_2$, respectively: Enc$_{k2}$ (Metadata), which includes Authentication Tag; Enc$_{k3}$ (Metadata), which includes Authentication Tag. The attesting Participant 1903 attests to the Coordinator 1936 by providing the following at communication 1939: A-TOKEN; dataType; Salt; Metadata_shared; Enc$_{k1}$ (Salt); IV$_1$; IV$_2$; Enc$_{k2}$ (Metadata); and Enc$_{k3}$ (Metadata). Here Metadata_shared denotes the metadata that the attesting Participant 1903 shares with the Coordinator 1936, which may not be identical to that which is shared with Requestors.

Where AES-ECB mode is depicted as used herein a different encryption algorithm and mode that also does not provide integrity could be used. The attesting Participant 1903 decrypting the material that used AES-ECB mode for encryption should not be reliant on the sender. Therefore, an authentication capability-enabled mode would run counter to the goal of this encryption. In addition, where AES-GCM mode is depicted as used herein a different encryption algorithm and mode that also provides integrity could be used (or a separate unauthenticated encryption mode and integrity mechanism, such as AES-CBC (cipher block chaining) mode and HMAC).

Figure 20:
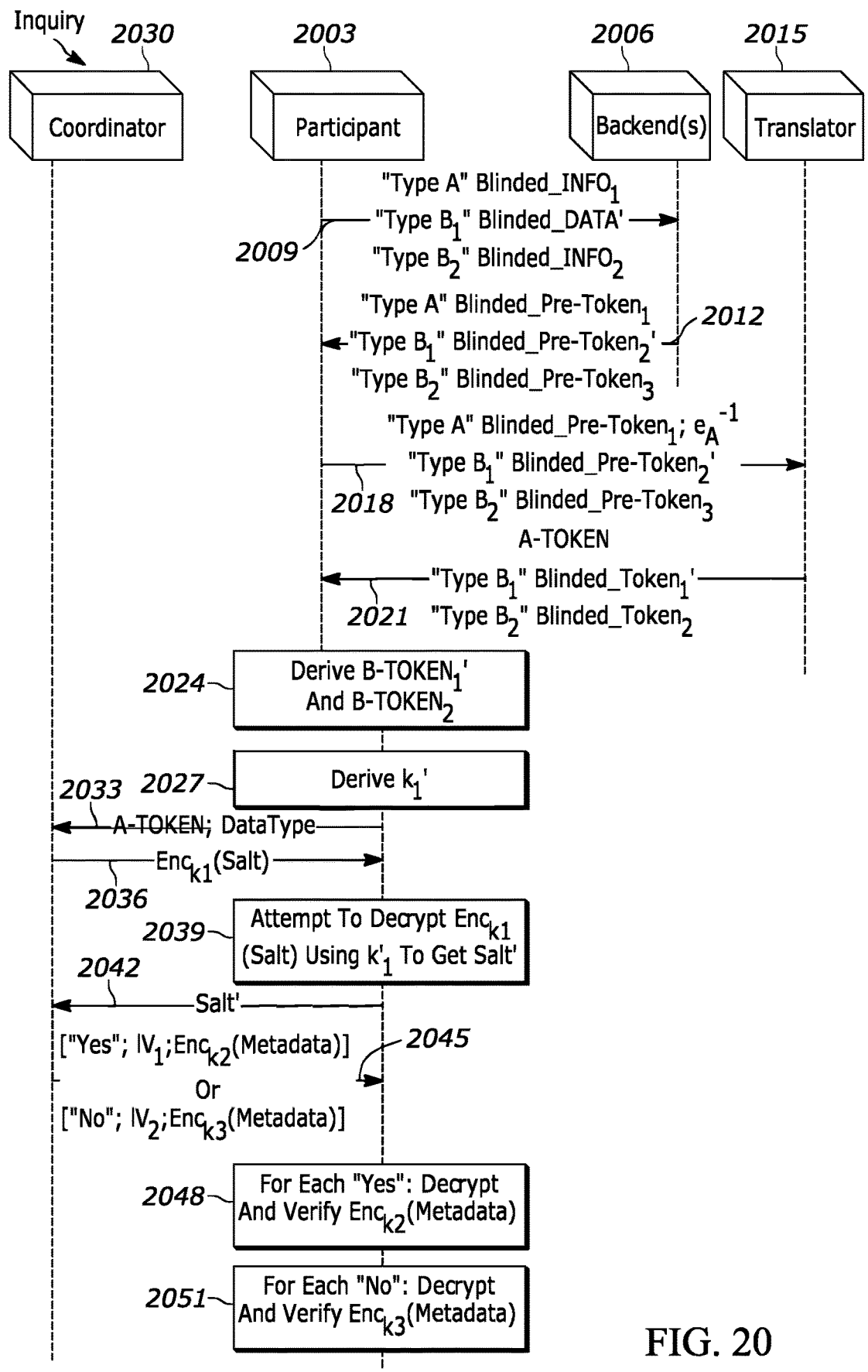
FIG. 20 comprises a flow diagram as configured in accordance with various embodiments of these teachings and that illustrates an alternative embodiment of inquiring to enable transference and corroboration through the use of "Relayerless Notary Attestations," including communication with processors including Backend(s) and a Translator, and a Coordinator. The transmissions depicted in FIG. 20 may include an overlay, such as encryption that is subsequently decrypted, that is not explicitly shown.

Now referring to FIG. 20, stepping through Inquiry: The inquiring Participant 2003 requests two B-TOKENs by submitting to each Backend 2006 at communication 2009: ["Type A"; Blinded_INFO$_1$=e$_A$P$_1$]; ["Type B$_1$"; Blinded_DATA'=e$_B$P$_2$']; and "Type B$_2$"; Blinded_INFO$_2$=e$_B$P$_1$ where P$_1$ is the elliptic curve point representing the (appropriately padded) INFO that is used in the A-TOKEN request, P$_2$ is the elliptic curve point representing the (appropriately padded) candidate data value, DATA', and e$_A$ and e$_B$ are preferably randomly generated. Here it is assumed P$_1$ is the same as that of the Attestor, since otherwise such Attestation would not be considered by the Requestor via the Coordinator's facilitation. The inquiring Participant 2003 receives from each Backend 2006 at communication 2012: ["Type A"; Blinded_Pre-Token$_1$(s)=bb$_A$e$_A$P$_1$]; ["Type B$_1$"; Blinded_Pre-Token$_2$(s)=bb$_{B1}$e$_B$P$_2$']; and ["Type B$_2$"; Blinded_Pre-Token$_3$(s)=bb$_{B2}$e$_B$P$_1$] where two Blinded_Pre-Tokens for each type are sent if two parallel Backends 2006 are used, and only one for each type is sent if a single Backend 2006 is used. The inquiring Participant 2003 submits to the Translator 2015 at communication 2018: ["Type A"; Blinded_Pre-Token$_1$; e$_A^{-1}$]; ["Type B$_1$"; Blinded_Pre-Token$_2$]; and ["Type B$_2$"; Blinded_Pre-Token$_3$]. The inquiring Participant 2003 receives from the Translator 2015 at communication 2021: A-TOKEN=hash(tt$_A$ bb$_A$P$_1$); Blinded_Token$_1$'=tt$_{B1}$bb$_{B1}$e$_B$P$_2$'; and Blinded_Token$_2$'=tt$_{B2}$bb$_{B2}$e$_B$P$_1$. If two Backends 2006 were used, the addition of the two Backend 2006 results (Blinded_Pre-Token(s)) will be done here by the Translator 2015 to generate the A-TOKEN and Blinded_Tokens, as well as the application of their privately held Pohlig-Hellman keys and unblinding for the A-TOKEN. The inquiring Participant 2003 derives the following by applying $e_B^{-1}$ and hashing at block 2024: B-TOKEN$_1$'=hash (tt$_{B1}$bb$_{B1}$P$_2$); and B-TOKEN$_2$=hash(tt$_{B2}$bb$_{B2}$P$_1$). The inquiring Participant 2003 uses B-TOKEN$_1$' as an HMAC key to derive the following at block 2027: $k_1$'=HMAC(B-TOKEN$_1$', All 1's vector). The inquiring Participant 2003 inquires to the Coordinator 2030 by providing the following at communication 2033: A-TOKEN; and dataType. The Coordinator 2030 responds to the inquiring Participant 2003 with the appropriate value(s) at communication 2036: Enc$_{k1}$ (Salt). At block 2039, the inquiring Participant 2003 decrypts each Enc$_{k1}$ (Salt) value using AES-ECB with $k_1$' as key, resulting in Salt' value(s). The inquiring Participant 2003 provides to the Coordinator 2030 ordered Salt' values(s) at communication 2042. For each received Salt' value, the Coordinator 2030 responds with the following at communication 2045: "YES" with IV$_1$ and Enc$_{k2}$ (Metadata); or "NO" with IV$_2$ and Enc$_{k3}$ (Metadata). This "YES" or "NO" response depends on whether or not Salt'=Salt. At block 248, for each received "YES" with IV$_1$ and Enc$_{k2}$ (Metadata), the inquiring Participant 2003 derives $k_2$'=HMAC(B-TOKEN$_1$', Salt') using IV$_1$ and $k_2$', attempts to decrypt and verify Enc$_{k3}$ (Metadata). At block 251, for each received "NO" with IV$_2$ and Enc$_{k3}$ (Metadata), the inquiring Participant 2003 decrypts and verifies each Enc$_{k3}$ (Metadata) using $k_3$=HMAC(B-TOKEN$_2$, Enc$_{k1}$ (Salt)) and IV$_2$.

As mentioned previously, this application of the "Type B" tokenization method is preferably isolated from other potential applications of "Type B" tokenization by using different Pohlig-Hellman keys. Along with absence of knowledge of Pohlig-Hellman blinding factor e$_B$, this would imply that the Translator and Coordinator are denied access to the B-TOKEN$_1$ and B-TOKEN$_2$ values that were generated using these alternative Pohlig-Hellman keys, and thus that the Coordinator could not learn DATA values or falsify the Metadata made available to Requestors (provided that the Coordinator does not have access to both the Backend and the Translator). It is intended that this method be strictly stronger than the Relayer-based Notary Attestations method in that the Coordinator be unable to successfully transmit false positives to the inquiring Participant. Averting these false positives is handled differently than the way in which U.S. patent application Ser. No. 16/817,483 addresses the issue.

For relative simplicity, here it is depicted that the Metadata that is recovered by all Requestors, whether successful or not, is the same as that received upon successful matching (i.e., DATA=DATA'). This is consistent with the Relayer-based method in that in that case there is only a single opportunity for the Requestor to access metadata placed by the Attestor (with the Relayers) for recovery only by Requestors (whether successful or not). Requestors who are successful, receive an encryption for each "YES". This encryption contains the same Metadata unsuccessful Requestors receive. However this encryption can only be decrypted using $k_2$, meaning both the Enc$_{k1}$ (Salt') from the Coordinator and the B-TOKEN' generated in the tokenization process must be correct. This prevents the Coordinator from responding with undetected false positives when Salt'≠ Salt. In particular, a Coordinator that lacks knowledge of $k_2$'=HMAC(B-TOKEN$_1$', Salt') will not know how to generate ciphertext that will pass the authenticated encryption test when the Requestor attempts decryption using $k_2$'. Unsuccessful Requestors receive an encryption of the Metadata that necessitates knowledge of $k_3$ to decrypt. That is, the encryption is specific to the Salt-dependent (as well as data-dependent) value of Enc$_{k1}$ (Salt). This ensures that not only the recovered Metadata was attested to using the proper A-TOKEN based on INFO (because of the dependence of $k_3$ on B-TOKEN$_2$), but also ensures the recovered Metadata is the original attached to the Attestation and not a duplicate of another Metadata that matched on the A-TOKEN. Thus, successful reattribution of Metadata across Attestors is thwarted, as long as the Participant-side client software is designed to reject multiple copies of Enc$_{k1}$ (Salt) from the Coordinator.

It may be desirable to have a protocol in which a Requestor would be able to access strictly more metadata upon successful matching than available to all Requestors (successful or not). This system would be a Notary-guarded Registry Attestation protocol, in the sense that a Requestor would be required to match (INFO and DATA) on a Notary Attestation in order to access the metadata intended to be transferred only to such successful Requestors. To accomplish this goal, the metadata encrypted using k$_2$ to be recovered via decryption by successful Requestors would include the Notary-guarded information as opposed to the metadata to be recovered via decryption by unsuccessful Requestors using k$_3$. Note that the Coordinator cannot cheat and give that guarded/gated Registry-style data to a non-successful Requestor, since decryption requires knowledge of the B-TOKEN$_1$ that is derived from DATA (where the symmetric encryption key is derived by applying HMAC to Salt with that B-TOKEN$_1$ as HMAC key).

The following protocol is referred to as Relayerless Registry Attestation in contrast to the Registry Attestation design, described in U.S. patent application Ser. No. 16/817,483, which utilized relayers as a main mechanism of accomplishing the obscuring of data. here the Backend and the Translator are provisioned with Pohlig-Hellman secrets that are different than those provisioned for the other uses of the "Type B" tokenization method, namely bb$_{B3}$ and tt$_{B3}$, respectively. Setting BIT=0 denotes Attestation, while setting BIT=1 denotes Inquiry. This BIT is not utilized in this section but is utilized in the audit process of this design described in FIG. 30. Details of the optional audit capability include archiving by the Backend of hash values such as hash(BIT||PID||Timestamp||P||Pre-Token).

The use of the Coordinator-generated signature, SIG, may be considered optional. SIG, where used, constitutes a form of authorization, as a signed authorization. However, the specific utility of SIG differs from the examples of Coordinator-provided Authorizations discussed in U.S. patent application Ser. No. 16/817,483, such as pertaining to use by Relayers. If the use of SIG is not desired, a simpler protocol is enabled. PID here refers to a Participant ID, which may be an Attestor ID or a Requestor ID. The actual Attestation or Inquiry process may be disjoint from the token acquisition process in which an Attestor ID or a Requestor ID is used. Audit may be limited to Attestors only. In that case, preferably the Coordinator accepts Attestations only if the BIT value under HMAC indicates Attestation, so that there is an expectation that the Backend has archived. The Coordinator may be directly aware of that to the extent that the Translator and Coordinator are co-located, or other communications between the Translator and Coordinator may be used. The communications rounds shown here are based on inclusion of SIG and HMACvalue and use of Attestation_Identifier, and can differ accordingly if one or more of these elements are removed from consideration. The HMACvalue used in the following protocol allows SIG to be utilized by both the Backend and the Translator to confirm both processors are acting on the same P$_2$. This HMACvalue is also used in the Audit protocol of this design. However, it is used for additional reasons relating to the audit capability in that instance.

Recall that PID may be available to a relying party based on the request being signed using a Participant private key that corresponds to a Participant public key that is known to be associated with a PID, which may be a pseudonymous Participant ID or an actually identifying Participant ID.

Figure 21:
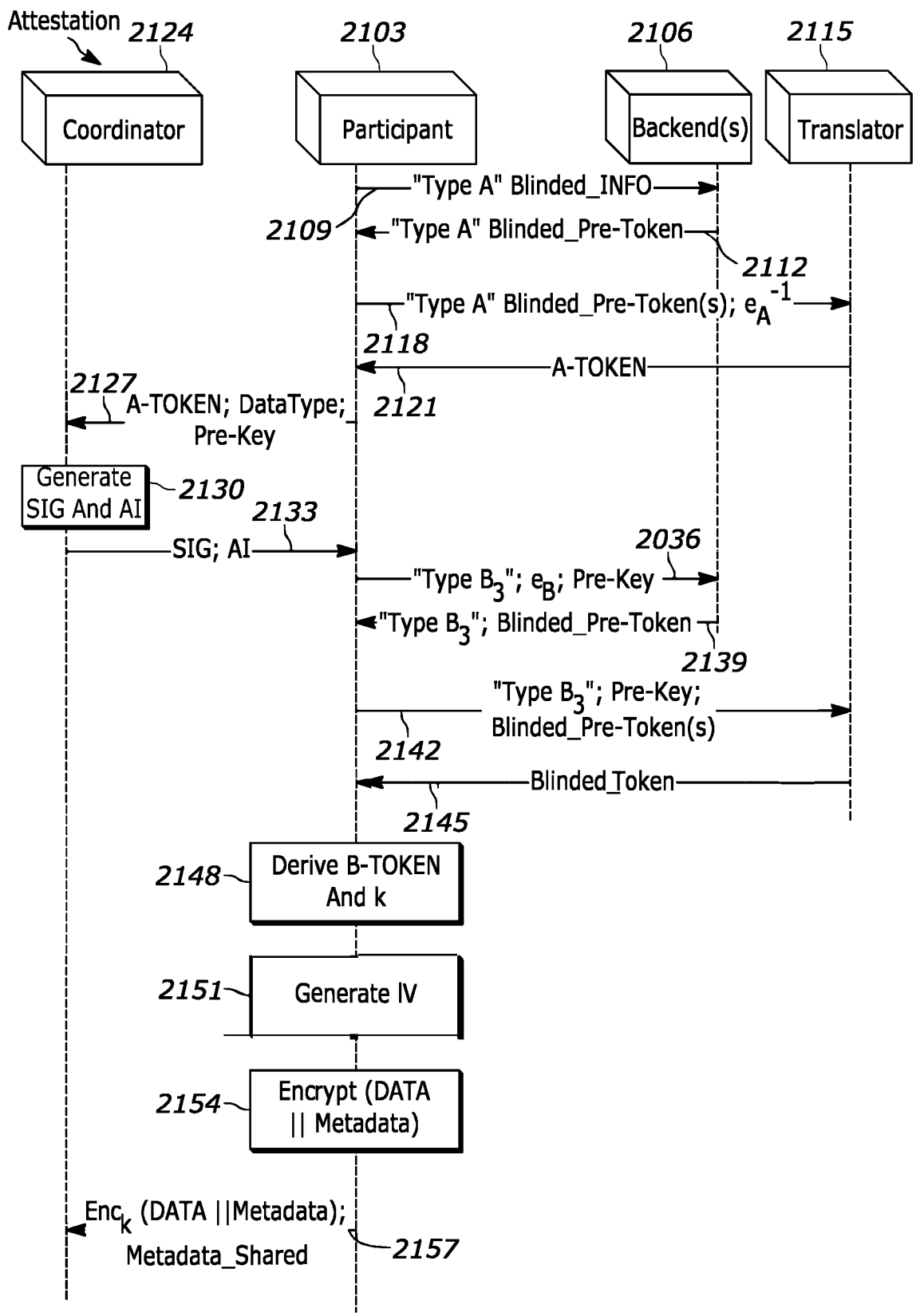
FIG. 21 comprises a flow diagram as configured in accordance with various embodiments of these teachings and that illustrates attesting to enable transference through the use of "Relayerless Registry Attestations," including communication with processors including Backend(s) and a Translator, and a Coordinator. The transmissions depicted in FIG. 21 may include an overlay, such as encryption that is subsequently decrypted, that is not explicitly shown.

Referring now to FIG. 21, stepping through Attestation: the attesting Participant 2103 requests an A-TOKEN by submitting to each Backend 2106 at communication 2109: ["Type A"; Blinded_INFO=e$_A$P$_1$] where P$_1$ is the elliptic curve point representing the (appropriately padded) INFO that is used in the A-TOKEN request and e$_A$ is preferably randomly generated. The attesting Participant 2103 receives from each Backend 2106 at communication 2112: ["Type A"; Blinded_Pre-Token=bb$_A$e$_A$P$_1$]. The attesting Participant 2103 submits to the Translator 2115 at communication 2118: ["Type A"; Blinded_Pre-Token(s); e$_A^{-1}$] where two Blinded_Pre-Tokens are sent if two parallel Backends 2106 are used, and only one is sent if a single Backend 2106 is used. The Translator 2115 applies tt$_A$e$_A^{-1}$ mod n to Blinded_Pre-Token, hashes and sends back to the attesting Participant 2103 at communication 2121: A-TOKEN=hash(tt$_A$bb$_A$P$_1$). If two Backends 2106 were used, the addition of the two Backend 2106 results (Blinded_Pre-Token) will be done here by the Translator 2115 to generate the A-TOKEN, as well as the application of their tt$_A$ and the unblinding. The attesting Participant 2103 requests authorization to create an Attestation from the Coordinator 2124 by providing the following at communication 2127: A-TOKEN; dataType; and P$_2$ where P$_2$ is the elliptic curve point representing a preferably randomly generated (and appropriately padded) 256-bit Pre-key. At block 2130, the Coordinator 2124 generates a random, 32-byte value Attestation_Identifier (AI) [concurrently, the Coordinator 2124 preferably publishes the Attestation_Identifier to the AttestationRegistry blockchain smart contract]. In addition, at block 2130, the Coordinator 2124 generates a signature, SIG, over P$_2$, PID=Attestor ID and Validity Period. The Coordinator 2124 provides AI and SIG to the attesting Participant 2103 at communication 2133. The attesting Participant 2103 requests a B-TOKEN by submitting to each Backend 2106 at communication 2136: "Type B$_3$"; e$_B$; BIT=0; P$_2$; Validity Period; SIG, where e$_B$ is preferably randomly generated. The attesting Participant 2103 subsequently submits to the Translator 2115 at communication 2142: "Type B$_3$"; SIG; Validity Period; P$_2$; HMACvalue=HMAC(HMAC_Key, BIT||PID||Timestamp||P$_2$||Blinded_Pre-Token); BIT=0; Timestamp; and Blinded_Pre-Token(s)=bb$_{B3}$ e$_B$P$_2$, where each Backend 2106 has responded to the attesting Participant 2103 with Blinded_Pre-Token, Timestamp and HMACvalue at communication 2139. The attesting Participant 2103 receives from the Translator 2115 Blinded_Token=tt$_{B3}$bb$_{B3}$e$_B$P$_2$ at communication 2145. If two Backends 2106 were used, the addition of the two Backend 2106 results (Blinded_Pre-Token) will be done here by the Translator 2115 to generate the Blinded_Token, as well as the application of their tt$_{B3}$. At block 2148, the attesting Participant 2103 derives the following AES-GCM key k from Blinded_Token by applying e$_B^{-1}$ and hashing: k=B-TOKEN=hash(tt$_{B3}$bb$_{B3}$P$_2$). At block 2151, the attesting Participant 2103 computes IV=appropriately truncated SHA-3-256 (AI||0). At block 2154, the attesting Participant 2103 encrypts DATA and Metadata using AES-GCM with IV: Enc$_k$(DATA||Metadata), which includes Authentication Tag. The attesting Participant 2103 provides to the Coordinator 2124 at communication 2157 Enc$_k$(DATA||Metadata) and Metadata_shared. Here Metadata_shared denotes the metadata that the attesting Participant 2103 shares with the Coordinator, which may not be identical to that which is shared with Requestors.

Figure 22:
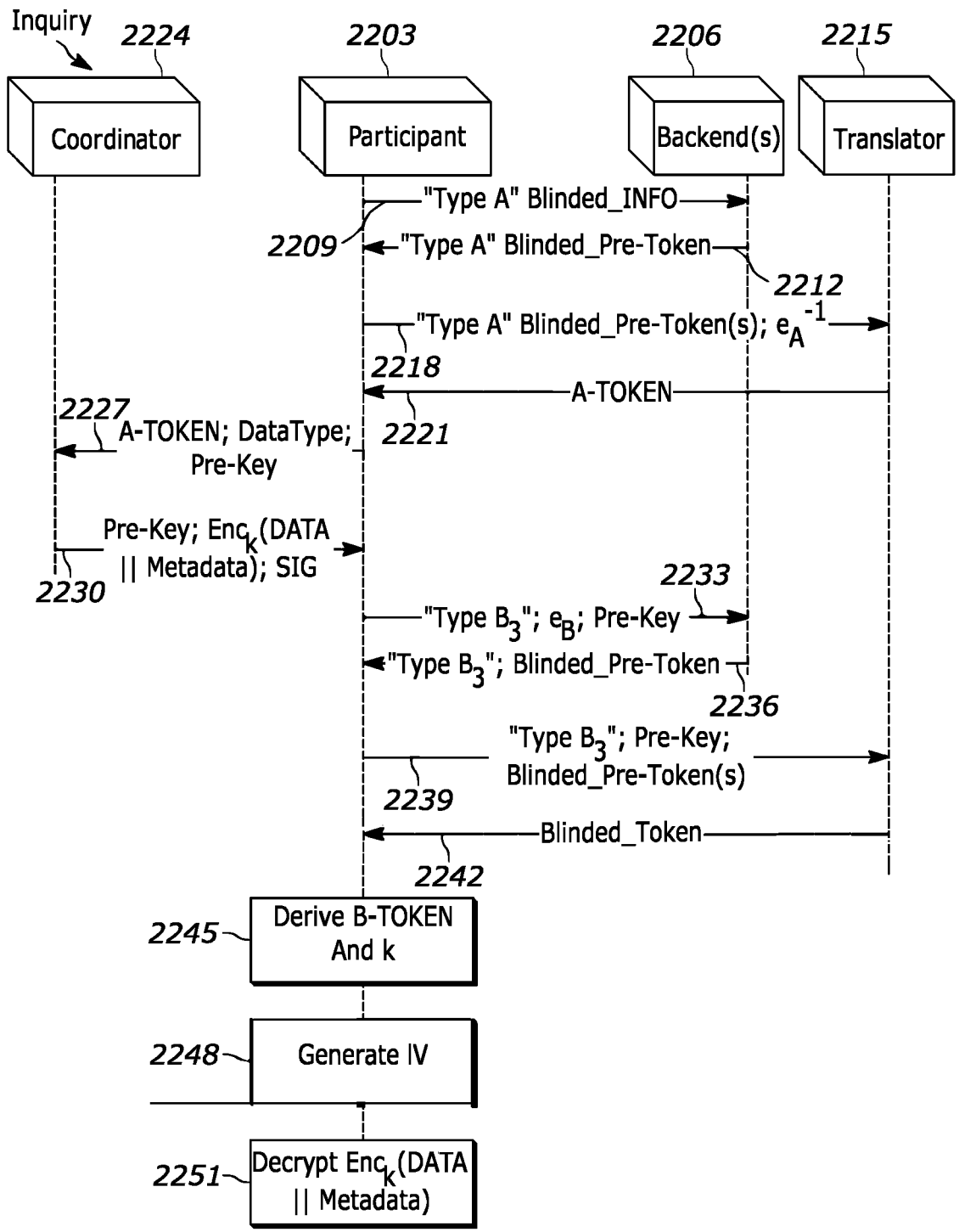
FIG. 22 comprises a flow diagram as configured in accordance with various embodiments of these teachings and that illustrates inquiring to enable transference through the use of "Relayerless Registry Attestations," including communication with processors including Backend(s) and a Translator, and a Coordinator. The transmissions depicted in FIG. 22 may include an overlay, such as encryption that is subsequently decrypted, that is not explicitly shown.

Now referring to FIG. 22, stepping through Inquiry: the inquiring Participant 2203 requests an A-TOKEN by submitting to each Backend 2206 at communication 2209: ["Type A"; Blinded_INFO=$e_A P_1$] where $P_1$ is the elliptic curve point representing the (appropriately padded) INFO that is used in the A-TOKEN request and $e_A$ is preferably randomly generated. The inquiring Participant 2203 receives from the Backend 2206 at communication 2212: ["Type A"; Blinded_Pre-Token=$bb_A e_A P_1$; $e_A^{-1}$]. The inquiring Participant 2203 submits to the Translator 2215 at communication 2218: ["Type A"; Blinded_Pre-Token(s)]. The Translator 2215 applies $tt_A e_A^{-1}$ mod n to Blinded_Pre-Token, hashes and sends back to the inquiring Participant 2203 at communication 2221: A-TOKEN=hash($tt_A bb_A P_1$). If two Backends 2206 were used, the addition of the two Backend 2206 results (Blinded_Pre-Token) will be done here by the Translator 2215 to generate the A-TOKEN, as well as the application of their $tt_A$ and the unblinding. The inquiring Participant 2203 inquires to the Coordinator 2224 by providing A-TOKEN and dataType at communication 2227. The Coordinator 2224 responds to the inquiring Participant 2203 at communication 2230 with the appropriate value set(s): AI; $P_2$; $Enc_k$(DATA||Metadata); SIG, where SIG is generated over $P_2$, Requestor ID and Validity Period. For each received value of $P_2$, the inquiring Participant 2203 requests a B-TOKEN by submitting to each Backend 2206 at communication 2233: "Type $B_3$"; $e_B$; BIT=1; $P_2$; Validity Period; SIG, where $e_B$ is preferably randomly generated. The inquiring Participant 2203 subsequently submits to the Translator 2215 at communication 2239: "Type $B_3$"; SIG; Validity Period; $P_2$; HMACvalue(s)=HMAC(HMAC_Key, BIT||PID||Timestamp||$P_2$||Blinded_Pre-Token); BIT=1; Timestamp; Blinded_Pre-Token(s)=$bb_{B3} e_B P_2$, where each Backend 2206 has responded to the inquiring Participant 2203 at communication 2236 with Blinded_Pre-Token, Timestamp and HMACvalue. The inquiring Participant 2203 receives from the Translator 2215 at communication 2242 Blinded_Token=$tt_{B3} bb_{B3} e_B P_2$. If two Backends 2206 were used, the addition of the two Backend 2206 results (Blinded_Pre-Token) will be done here by the Translator 2215 to generate the Blinded_Token, as well as the application of their $tt_{B3}$. At block 2245, the inquiring Participant 2203 derives AES-GCM key k from Blinded_Token by applying $e_B^{-1}$ and hashing: k=B-TOKEN=hash($tt_{B3} bb_{B3} P_2$). At block 2251, the inquiring Participant 2203 uses AI and k to decrypt and verify $Enc_k$(DATA||Metadata), where IV=appropriately truncated SHA-3-256 (AI||0) generated at block 2248.

As depicted above, one can instantiate the audit capability for Relayerless Registry Attestations by having the Participant/gateway generate the blinding factor and send it to the Backend. Alternatively, the Backend could generate a blinding factor and include that in what it sends to the Participant. The two are functionally equivalent. The bottom line is that the audit artifacts uploaded by the Backend must hash the unblinded version of the Pre-Token (so that it is reproducible by an Auditor without entrusting the unblinding factor (or, equivalently, the blinding factor) to the Coordinator/Translator, which would break the blinding of the data because the Coordinator could then recover the decryption key and apply it to the ciphertext)—while the Backend must also access the blinded version of the Pre-Token: The computation of the HMACvalue produced by the Backend for consumption by the Translator must include the blinded version of the Pre-Token along with the Pre-Key that the Backend operated on to produce the blinded and unblinded versions of the Pre-Token—so that the Translator can correlate the blinded Pre-Token value it processes (to generate the blinded token that it returns to the Participant) to the Pre-Key value that it stores to hand out to Requestors (and to an Auditor). The blinded Pre-Token and the Pre-Key can be considered a pair of values. Timestamps used for the audit capabilities may potentially be eliminated or replaced by other parameters. If actual date/time stamps are used, the Translator may check the acceptability of such Timestamp values relative to its local clock settings. This may optionally account for legitimate delays between token acquisition and use during Attestation or Inquiry.

This mechanism also enables the Coordinator to provide the same signed Pre-Key (i.e., SIG) to both the Backend and the Translator, avoiding an additional round-trip during Inquiry for the Requestor to obtain another SIG from the Coordinator over the blinded Pre-Token value to present to the Translator (where it is not assumed that the Coordinator and Translator are monolithic). While a Coordinator-generated Attestation Identifier (AI) is used above as a way to uniquely source initialization vectors, initialization vectors may alternatively be provided by Attestors. In that case, the Coordinator preferably verifies such initialization vectors for uniqueness relative to initialization vectors associated with previous Attestations.

If the Coordinator signature (SIG) is not desired, the resultant flow simplifies processing significantly as communications between the Backend and Translator may be combined if an authorization from the Coordinator is not required. If SIG is not required in the Attestation process, there is no benefit to requesting authorization from the Coordinator for Inquiry to go to the Backend and Translator. If the Participant wanted to make an Inquiry on a B-TOKEN for a given $P_2$ and did not have authorization from the Coordinator to request the B-TOKEN, the Participant would simply request the B-TOKEN under the pretext of attesting rather than inquiring since attesting would not require the SIG to be processed. If SIG is not required as depicted in the protocols above, there is no value in utilizing the HMACvalue. The HMACvalue allows the Translator to receive assurance that the received material is the material computed on by the Backend, who in turn had confirmed the SIG from the Coordinator. The HMACvalue is therefore a method of ensuring the Translator that the Pre-key the Backend received was originally authorized by the Coordinator. However, if the HMACvalue is used in the auditing process and not only as a method of extending the use of SIG, the HMACvalue must not be removed. In other words, it is possible to use the protocol without SIG, but the HMACvalue must be used.

Figure 23:
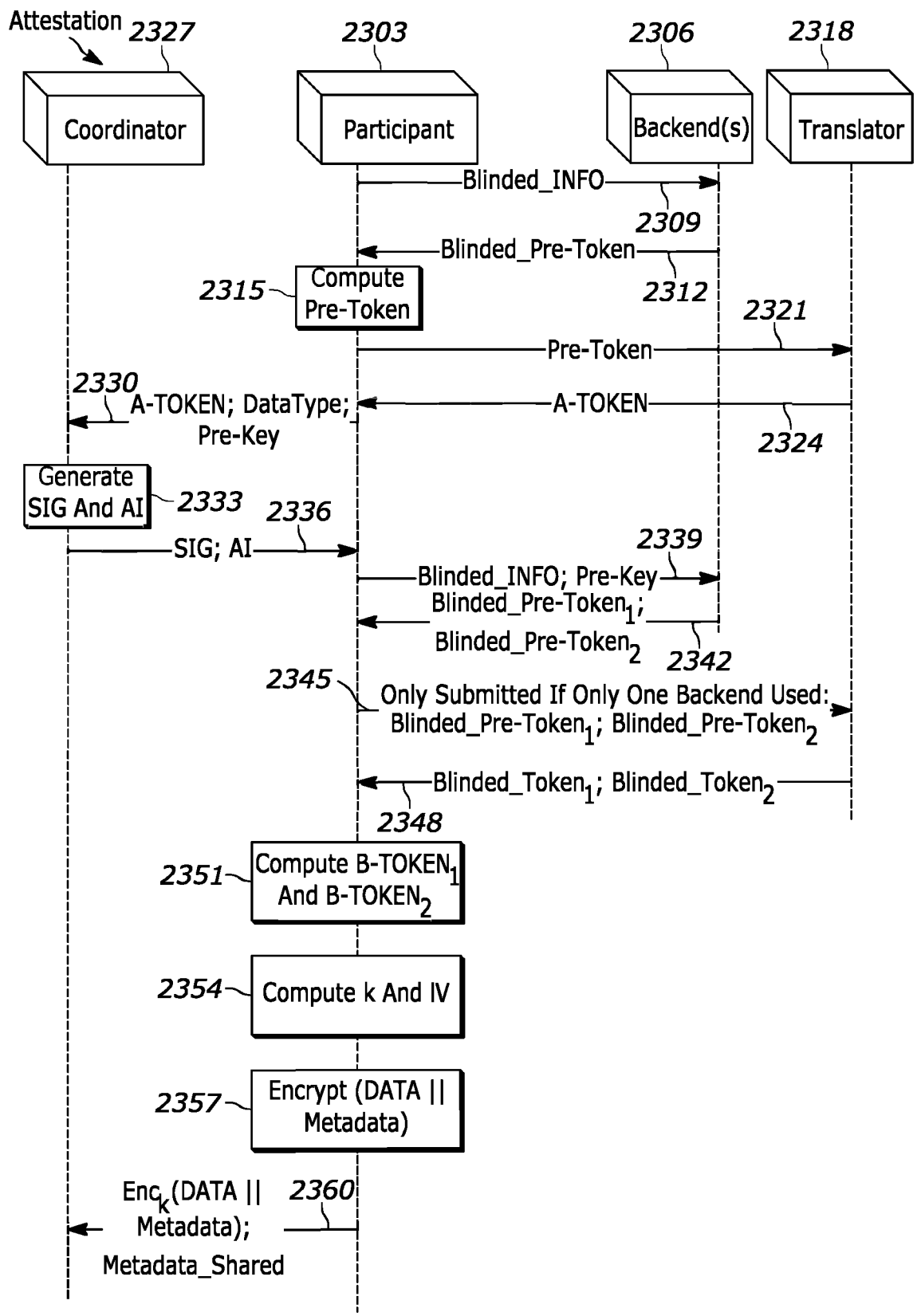
FIG. 23 comprises a flow diagram as configured in accordance with various embodiments of these teachings and that illustrates an alternative embodiment of attesting to enable transference through the use of "Relayerless Registry Attestations," including communication with processors including Backend(s) and a Translator, and a Coordinator. The transmissions depicted in FIG. 23 may include an overlay, such as encryption that is subsequently decrypted, that is not explicitly shown.
Figure 24:
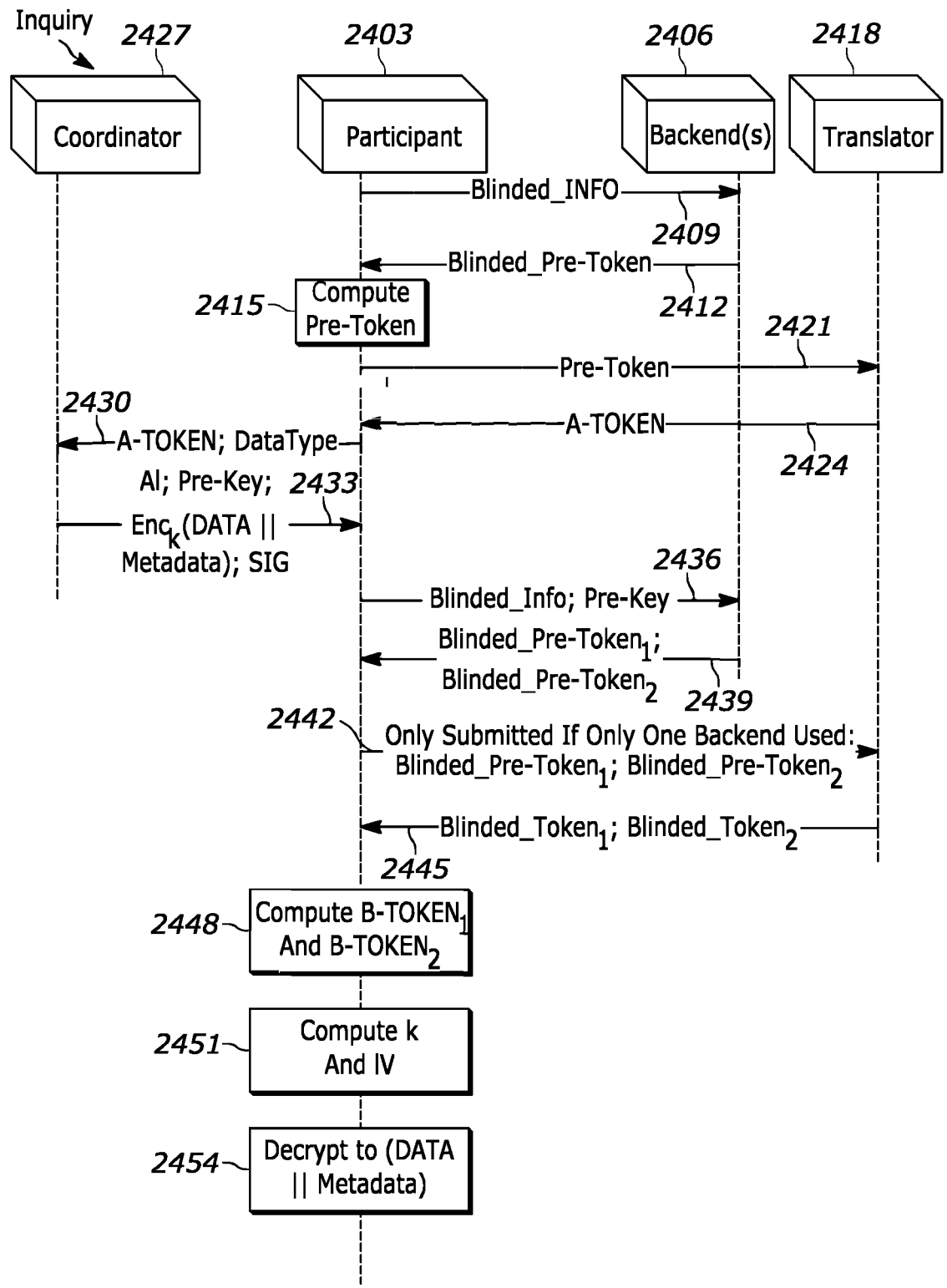
FIG. 24 comprises a flow diagram as configured in accordance with various embodiments of these teachings and that illustrates an alternative embodiment of inquiring to enable transference through the use of "Relayerless Registry Attestations," including communication with processors including Backend(s) and a Translator, and a Coordinator. The transmissions depicted in FIG. 24 may include an overlay, such as encryption that is subsequently decrypted, that is not explicitly shown.

The design described in FIG. 23 and FIG. 24 is an enhanced alternative embodiment of Relayerless Registry Attestation described above. The reason for including this alternative embodiment is that it adds protection against accessing the DATA value without knowledge of the INFO that maps to the A-TOKEN that is associated with the DATA value. One reason for having also included the earlier-described embodiment without this additional protection is that there may be use cases where Registry Attestations are used without accompanying unambiguous entity resolution, i.e., without A-TOKEN values. Furthermore, the previously described Relayerless Registry Attestation method lends itself to direct application of the audit method presented in FIG. 30 in that an Auditor can complete the process without involvement in requesting generation of B-TOKEN values that depend on values of INFO to which an Auditor may not have access. The Backend(s) and the Translator are depicted using Pohlig-Hellman secrets that are distinct from those provisioned for the other uses of the "Type B" tokenization method, namely, $bb_{B3}$ and $tt_{B3}$, and $bb_{B4}$ and $tt_{B4}$. The audit method is not included here, in that an Auditor may not be equipped to have knowledge regarding INFO used for token acquisition.

The method can be modified to accommodate for this. The HMACvalues computed below may be compound, i.e., computed relative to a plurality of $P_1$ and Blinded_Token$_1$ values or may be computed over individual $P_1$ and Blinded_Pre-Token$_1$ values, where a $P_1$ value and a Blinded_Pre-Token$_1$ value may be considered a pair of values. In the protocol below there are two separate blinding factors $e_{B1}$, $e_{B2}$ although both the tokens they are used to form are "Type B" tokens. This is due to the fact that INFO must be blinded from the Backend, and B-TOKEN derived from the Pre-key must be blinded from the Translator. As the blinding factor for this second B-TOKEN is applied at the Backend, $e_{B1}$ and $e_{B2}$ must not be equal or the Backend would be able to determine INFO.

Now referring to FIG. 23, stepping through Attestation: the attesting Participant 2303 requests an A-TOKEN by submitting to the Backend(s) 2306 at communication 2309: ["Type A"; Blinded_INFO=$e_A P_2$] where $P_2$ is the elliptic curve point representing the (appropriately padded) INFO that is used in the A-TOKEN request and $e_A$ is preferably randomly generated. If utilizing more than one Backend 2306 in parallel, the attesting Participant 2303 sends the same to both Backends 2306, as described in FIG. 6. The attesting Participant 2303 receives from the Backend(s) 2306 at communication 2312: ["Type A"; Blinded_Pre-Token=$bb_A e_A P_2$]. The attesting Participant 2303 computes Pre-Token=$bb_A P_2$ at block 2315. The attesting Participant 2303 sends to the Translator 2318 at communication 2321: ["Type A"; Pre-Token=$bb_A P_2$]. Pre-Token is computed by unblinding by applying $e_A^{-1}$ and add the two Blinded_Pre-Tokens if utilizing two Backends 2306 as described in FIG. 6. The Translator 2318 applies $tt_A$ to Pre-Token, hashes and sends back to the attesting Participant 2303 at communication 2324: A-TOKEN=hash($tt_A bb_A P_2$).

The attesting Participant 2303 requests authorization to create an Attestation from the Coordinator 2327 by providing [A-TOKEN; dataType; $P_1$] at communication 2330, where $P_1$ is the elliptic curve point representing a preferably randomly generated (and appropriately padded) 256-bit Pre-key. At block 2333, the Coordinator 2327 generates a random, 32-byte value Attestation_Identifier (AI) [concurrently, the Coordinator 2327 preferably publishes the Attestation_Identifier to the AttestationRegistry blockchain smart contract]. Additionally, at block 2333, the Coordinator 2327 generates a signature, SIG, over $P_1$, PID=Attestor ID and Validity Period. The Coordinator 2327 provides AI and SIG to the attesting Participant 2303 at communication 2336.

The attesting Participant 2303 requests two B-TOKENs by submitting to the Backend(s) 2306 at communication 2339: ["Type $B_1$"; $e_{B1}$; $P_1$; Validity Period; SIG; "Type $B_2$"; $e_{B2} P_2$], for randomly and independently generated $e_{B1}$ and $e_{B2}$, where $P_2$ is the elliptic curve point representing the (appropriately padded) INFO that is used in the A-TOKEN request. If utilizing more than one Backend 2306 in parallel, the attesting Participant 2303 sends the same to both Backends 2306, as described in FIG. 6. The attesting Participant 2303 receives from the Backend(s) 2306 at communication 2342: ["Type $B_1$"; Blinded_Pre-Token$_1$=$bb_{B1}$ $e_{B1} P_1$]; ["Type $B_2$"; Blinded_Pre-Token$_2$=$bb_{B2} e_{B2} P_2$]; and HMACvalue=HMAC (HMAC_Key, $P_1$∥Blinded_Pre-Token$_1$). If received from two Backends 2306, the attesting Participant 2303 bypasses the Translator 2318 and proceeds to generating the B-TOKEN$_1$ and B-TOKEN$_2$ at block 2351 by doing the following computations where [Blinded_Pre-Token$_{X1}$; Blinded_Pre-Token$_{X2}$] came from Backend X and [Blinded_Pre-Token$_{Y1}$; Blinded_Pre-Token$_{Y2}$] came from Backend Y: B-TOKEN$_1$=hash($e_{B1}^{-1}$ (Blinded_Pre-Token$_{X1}$+Blinded_Pre-Token$_{Y1}$)) and B-TOKEN$_2$=hash($e_{B2}^{-1}$ (Blinded_Pre-Token$_{X2}$+Blinded_Pre-Token$_{Y2}$)). If utilizing a single Backend 2306, the attesting Participant 2303 submits to the Translator 2318 at communication 1245: ["Type $B_1$"; Blinded_Pre-Token$_1$]; ["Type $B_2$"; Blinded_Pre-Token$_2$]; SIG; Validity Period; and $P_1$. The attesting Participant 2303 receives from the Translator 2318 at communication 2348: Blinded_Token$_1'$=$tt_{B1} bb_{B1} e_{B1} P_1$ and Blinded_Token$_2$=$tt_{B2} bb_{B2} e_{B2} P_2$. At block 2351, the attesting Participant 2303 derives B-TOKEN$_1$ and B-TOKEN$_2$ by applying $em^{-1}$ and $e_{B2}^{-1}$, respectively, and hashing, B-TOKEN$_1$=hash($em^{-1}$ (Blinded_Token$_1$)) and B-TOKEN$_2$=hash($e_{B2}^{-1}$ (Blinded_Token$_2$)). At block 2354, the attesting Participant 2303 derives AES-GCM key k=HMAC(B-TOKEN$_2$, B-TOKEN$_1$) and IV=appropriately truncated SHA-3-256 (AI∥0). At block 2357, the attesting Participant 2303 encrypts DATA and Metadata using AES-GCM with IV: Enc$_k$(DATA∥Metadata), which includes Authentication Tag. The attesting Participant 2303 provides to the Coordinator 2327 at communication 2360: Enc$_k$(DATA∥Metadata); Metadata_shared. Here Metadata_shared denotes the metadata that the Attestor shares with the Coordinator 2327, which may not be identical to that which is shared with Requestors.

Now referring to FIG. 24, stepping through Inquiry: the inquiring Participant 2403 requests an A-TOKEN by submitting to the Backend(s) 2406 at communication 2409: ["Type A"; Blinded_INFO=$e_A P_2$] where $P_2$ is the elliptic curve point representing the (appropriately padded) INFO that is used in the A-TOKEN request and $e_A$ is preferably randomly generated. If utilizing more than one Backend 2406 in parallel, the inquiring Participant 2403 sends the same to both Backends 2406, as described in FIG. 6. The inquiring Participant 2403 receives from the Backend(s) 2406 at communication 2412: ["Type A"; Blinded_Pre-Token=$bb_A e_A P_2$]. At block 2415, the inquiring Participant 2403 computes Pre-Token=$bb_A P_2$ by unblinding by applying $e_A^{-1}$ and add the two Blinded_Pre-Tokens if utilizing two Backends 2406 as described in FIG. 6. The inquiring Participant 2403 sends to the Translator 2418 at communication 2421: ["Type A"; Pre-Token=$bb_A P_2$]. The Translator 2418 applies $tt_A$ to Pre-Token, hashes and sends back to the inquiring Participant 2403 at communication 2424: A-TOKEN=hash($tt_A bb_A P_2$).

The inquiring Participant 2403 inquires to the Coordinator 2427 at communication 2430: A-TOKEN; and dataType. The Coordinator 2427 responds to the inquiring Participant 2403 with the appropriate value set(s) at communication 2433: AI; $P_1$; Enc$_k$(DATA∥Metadata); SIG, where SIG is generated over $P_1$, Requestor ID and Validity Period. For each received value of $P_1$, the inquiring Participant 2403 requests a "Type $B_1$" token. The inquiring Participant 2403 requests B-TOKENs by submitting to the Backend(s) 2406 at communication 2436: ["Type $B_1$"; $e_{B1}$; $P_1$; Validity Period; SIG; "Type $B_2$"; $e_{B2} P_2$], for randomly and independently generated $e_{B1}$ and $e_{B2}$, where $P_2$ is the elliptic curve point representing the (appropriately padded) INFO that is used in the A-TOKEN request. If utilizing more than one Backend 2406 in parallel, the inquiring Participant 2403 sends the same to both Backends 2406, as described in FIG. 6. The inquiring Participant 2403 receives from the Backend(s) 2406 at communication 2439: ["Type $B_1$"; Blinded_Pre-Token$_1$=bb$_{B1}$ e$_{B1}$ P$_1$]; ["Type $B_2$"; Blinded_Pre-Token$_2$=bb$_{B2}$ e$_{B2}$P$_2$]; and HMACvalue=HMAC (HMAC_Key, P$_1$‖Blinded_Pre-Token$_1$). If received from two Backends 2406, the inquiring Participant 2403 bypasses the Translator 2418 and proceeds to generating the B-TOKEN$_1$ and B-TOKEN$_2$ at block 2448 by doing the following computations where [Blinded_Pre-Token$_{X1}$; Blinded_Pre-Token$_{X2}$] came from Backend X and [Blinded_Pre-Token$_{Y1}$; Blinded_Pre-Token$_{Y2}$] came from Backend Y: B-TOKEN$_1$=hash(em$^{-1}$ (Blinded_Pre-Token$_{X1}$+Blinded_Pre-Token$_{Y1}$)) and B-TOKEN$_2$=hash(e$_{B2}^{-1}$ (Blinded_Pre-Token$_{X2}$+Blinded_Pre-Token$_{Y2}$)). If utilizing a single Backend 2406, the inquiring Participant 2403 submits to the Translator 2418 at communication 2442: ["Type $B_1$"; Blinded_Pre-Token$_1$]; ["Type $B_2$"; Blinded_Pre-Token$_2$]; SIG; Validity Period; and P$_1$. The inquiring Participant 2403 receives from the Translator 2418 at communication 2445: Blinded_Token'=tt$_{B1}$bb$_{B1}$e$_{B1}$P$_1$ and Blinded_Token$_2$=tt$_{B2}$bb$_{B2}$e$_{B2}$P$_2$. At block 2448, the Participant derives B-TOKEN$_1$ and B-TOKEN$_2$ by applying e$_{B1}^{-1}$ and e$_{B2}^{-1}$, respectively, and hashing, B-TOKEN$_1$=hash (e$_{B1}^{-1}$ (Blinded_Token$_1$)) and B-TOKEN$_2$=hash(e$_{B2}^{-1}$ (Blinded_Token$_2$)). At block 2451, the inquiring Participant 2403 derives AES-GCM key k=HMAC(B-TOKEN$_2$, B-TOKEN$_1$) and IV=appropriately truncated SHA-3-256 (AI‖0). At block 2454, the inquiring Participant 2403 uses AI and k to attempt to decrypt and verify Enc$_k$(DATA‖Metadata), where IV=appropriately truncated SHA-3-256 (AI‖0).

The embodiment depicted here, the protocol may be configured to utilize two parallelizable Backends (as opposed to a single Backend) during the generation of both the "Type A" and "Type B" tokens. While generating the A-TOKEN to be used for entity resolution, both Backends are used in parallel, followed by the Translator. In the generation of the B-TOKENs, the Translator may be bypassed so the Backends are the only processors used in the tokenization of the B-TOKENs. If one Backend is utilized in this embodiment, HMACvalues can be used as shown to extend the use of the SIGs to give the Translator assurance that both the Backend and Translator worked on the same values under an authorized transaction for B-TOKEN generation. However, if two parallelizable Backends are utilized, the Translator is not utilized during the generation of B-TOKENs; therefore, the HMACvalues are not needed to assist in the use of the SIGs. An additional simplification can be made if two parallelizable Backends are utilized: only one blinding factor e$_B$ for the generation of both "Type B" tokens is necessary (i.e., e$_{B1}$=e$_{B2}$). However, if only one Backend is utilized, it is necessary that INFO must be blinded from the Backend, and B-TOKEN derived from the Pre-key must be blinded from the Translator. As the blinding factor for this second B-TOKEN was applied at the Backend, e$_{B1}$ and e$_{B2}$ must not be equal or the Backend would be able to determine INFO. However, with the utilization of multiple parallel Backends, the Translator is not used in the generation of the B-TOKENs. Therefore, extra measures to keep knowledge of the B-TOKEN from the Translator are unnecessary, and the blinding factor can be applied at the Participant.

The audit method is not included here, in that an Auditor may not be equipped to have knowledge regarding INFO used for token acquisition. The method can be modified to accommodate for this.

Circumstances such as change of ownership of a processor (such as a Backend) or an addition to the system (such as a processor or coprocessor) necessitate a change in the Pohlig-Hellman keys used to generate the final A-TOKENs. In order to ensure no value is lost (such as data associated with old A-TOKENs) a migration of A-TOKENs must occur. It is also important to ensure these migrations are correct and there are not inaccurate mappings from old A-TOKENs to new A-TOKENs as this may result in issues such as inaccurate data within the network. Without this insurance Participants could put false A-TOKENs in place of good A-TOKENs that were connected with valuable data making that data unavailable.

Once the desired percentage of the database has been migrated, the migration is complete and these processes are made unnecessary. To keep track of how much of the database has been migrated, the A-TOKENs that have been replaced by A-TOKEN$_{new}$ should be flagged. By differentially flagging A-TOKENs that are new but are not replacements, one can ascertain the percentage of migratable A-TOKENs that have been migrated. Alternatively, reference to a timestamp signifying the start of migration or another mechanism may be used to differentiate between replacement- and non-replacement-new A-TOKENs.

Note that activity by Requestors (as well as by Attestors) may result in additions to the Coordinator-accessible database, e.g., as part of certain migration schemes or scenarios. No explicit distinction is made in these token migration embodiments between Attestors and Requestors (as labeled solely as Participants, without discussion of potentially charging for Inquiry or rewarding for Attestation potentially based at least in part on results of subsequent Inquiry activity). It may be desired to restrict what is stored during migration based off an Inquiry made by a Requestor. If a match on an old A-TOKEN in the database is found, then the old A-TOKEN may be replaced with the new A-TOKEN generated based off the Inquiry made by the Requestor. However, in the case where a match on the old A-TOKEN is not found, it may be undesirable (and unnecessary for migration) to retain the new A-TOKEN as is typically done.

Figure 25:
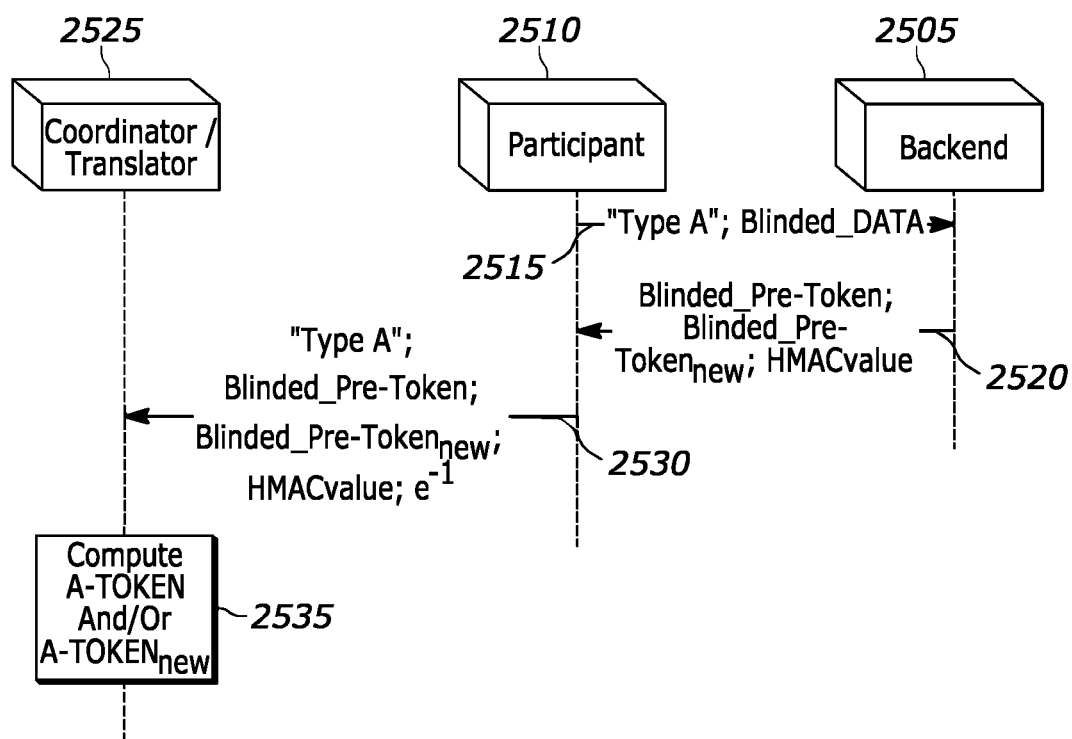
FIG. 25 comprises a flow diagram as configured in accordance with various embodiments of these teachings and that illustrates the migration of tokens during the tokenization process due to a change of ownership of a Backend, including communication with a Translator and a Coordinator. The transmissions depicted in FIG. 25 may include an overlay, such as encryption that is subsequently decrypted, that is not explicitly shown.
Figure 26:
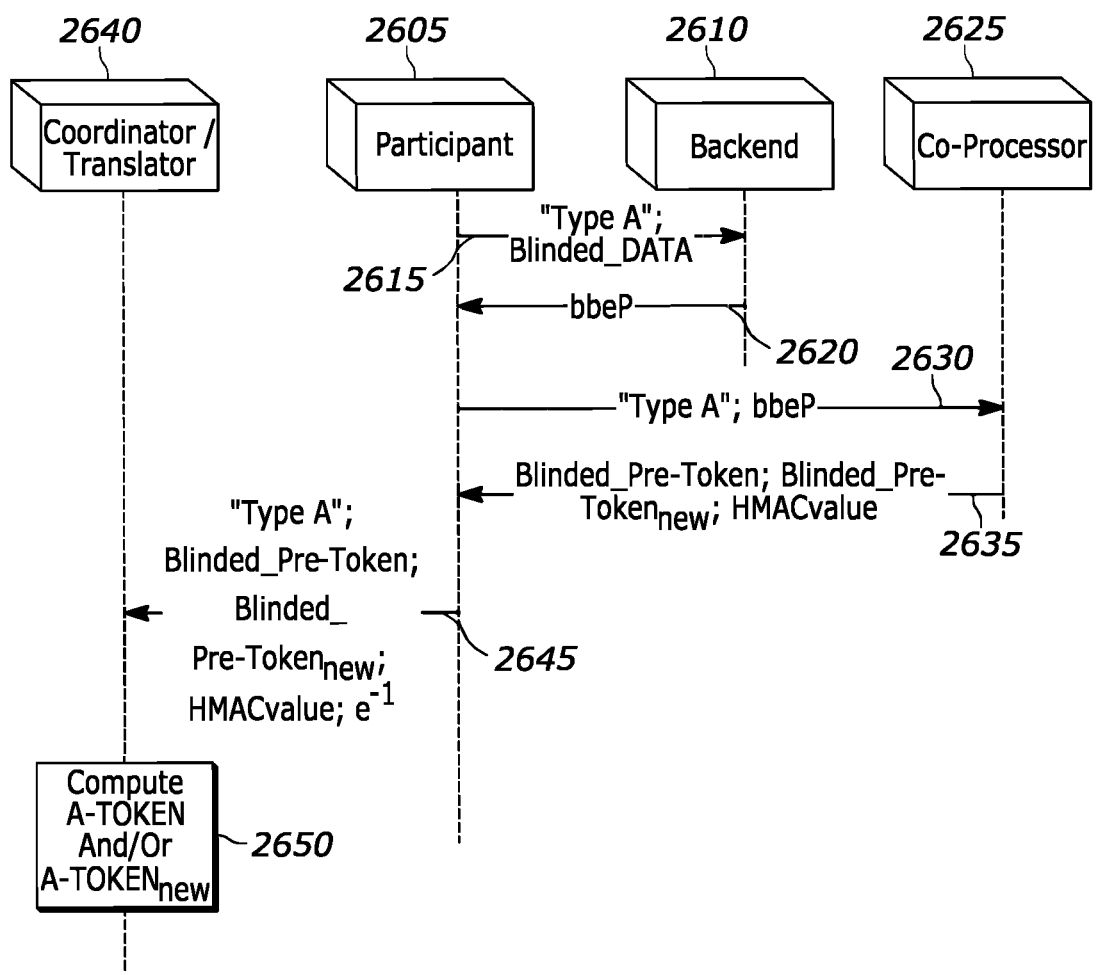
FIG. 26 comprises a flow diagram as configured in accordance with various embodiments of these teachings and that illustrates the migration of tokens during the tokenization process due to the addition of a coprocessor working in a sequential processing with a Backend and a Translator, including communication with a Backend, a Translator and a Coordinator. The transmissions depicted in FIG. 26 may include an overlay, such as encryption that is subsequently decrypted, that is not explicitly shown.
Figure 27:
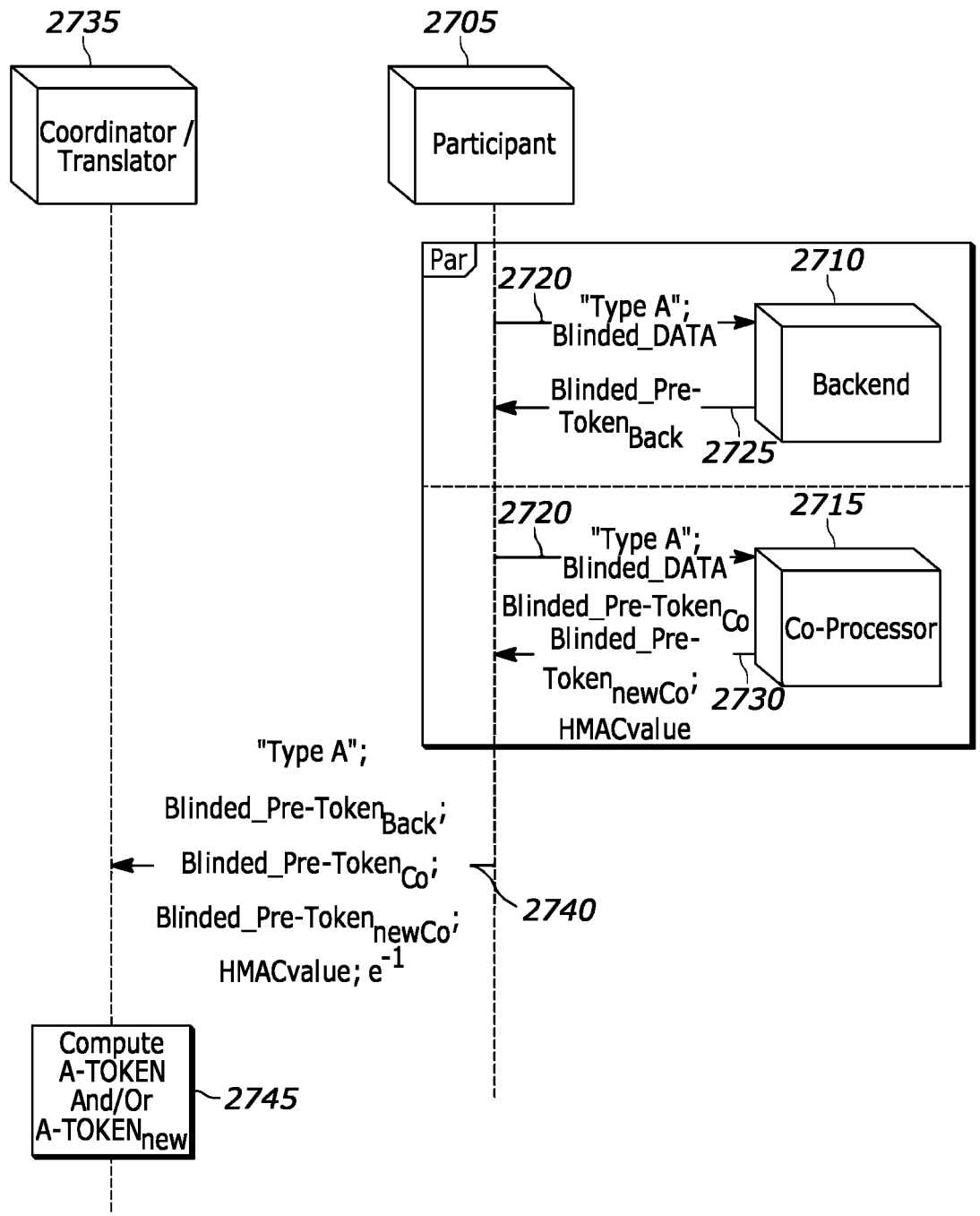
FIG. 27 comprises a flow diagram as configured in accordance with various embodiments of these teachings and that illustrates the migration of tokens during the tokenization process due to the addition of a coprocessor working in parallel with a Backend, including communication with a Backend, a Translator and a Coordinator. The transmissions depicted in FIG. 27 may include an overlay, such as encryption that is subsequently decrypted, that is not explicitly shown.

Relevant to FIG. 25-FIG. 27, by one approach, at least one of the tokenization processors acts within at least one of the following roles: token migration involving a change of processor ownership; token migration involving an addition of a processor or coprocessor; token migration precipitated by a change of tokenization schemes; and audit of operations involving at least one of these types of actors: tokenization processors; Attestors; Requestors.

Now referring to FIG. 25, in the case of changing the ownership of the Backend 2505, there must be a new Pohlig-Hellman key, (bb$_{new}$ replacing bb), and therefore all old A-TOKENs must be replaced by new A-TOKENs.

To begin the process the Participant 2510 sends to the Backend 2505 at communication 2515: ["Type A"; Blinded_DATA=eP]. The Participant 2510 receives from the Backend 2505 at communication 2520: [Blinded_Pre-Token=bbeP; Blinded_Pre-Token$_{new}$=bb$_{new}$ eP; HMACvalue=HMAC(HMAC_Key, Blinded_Pre-Token‖Blinded_Pre-Token$_{new}$)], where Blinded_Pre-Token and Blinded_Pre-Token$_{new}$ may be considered a pair of values. The Participant 2510 sends to the Coordinator/Translator 2525 at communication 2530: ["Type A"; Blinded_Pre-Token; Blinded_Pre-Token$_{new}$; HMACvalue; e$^{-1}$]. At block 2535, the Coordinator/Translator 2525 computes: A-TOKEN$_{new}$=hash(e$^{-1}$ tt(Blinded_Pre-Token$_{new}$))=hash(tt bb$_{new}$P). The Coordinator/Translatorr 2525 looks up A-TOKEN$_{new}$ in the database of A-TOKENs. If it already exists this process is complete. (Note that the entry should already be flagged as replaced.) If not, the Coordinator/Translator 2525 must compute as follows: A-TOKEN=hash(e$^{-1}$ tt(Blinded_Pre-Token))=hash(ttbbP). The Coordinator/Translator 2525 looks up A-TOKEN in the database of A-TOKENs. The HMACvalue should be confirmed to be correct before moving forward with this process. If it already exists the A-TOKEN should be replaced by A-TOKEN$_{new}$. In this case the entry should be flagged as containing a new A-TOKEN as the old A-TOKEN is being replaced. If it does not exist in the database, A-TOKEN$_{new}$ should be put in the database. If it does not exist in the database, A-TOKEN should be put in the database. This entry should be flagged as containing a new A-TOKEN that is not a replacement of a previous A-TOKEN.

In the case of changing the ownership of the Coordinator/Translator 2525, it may be considered preferable to update the Pohlig-Hellman key (with tt$_{new}$ replacing tt), in which case all old A-TOKENs must be replaced by new A-TOKENs. As the result from the Coordinator/Translator 2525 isn't sent to another processor for A-TOKEN completion, there is no need for the HMAC verification used in the previous embodiment. Consequently, the unblinding using $e^{-1}$ can be done directly by the Participant.

Adding a coprocessor allows for an owner/manager/administrator of a processor to outsource some of the functionality to a coprocessor. This is somewhat analogous to introducing partitioning of an existing processor or further partitioning of an already partitioned processor. One distinction is the Participant may remain oblivious of the degree (if any) of partitioning of a processor. However, if a coprocessor is added as described below, the Participant must communicate separately with each processor or coprocessor, necessitating that the Participant is aware of exactly how many processors and coprocessors are used. The embodiment depicted herein describes adding a coprocessor as a sequential processor to the Backend. Coprocessors may be added in a sequential or parallel manner to a system and this addition does not depend on what already exists in this system.

Now referring to FIG. 26, in the case of adding another processor to the system, the Backend Pohlig-Hellman secret bb must be replaced by bbcc$^{-1}$ mod n where cc$_{new}$ is the new coprocessor Pohlig-Hellman secret and cc$_{new}$ is a multiple of cc so that cc$_{new}$=ccr mod n for some preferably random r. This enables protection against previous unknown compromise of the Backend as well as initialization of the additional coprocessor. In this example embodiment, n is the prime order of the elliptic curve group generated by P. If the protection against compromise of the Backend is deemed unnecessary, the process may be run using cc=1. This still allows for migration of the tokens as necessary. Notice the Backend is not aware of cc$_{new}$.

To start the migration process, the Participant 2605 sends to the Backend 2610 at communication 2615: ["Type A"; Blinded_DATA=eP]. The Participant 2605 receives from the Backend 2610 at communication 2620: bbeP. The Participant 2605 sends to the new coprocessor 2625 at communication 2630: ["Type A"; bbeP]. The Participant 2605 receives from the coprocessor 2625 at communication 2635: [Blinded_Pre-Token=ccbbeP; Blinded_Pre-Token$_{new}$=cc$_{new}$bbeP; HMACvalue=HMAC(HMAC_Key, Blinded_Pre-Token||Blinded_Pre-Token$_{new}$)]. The Participant 2605 sends to the Coordinator/Translator 2640 at communication 2645: ["Type A"; Blinded_Pre-Token; Blinded_Pre-Token$_{new}$; HMACvalue; $e^{-1}$]. At block 2650, the Coordinator/Translator 2640 computes: A-TOKEN$_{new}$=hash($e^{-1}$tt(Blinded_Pre-Token$_{new}$))=hash(ttccbbP). The Coordinator/Translator 2640 looks up A-TOKEN$_{new}$ in the database of A-TOKENs. If it already exists this process is complete. (Note that the entry should already be flagged as replaced.) If not, the Coordinator/Translator 2640 must compute as follows: A-TOKEN=hash($e^{-1}$tt(Blinded_Pre-Token))=hash(ttbbP). The Coordinator/Translator 2640 looks up A-TOKEN in the database of A-TOKENs. The HMACvalue should be confirmed to be correct before moving forward with this process. If it already exists, the A-TOKEN should be replaced by A-TOKEN$_{new}$. In this case the entry should be flagged as containing a new A-TOKEN, as the old A-TOKEN is being replaced. If it does not exist in the database, A-TOKEN$_{new}$ should be put in the database. If it does not exist in the database, A-TOKEN should be put in the database. This entry should be flagged as containing a new A-TOKEN that is not a replacement of a previous A-TOKEN.

Now referring to FIG. 27, in the case of adding another processor to the system in a parallel fashion (as opposed to the above embodiment in which a sequential processor is added), the Backend Pohlig-Hellman secret bb must be replaced by (bb−cc) mod n where cc$_{new}$ is the new coprocessor Pohlig-Hellman secret and cc$_{new}$=(cc+r) mod n for some random r. This enables protection against previous unknown compromise of the Backend (where (bb−cc) mod n is not feasibly derivable from bb if cc is chosen randomly) as well as initialization of the additional coprocessor. In this example embodiment, n is the prime order of the elliptic curve group generated by P. If the protection against previous unknown compromise of the Backend is deemed unnecessary, the process may be run using cc=0. This still allows for migration of the tokens as necessary. Notice the Backend is not aware of cc$_{new}$. Note that if elliptic curve Diffie-Hellman (ECDH) is used to secure the communications, then when an ECDH public key associated with the added coprocessor is made available for use by Participants, then a replacement ECDH public key associated with the Backend can similarly be made available (where the coprocessor and the Backend have access to the corresponding private keys, respectively).

To start the migration process, the Participant 2705 sends to the Backend 2710 and to the new coprocessor 2715 at communications 2720: ["Type A"; Blinded_DATA=eP]. The Participant 2705 receives from the Backend 2710 at communication 2725: Blinded_Pre-Token$_{Back}$=bbeP. The Participant 2705 receives from the new coprocessor 2715 at communication 2730: ["Type A"; Blinded_Pre-Token$_{Co}$=cceP; Blinded_Pre-Token$_{newCo}$=cc$_{newCo}$ eP; HMACvalue=HMAC(HMAC_Key, Blinded_Pre-Token$_{Co}$||Blinded_Pre-Token$_{newCo}$)], where Blinded_Pre-Token$_{Co}$ and Blinded_Pre-Token$_{newCo}$ may be considered a pair of values. The Participant 2705 sends to the Coordinator/Translator 2735 at communication 2740: ["Type A"; Blinded_Pre-Token$_{Back}$; Blinded_Pre-Token$_{Co}$; Blinded_Pre-Token$_{newCo}$; HMACvalue; $e^{-1}$]. At block 2745, the Coordinator/Translator 2735 computes: ["Type A": A-TOKEN$_{new}$=hash($e^{-1}$tt(Blinded_Pre-Token$_{Back}$+Blinded_Pre-Token$_{newCo}$))=hash(tt(bb+cc)P)]. The Coordinator/Translator 2735 looks up A-TOKEN in the database of A-TOKENs. The HMACvalue should be confirmed to be correct before moving forward with this process. If it already exists the A-TOKEN should be replaced by A-TOKEN$_{new}$. In this case the entry should be flagged as containing a new A-TOKEN, as the old A-TOKEN is being replaced. If it does not exist in the database, A-TOKEN$_{new}$ should be put in the database. If it does not exist in the database, A-TOKEN should be put in the database. This entry should be flagged as containing a new A-TOKEN that is not a replacement of a previous A-TOKEN. Notice these migration schemes in FIG. 25, FIG. 26, and FIG. 27 focus on "Type A" that are to be stored and utilized by a database held by the Coordinator. However, these schemes are translatable to "Type B" tokens utilized by a database not held at the Coordinator. An explicit distinction between Attestation/Attestor and Inquiry/Requestor is made in the following token migration discussion which focuses on migration from Attributes Registry Scheme 1 to Scheme 3 as well as (potentially simultaneous) addition of a Backend/coprocessor.

It is possible to migrate from Attributes Registry Scheme 1 to Scheme 3 at the same time as adding a parallel Backend (i.e., Backend2) operated by a company other than the company currently owning the Backend. The routes to do so appear to have relative tradeoffs as discussed below.

Migration Scheme (1)—Continue to allow Attestors and Requestors to access the network, which may introduce new DATA into the network by Requestors even if Participants are cautioned against attesting to DATA that they had not attested to previously until the migration period is over.

Migration Scheme (2)—Ask Participants to limit Attestations to those that re-attest to DATA that the Participant previously attested to and to discontinue Inquiry until the migration period is over.

Migration Scheme (1) would expose additional DATA to potential compromise under a scenario of collusion between the original Backend and the Coordinator/Translator, but would not cause a break in ongoing Attestation or Inquiry operations. To the extent that Participants comply, Migration Scheme (2) would limit exposure to only that DATA that was already under a potential threat of compromise, but would entail a disruption of ongoing Attestation and Inquiry during the migration period.

There is a possible Migration Scheme (3)—In the notation below, $bb_1$ is generated randomly and $bb_2$ is set to $(bb-bb_1)$ mod n, where n is the prime order of the elliptic curve group and bb is the Pohlig-Hellman secret of the original Backend (now designated as Backend1). $bb_2$,new is generated randomly as the Pohlig-Hellman secret of Backend2 that will supersede $bb_2$ and is not made available to Backend1 or the Coordinator/Translator. Participants are told to distinguish between submitting re-Attestations and new Attestations, wherein for new Attestations Participants ignore what is returned from the Backends other than $bb_1eP$ and $bb_{2,new}eP$, respectively, that together enable the Participant to derive key $K=hash(Pre-Token)=hash((bb_1+bb_{2,new})P)$ to be used in formulating the Opaque_Pre-Token and HMACvalue to be forwarded to the Coordinator/Translator. Participants are also told to cease submitting Inquiry requests until the migration period is over or to limit their Inquiry requests to the Scheme 3 formulation of Opaque_Pre-Tokens and HMACvalues. To the extent that Participants comply, this Migration scheme would limit exposure to only that DATA that was already under a potential threat of compromise, at the expense of compliant inquiring Participants definitely failing to match on Attestations that have not yet been updated via re-Attestation.

Note that in all three Migration Schemes, re-Attestation entails supplying the Coordinator/Translator with $bb_1P$, $bb_2eP$, $bb_{2,new}eP$, $e^{-1}$ and HMAC(HMAC key, $bb_2eP$ $bb_{2,new}eP$), where the HMAC key has been shared between Backend2 and the Coordinator/Translator. Although the Coordinator/Translator could form and store Opaque TOKENs for all i, in order to maintain the desired non-correlation property, it should store Opaque_TOKEN for only a single i value of (chosen randomly or as fixed, dependent on whether the particular dataType is to be treated as secondary or primary). Note that both during and after migration, there does not appear to be any security advantage to having the Participant choose a different value of e to be used with Backend1 vs. Backend2. (That is not true universally for all tokenization schemes, such as audit of Relayerless Registry Attestations.)

Under Migration Scheme (1), the third-party company that operates the new/second Backend could potentially raise the issue of being involved with processing newly introduced DATA that is subject to compromise even if that company maintains its own security controls flawlessly.

As mentioned in FIG. 26 and FIG. 27, if elliptic curve Diffie-Hellman (ECDH) is used to secure communications, then a new ECDH public key may be associated with one or more preexisting processors (as well as with each processor to be added). Unlike the use of EC Pohlig-Hellman or other secrets used by processors for actual tokenization, ECDH or similar keys used for one-pass secure communications occur in pairs, where Participants are granted access to the public key of each private-public key pair (in a way that is preferably secure against undetected substitution).

In the case of the Translator changing ownership, the HMAC key KK will need to be updated (just as the Pohlig-Hellman secrets for the Backends above need to be updated). The Translator during migration would compute the Opaque_TOKEN with the new key $KK_{new}$ and the old key KK and migrate in the manner outlined in FIG. 25.

Figure 28:
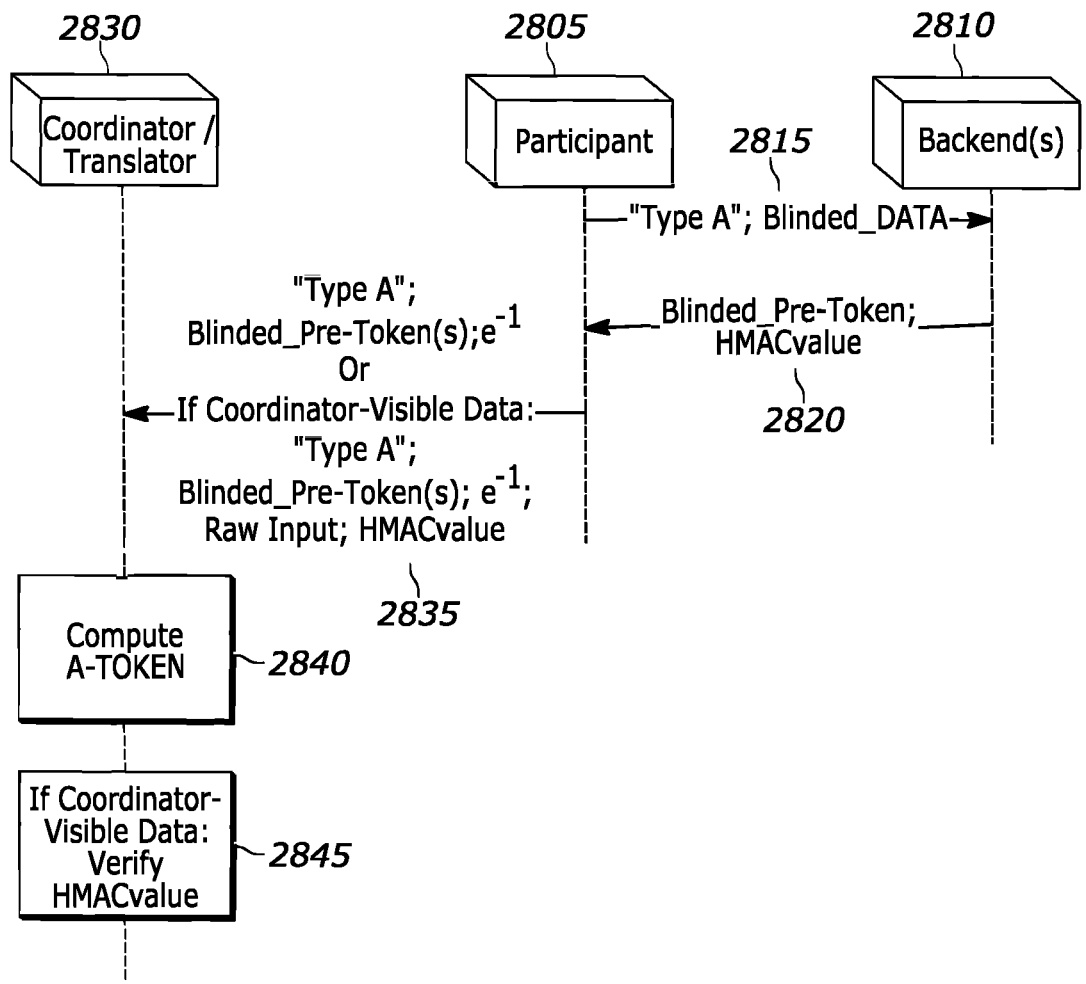
FIG. 28 comprises a flow diagram as configured in accordance with various embodiments of these teachings and that illustrates uniform tokenization processing of "Type A" and Coordinator-visible data through the use of Backend(s) and a Translator where Backends can act in parallel with each other and sequentially with a Translator. The transmissions depicted in FIG. 28 may include an overlay such as encryption that is subsequently decrypted, that is not explicitly shown.

Now referring to FIG. 28, the following process enables all DATA to be processed via a uniform flow without sacrificing correlation between Coordinator-visible DATA and intermediate tokenization values. It is used to consolidate the tokenization flow even if DATA is provided to the Coordinator (for purposes of processing, analytics and/or short-term or long-term retention). The association of such DATA (or raw input) to A-TOKEN, if both are present in the Coordinator database at the time of an audit, can be audited using the process described in FIG. 29. If, alternatively, provided raw inputs were tokenized using a different method that excluded the Backend(s), then the Backend(s) could not play a role in audit of the Coordinator. Even if the Coordinator and Translator are jointly owned/operated/administered and/or co-located, if ownership of the Backend(s) has been disassociated from that of the Coordinator and Translator, then an Auditor may consider the Backend(s) and the archive the Backend(s) writes (write) to as not controllable by the Translator and/or Coordinator. Two parallel Backends may be utilized to generate the A-TOKEN. The comparison of processes of using one Backend vs. two parallel Backends is reflected in FIG. 6.

Even if a raw input coming from Inquiry does not match on the A-TOKEN values, it is possible that the Coordinator accesses those from the Translator and stores them. Alternatively, the Translator may provide the Coordinator with raw input only during Attestor activity. Matching on the A-TOKEN values during Inquiry would be sufficient reason for the Coordinator to provide the Requestor with information such as sanitized applicationID where that A-TOKEN occurred (as in the Fraud Attributes use case). An Attestor can provide the Coordinator with its applicationIDs that are associated to lists of attested-to attributes, where these may be sanitized by the Coordinator prior to the Coordinator providing them to Requestors that match against these tokenized attributes. The Participant 2805 sends to each Backend 2810 at communication 2815: ["Type A"; Blinded_DATA=eP]. The Participant 2805 receives from each Backend 2810 at communication 2820: Blinded_Pre-Token; and HMACvalue=HMAC(HMAC_Key, Blinded_DATA∥Blinded_Pre-Token), where Blinded_DATA and Blinded_Pre-Token may be considered a pair of values. The Participant 2805 sends to the Translator 2830 at communication 2835: ["Type A"; Blinded_Pre-Token; $e^{-1}$] or if the Participant 2805 is sending Coordinator-visible DATA: ["Type A"; Blinded_Pre-Token; $e^{-1}$; HMACvalue; raw input]. At block 2845, if Coordinator-visible DATA is provided, the Translator 2830 completes the following steps: (1) derive P from raw input and e from $e^{-1}$; (2) compute Blinded_DATA=eP; (3) compute HMACvalue to verify it is valid using Blinded_DATA and Blinded_Pre-Token; (4) compute A-TOKEN=hash($e^{-1}$tt(Blinded_Pre-Token))=hash (ttbbP). At block 2840, if Coordinator-visible DATA is not provided, the Translator only computes: A-TOKEN=hash ($e^{-1}$tt(Blinded_Pre-Token))=hash(ttbbP).

It may be necessary to have the ability to audit the Attestation process and therefore the tokens produced for use within it. The following enables an auditor to retroactively demand the archived data from the Backend(s) and stored data from the Coordinator. This data will enable the Auditor to act as a Participant temporarily, submit the archived data themselves to the Backend(s) and Translator and determine if the process was originally done correctly.

Timestamps used for the audit capabilities may potentially be eliminated or replaced by other parameters. If actual date/time stamps are used, the Translator may check the acceptability of such Timestamp values relative to its local clock settings. This may optionally account for legitimate delays between token acquisition and use during Attestation or Inquiry.

Notice that the audit processes do not necessarily actually verify that any particular Attestation or Inquiry completed successfully, but they do confirm that the requisite tokenization requests were handled. However, the Coordinator would not be able to generate suitable ciphertext or data visible to it (i.e., raw input) that matches the tokenization. In the case of raw input data provided to the Translator (and consequently to the Coordinator), the Translator does have the capability to check that the tokenization process that it completes was initiated by the Backend processor(s) using the same raw input data (even though the raw input data is not made accessible to the Backend processor(s)). In the case of ciphertext provided to the Coordinator during Attestation by an Attestor, the Coordinator cannot determine if such ciphertext is legitimate in that the Authentication Tag verifies (since the Coordinator does not have access to the decryption key), but if an acknowledgement or negative acknowledgement is appropriately added to the Inquiry flow, the Coordinator can gather statistics regarding the apparent validity of any particular Attestation. Note that any individual Participant may not respond truthfully (or may fail to respond), but information can be collected across the pool of Participants acting in the role of Requestors.

What is stored in a Coordinator-accessible database is dependent, in part, on whether Attestor and Requestor tokenization activity are both auditable. For example, if the Backend processor(s) only archives (archive) Attestor tokenization requests, then there may be no need for Coordinator-accessible storage to include Requestor artifacts for potential later audit.

Figure 29:
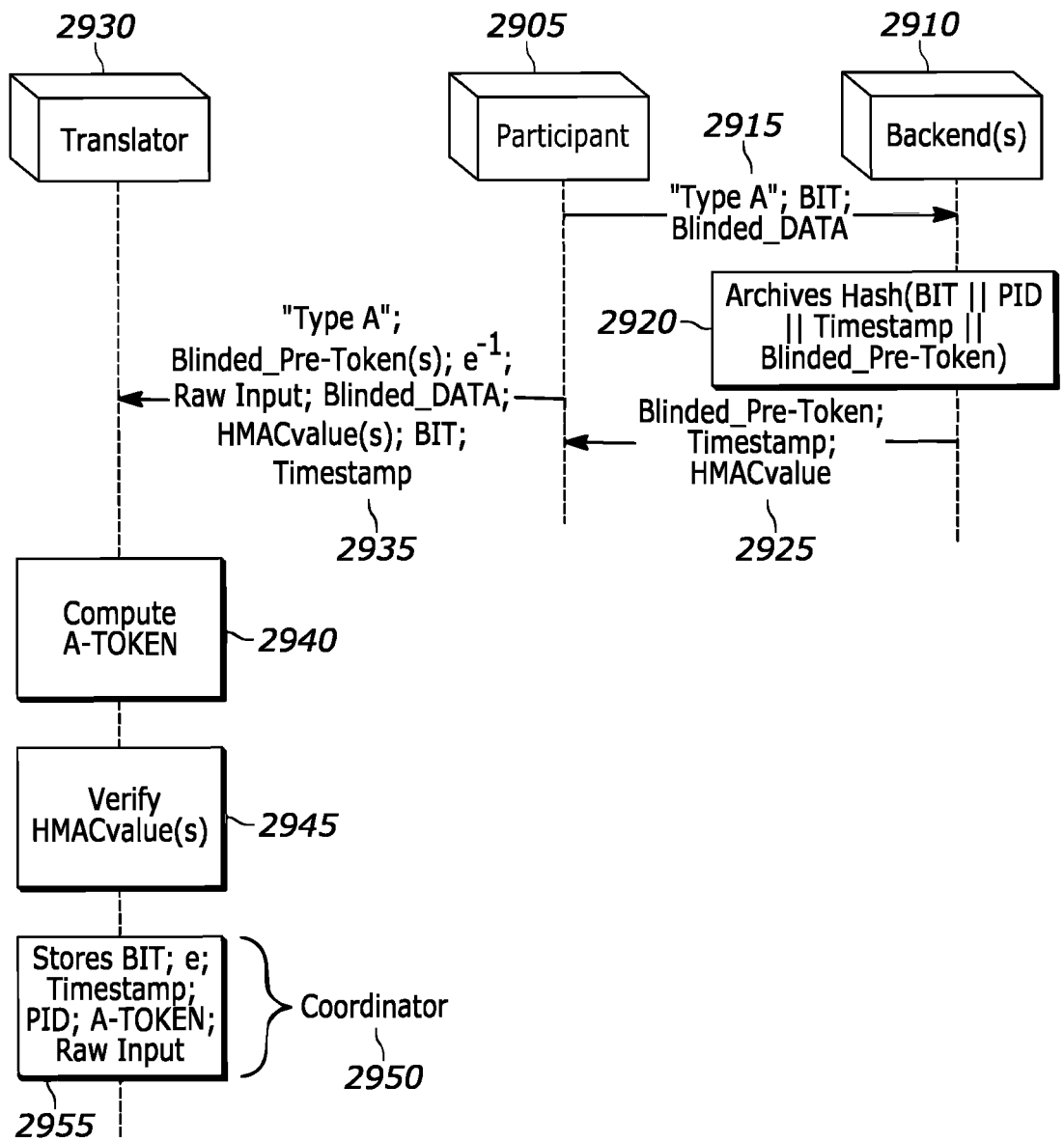
FIG. 29 comprises a flow diagram as configured in accordance with various embodiments of these teachings and that illustrates a process to enable auditing of Coordinator-visible data through the use of Backend(s) and a Translator. The transmissions depicted in FIG. 29 may include an overlay such as encryption that is subsequently decrypted, that is not explicitly shown.

Now referring to FIG. 29, this protocol deals with audit of "Type A" tokenization requests and of Coordinator-retained DATA as mapping to A-TOKENs. It is not specified here the point at which the Coordinator gains access to raw input and/or other values made available by the Participant to the Translator (which may be dependent on the relationship between the Translator and the Coordinator).

The audit capability here depends on the Coordinator-visible DATA process presented in FIG. 28. The association of such DATA (or raw input) to A-TOKEN, if both are present in the Coordinator database at the time of an audit, can be audited using this process. If, alternatively, provided raw inputs were tokenized using a different method that excluded the Backend(s), then the Backend(s) could not play a role in audit of the Coordinator. The HMACvalue utilized in the protocol presented in FIG. 28 is implemented to verify the Translator is operating on the same material as the Backend(s). The HMACvalue in the following protocol is used to enable safe auditing. Although the HMACvalues are used differently, the value defined below contains all the material necessary to enable the first use case. It is also transmitted and verified in the following protocol in the same manner it is in FIG. 28. Therefore, the HMACvalue presented below is the only one necessary to be used (although both may be implemented). As in FIG. 28, two parallel Backends may be utilized to generate the A-TOKEN. The comparison of processes of using one Backend to two parallel Backends is reflected in FIG. 6.

To begin the process, the Participant 2905 sends to each Backend 2910 at communication 2915: ["Type A"; Blinded_DATA=eP; BIT] where BIT=0 if an Attestor and BIT=1 if a Requestor. The Participant 2905 receives from each Backend 2910 at communication 2925: Blinded_Pre-Token; Timestamp; and HMACvalue=HMAC(HMAC_Key, Blinded_DATA‖BIT‖PID‖Timestamp‖Blinded_Pre-Token). At block 2920, the Backend 2910 archives hash(BIT‖PID‖Timestamp‖Blinded_Pre-Token). The Participant 2905 sends to the Translator 2930 at communication 2935: "Type A"; Blinded_Pre-Token(s); HMACvalue(s); $e^{-1}$; raw input; Blinded_DATA; BIT; and Timestamp. At block 2945, if Coordinator-visible DATA is provided, the Translator 2930 completes the following steps: (1) derive P from raw input and e from $e^{-1}$; (2) compute Blinded_DATA=eP; (3) compute HMACvalue(s) (independently of the HMACvalue(s) received) to verify it is valid using Blinded_DATA, Blinded_Pre-Token(s), Timestamp, BIT, and PID; (4) compute A-TOKEN=hash($e^{-1}$tt(Blinded_Pre-Token)). At block 2940, if Coordinator-visible DATA is not provided, the Translator 2930 only computes: A-TOKEN=hash($e^{-1}$tt (Blinded_Pre-Token)). At block 2955, the Coordinator 2950 stores {BIT; $e^{-1}$; Timestamp; PID} as associated with A-TOKEN and raw input. Notice this storage is associated with the Coordinator 2950 and not the Translator 2930 even if the two are interlinked.

At some subsequent time, an Auditor will request the data from the Coordinator 2950 and the Backend 2910 archives. The Auditor uses raw input and e to determine Blinded_DATA. Auditor submits Blinded_DATA to the Backend(s) 2910 to recover Blinded_Pre-Token(s). The Auditor rederives hash value and check against the archived value. The Auditor may be given access to C=(Data; Metadata) if the Auditor is authorized to recover and verify both DATA and Metadata. If it is desired to differentiate between Auditor access to DATA vs. Metadata, then the Relayerless Registry Attestation method may be configured so as to produce $C_1$=$Enc_k$(Data) and $C_2$=$Enc_k$(Metadata). Preferably, distinct initialization vectors (IVs) are used in the generation and decryption of $C_1$ vs. $C_2$. If authenticated encryption is used, then there will be distinct Authentication Tag values. If an IV is determined through a method such as IV=appropriately truncated SHA-3-256 (AI‖0), for an available Attestation Identifier AI, then that can be extended to provide $IV_1$ and $IV_2$ as, for example: $IV_1$=appropriately truncated SHA-3-256 (AI∥1) and $IV_2$=appropriately truncated SHA-3-256 (AI∥2).

Figure 30:
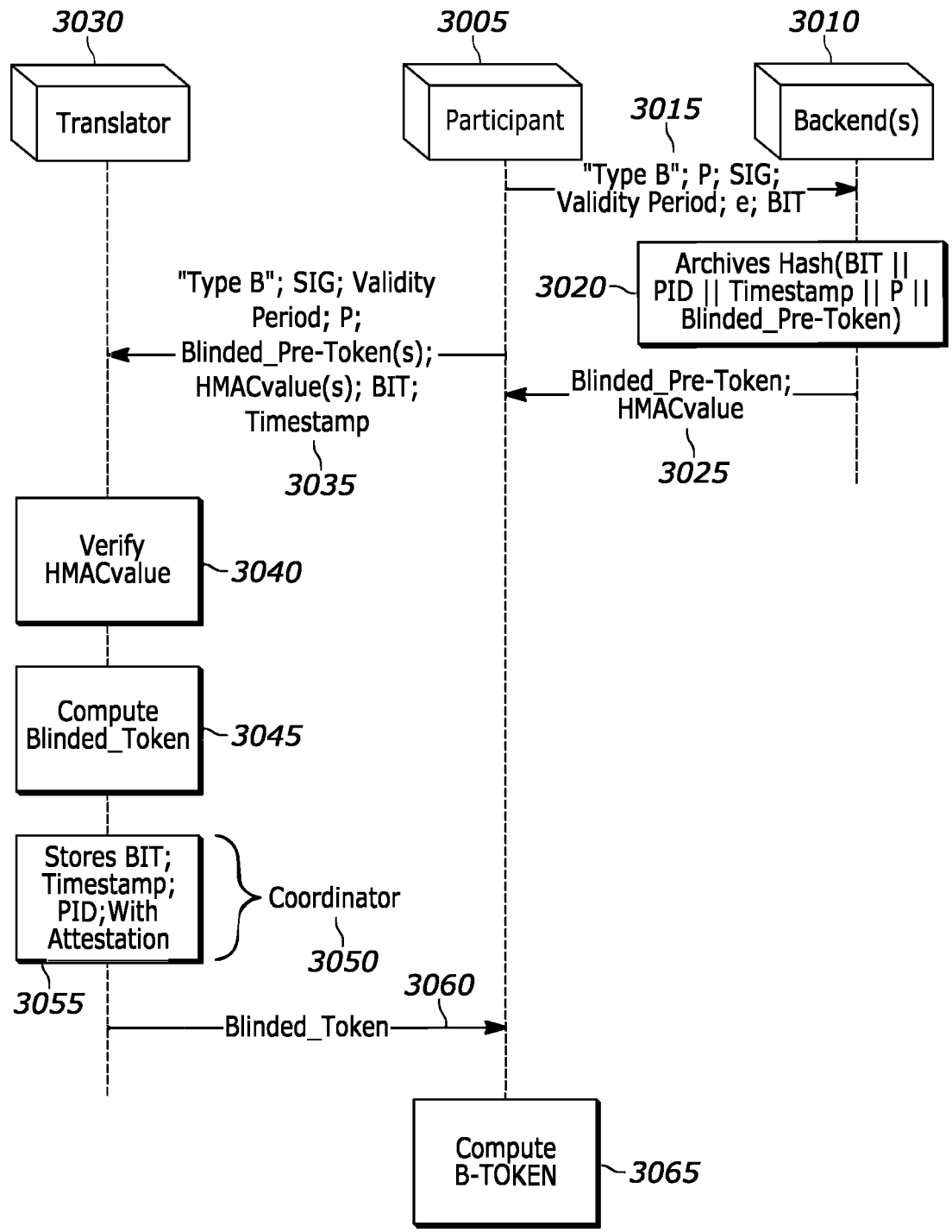
FIG. 30 comprises a flow diagram as configured in accordance with various embodiments of these teachings and that illustrates a process to enable auditing of Relayerless Registry Attestations through the use of Backend(s), a Translator and a Coordinator. The transmissions depicted in FIG. 30 may include an overlay such as encryption that is subsequently decrypted, that is not explicitly shown.

Now referring to FIG. 30, this protocol deals with audit of "Type B" tokenization requests for Registry Attestation and Inquiry and of Attestation to DATA (and Metadata). The Coordinator gains access to ciphertext C through Attestation by Attestors.

This audit process is to be utilized alongside the Relayerless Registry Attestation designs presented in Sections FIG. 21 and FIG. 22. It should be used to enable auditing of those systems. Although the audits can handle both Attestation and Inquiry activity as shown, a reduced version of the system may be used, whereby, for example, the Backend(s) does (do) not archive Inquiry activity. The HMACvalue utilized in the protocol presented in FIG. 21 and FIG. 22 is implemented to verify the Translator is operating on the same material as the Backend(s). The HMACvalue in the following protocol is used to enable safe auditing. Although the HMACvalues are used differently, the value defined below contains all the material necessary to enable the first use case. It is also transmitted and verified in the following protocol in the same manner as in FIG. 21 and FIG. 22. Therefore, the HMACvalue depicted below is the only one necessary to be used (although both may be implemented).

After the Participant 3005 receives authorization to make a request to the Backend(s) 3010 and Translator 3030 for the B-TOKEN, the Participant 3005 begins the protocol utilizing audit by sending to each Backend 3010 at communication 3015: "Type B"; P (derived from Pre-Key); e; BIT; Validity Period; SIG=$Sign_{Coord}$(P, PID, Validity Period) where BIT=0 if an Attestor and BIT=1 if a Requestor. The Participant 3005 receives from each Backend 3010 at communication 3025: Blinded_Pre-Token=ebbP; Timestamp; HMACvalue=HMAC(HMAC_Key, BIT∥PID 11 Timestamp∥P∥Blinded_Pre-Token), where P and Blinded_Pre-Token may be considered a pair of values. At block 3020, each Backend 3010 archives: hash(BIT∥PID∥Timestamp∥P∥Pre-Token) where Pre-Token=bbP. The Participant 3005 sends to the Translator 3030 at communication 3035: "Type B"; SIG; Validity Period; P; Blinded_Pre-Token(s); HMACvalue; BIT; Timestamp where two Blinded_Pre-Tokens are sent if two parallel Backends 3010 are used, and only one is sent if a single Backend 3010 is used. The Translator 3030 completes the following steps: (1) at block 3040, HMACvalue to verify it is valid using P, PID, Timestamp, Blinded_Pre-Token(s), and BIT; (2) at block 3045, compute Blinded_Token=tt(Blinded_Pre-Token)). If two Backends 3010 were used, the addition of the two Backend 3010 results (Blinded_Pre-Token) will be done here by the Translator 3030 to generate the Blinded_Token, as well as the application of their tt. At block 3055, the Coordinator 3045 stores {BIT; Timestamp; PID} as associated with Attestation: A-TOKEN; dataType; P; (Data; Metadata). Notice this storage is associated with the Coordinator 3045 and not the Translator 3030 even if the two are interlinked. The Participant 3005 applies $e^{-1}$ to the Blinded_Token received from the Translator 3030 at communication 3060 and hashes the result at block 3065: B-TOKEN=hash($e^{-1}$(Blinded_Token)).

At some subsequent time, an Auditor will request the data from the Coordinator 3045 and the Backend 3010 archives. Auditor submits P to Backend 3010 to recover Blinded_Pre-Token and determine if Pre-Token that was hashed in the Backend 3010 archive is correct. The Auditor rederives hash value and check against the archived value. The Auditor rederives k=B-TOKEN, decrypts C=$Enc_k$(DATA∥Metadata) and verifies the Authentication Tag. (The Auditor receives AI or accesses it from the blockchain or otherwise has access to the appropriate IV(s).)

Referring to Attributes Registry Scheme 3, the two embodiments presented here as Audit Option 1 and Audit Option 2, respectively, are depicted from the perspective of operation of two parallelizable Backends. Note, in particular, that in Audit Option 2, one of Backend1 and Backend2 may be considered to potentially be managed/operated in conjunction with the Translator (or the jointly managed Coordinator/Translator) where the other Backend handles its tokenization and auditable storage responsibilities independently of the complementary Backend, Coordinator and Translator.

Audit Option 1: If the scheme is modified to accommodate two Offset values and two HMACvalues, then it can handle voluntary Participant-initiated audit. Auditors do not learn entity-resolution- or other-DATA underlying the tokenization. At the time of Attestation or Inquiry, the Participant can optionally store an encryption of hash(Pre-Token)=hash(($bb_1$+$bb_{2,new}$)P) done using one or more known Auditor public keys (where such encryption may potentially be split to enforce threshold-level access). The Participant can later decide whether to forward the result of such encryption for audit. The two Offset values and two HMACvalues are as follows: (1) $Offset_1$=HMAC(KK, Opaque_Pre-Token∥0∥Salt); (2) $Offset_2$=HMAC(KK, Opaque_Pre-Token∥1∥Salt); (3) HMACvalue1=HMAC(K, 1∥Salt∥Metadata); (3) HMACvalue2=HMAC(K, 2∥Salt∥Ciphertext). Coordinator stores Salt; $Metadata_1$; Ciphertext; Opaque_TOKEN; HMACvalue1⊕$Offset_1$; HMACvalue2⊕$Offset_2$. The extent of access by the Auditor(s) is dependent on whether the Coordinator provides just Metadata and HMACvalue1 or also Ciphertext and HMACvalue2. Note that HMACvalue1 and HMACvalue2 are generated using the different arguments 1 and 2, respectively, so that $Metadata_1$ and Ciphertext cannot be switched undetectably by the Coordinator during Inquiry. An alternative embodiment may utilize verifiable encryption, the result of which is included in what the Coordinator/Translator receives from Attestors and is checked as a condition of successful Attestation and then stored in the Coordinator-accessible database for potential later decryption by Auditor(s).

Audit Option 2: Consider a known ECDH Auditor public key, A=aG (where a may be multiplicatively split/partitioned). Participants, when attesting, generate e as hash($e_0$A) for preferably randomly chosen 0<$e_0$<n (where another $e_0$ is chosen if e>n−1). The Attestor provides $e_0$G to Backend1 and Backend2 (along with eP). Backend1 stores (for some system-defined retention period) the following: Timestamp; Attestor ID; $e_0$G; $bb_1$eP. Backend2 analogously stores Timestamp; Attestor ID; $e_0$G; $bb_{2,new}$eP. The Auditor can ask for these values, which may be done on a potentially random basis. If the Participant and Backends all followed the correct procedure, then the Auditor regenerates e as hash(a($e_0$G)), inverts e, and applies $e^{-1}$ (using scalar multiplication) to the sum of the elliptic curve points $bb_1$eP and $bb_{2,new}$eP. The Auditor then hashes the result to regenerate Key=hash(Pre-Token)=hash(($bb_1$+$bb_{2,new}$)P). The Auditor applies HKDF using Key to generate 2 keys, namely, HMAC key K and AES-CBC key $K_E$, and uses K to generate Opaque_Pre-$Token_i$ for all i in {1, . . . , N}. Working with the Coordinator/Translator, the Auditor should receive appropriate values of Salt, $Metadata_1$ and HMACvalue1 and potentially also Ciphertext and HMACvalue2. If the Auditor receives Ciphertext, then the Auditor can decrypt Ciphertext using IV=Salt and AES-CBC key $K_E$. Note that the Participant can be configured to reuse the same value of e across a tokenization batch, and the Backends store the corresponding $e_0G$ values accordingly. This audit system can potentially also be used to aid the Coordinator in relinking database entries across i values, if such is needed to, for example, reset which dataTypes are to be considered as primary for a particular use case. The Auditor (unlike any specific Participant) may be trusted to accurately submit sets of Opaque_Pre-Tokens.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A method for third-party managed data corroboration via tokenization, as a process resulting in at least one token, utilizing a control circuit configured as a third-party intermediary that manages a protocol to communicate with a requesting network element acting as a requestor role, the method comprising:
   the third-party intermediary storing first truncated tokens, as stored truncated tokens, resulting from applying a truncation function to locally-held first representations of a first set of tokens as associated to first blinded tokens resulting from application of a first blinding factor to second representations of the first set of tokens, wherein the requesting network element acting as a requestor role transmits to the third-party intermediary:
      a first request part comprised of second truncated tokens resulting from applying the truncation function to third representations of a second set of tokens; and
      a second request part comprised of second blinded tokens resulting from application of a second blinding factor to fourth representations of the second set of tokens.

2. The method of claim 1 further comprising:
   the third-party intermediary limiting which of the first blinded tokens are included within a response to the requesting network element acting as a requestor role to, at most, those associated with the stored truncated tokens that match the second truncated tokens.

3. The method of claim 2 further comprising:
   the requesting network element acting as a requestor role applying the second blinding factor to at least one of the first blinded tokens the requesting network element receives within the response.

4. The method of claim 1 further comprising:
   the third-party intermediary including within a response to the requesting network element acting as a requestor role a result of applying the first blinding factor to at least one of the second blinded tokens.

5. The method of claim 1 further comprising:
   the third-party intermediary limiting metadata and/or data associated with the first set of tokens that are included, in an encrypted form, within a response to the requesting network element acting as a requestor role to, at most, metadata and/or data associated with those tokens of the first set of tokens for which the stored truncated tokens match the second truncated tokens.

6. The method of claim 5 further comprising:
   the third-party intermediary deriving an encryption key used to generate the encrypted form from fifth representations of one or more of those tokens of the first set of tokens for which the stored truncated tokens match the second truncated tokens.

7. The method of claim 6 further comprising:
   the requesting network element acting as a requestor role deriving the encryption key used to generate the encrypted form from knowledge of the fifth representations of all tokens of the second set of tokens which match the fifth representations of all tokens of the first set of tokens which the third-party intermediary uses to derive the encryption key.

8. The method of claim 6 further comprising:
   the requesting network element acting as a requestor role deriving the encryption key used to generate the encrypted form from knowledge of the fifth representations of all tokens of the first set of tokens which the third-party intermediary uses to derive the encryption key, wherein the requesting network element acquires knowledge of one or more of the fifth representations of all tokens of the first set of tokens which the third-party intermediary uses to derive the encryption key at some point subsequent to the third-party intermediary deriving the encryption key.

9. The method of claim 1 further comprising:
   applying a first truncation function of a plurality of truncation functions to facilitate entity resolution and applying a second truncation function of the plurality of truncation functions to facilitate entity-resolution-dependent corroboration.

10. The method of claim 9 wherein the first truncation function has a different degree of truncation than does the second truncation function.

11. An apparatus for third-party managed data corroboration via tokenization that results in at least one token, the apparatus comprising:
    a network interface;
    a control circuit operably coupled to the network interface and configured as a third-party intermediary that manages a protocol to communicate with a requesting network element acting as a requestor role, wherein the control circuit is further configured to:
    store first truncated tokens, as stored truncated tokens, resulting from applying a truncation function to locally-held first representations of a first set of tokens as associated to first blinded tokens resulting from application of a first blinding factor to second representations of the first set of tokens, wherein the requesting network element acting as a requestor role transmits to the third-party intermediary:
       a first request part comprised of second truncated tokens resulting from applying the truncation function to third representations of a second set of tokens; and
       a second request part comprised of second blinded tokens resulting from application of a second blinding factor to fourth representations of the second set of tokens.

12. The apparatus of claim 11 further comprising:
    the third-party intermediary acting to limit which of the first blinded tokens are included within a response to the requesting network element acting as a requestor role to, at most, those associated with the stored truncated tokens that match the second truncated tokens.

13. The apparatus of claim 12 further comprising:
    the requesting network element acting as a requestor role applying the second blinding factor to at least one of the first blinded tokens the requesting network element receives within the response.

14. The apparatus of claim 11 further comprising:

the third-party intermediary including within a response to the requesting network element acting as a requestor role a result of applying the first blinding factor to at least one of the second blinded tokens.

15. The apparatus of claim 11 further comprising:

the third-party intermediary limiting metadata and/or data associated with the first set of tokens that are included, in an encrypted form, within a response to the requesting network element acting as a requestor role to, at most, metadata and/or data associated with those tokens of the first set of tokens for which the stored truncated tokens match the second truncated tokens.

16. The apparatus of claim 15 further comprising:

the third-party intermediary deriving an encryption key used to generate the encrypted form from fifth representations of one or more of those tokens of the first set of tokens for which the stored truncated tokens match the second truncated tokens.

17. The apparatus of claim 16 further comprising:

the requesting network element acting as a requestor role deriving the encryption key used to generate the encrypted form from knowledge of the fifth representations of all tokens of the second set of tokens which match the fifth representations of all tokens of the first set of tokens which the third-party intermediary uses to derive the encryption key.

18. The apparatus of claim 16 further comprising:

the requesting network element acting as a requestor role deriving the encryption key used to generate the encrypted form from knowledge of the fifth representations of all tokens of the first set of tokens which the third-party intermediary uses to derive the encryption key, wherein the requesting network element acquires knowledge of one or more of the fifth representations of all tokens of the first set of tokens which the third-party intermediary uses to derive the encryption key at some point subsequent to the third-party intermediary deriving the encryption key.

19. The apparatus of claim 11 further comprising:

at least one of the third-party intermediary and the requesting network element acting as a requestor role applying, for use in entity resolution, a first truncation function of a plurality of truncation functions; and at least one of the third-party intermediary and the requesting network element using, for entity-resolution-dependent corroboration, a second truncation function of the plurality of truncation functions.

20. The apparatus of claim 19 wherein the first truncation function has a different degree of truncation than does the second truncation function.

\* \* \* \* \*